(12) United States Patent
Ockerse et al.

(10) Patent No.: US 6,928,366 B2
(45) Date of Patent: *Aug. 9, 2005

(54) ELECTRONIC COMPASS SYSTEM

(75) Inventors: Harold C. Ockerse, Holland, MI (US); Jon H. Bechtel, Holland, MI (US); Mark D. Bugno, Stevensville, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/873,655

(22) Filed: Jun. 22, 2004

(65) Prior Publication Data

US 2004/0236510 A1 Nov. 25, 2004

Related U.S. Application Data

(63) Continuation of application No. 10/210,910, filed on Aug. 2, 2002.
(60) Provisional application No. 60/360,723, filed on Mar. 1, 2002.

(51) Int. Cl.⁷ ............................................. G01C 21/00
(52) U.S. Cl. ......................... 701/224; 701/200; 33/356; 33/357
(58) Field of Search ............................... 701/224, 200, 701/211

(56) References Cited

U.S. PATENT DOCUMENTS

| 1,472,342 A | 10/1923 | Pickard |
| 2,357,319 A | 9/1944 | Esval et al. |
| 2,383,461 A | 8/1945 | Esval et al. |
| 2,393,670 A | 1/1946 | While |
| 2,407,536 A | 9/1946 | Chapman |
| 2,464,057 A | 3/1949 | Phair |
| 2,466,687 A | 4/1949 | Craddock et al. |
| 3,936,949 A | 2/1976 | Devaud |
| 4,424,631 A | 1/1984 | Franks |
| 4,425,717 A | 1/1984 | Marcus |
| 4,505,054 A | 3/1985 | Clark et al. |
| 4,546,551 A | 10/1985 | Franks |
| 4,581,827 A | 4/1986 | Higashi |
| 4,677,381 A | 6/1987 | Geerlings |
| 4,807,462 A | 2/1989 | Al-Attar |
| 4,851,775 A | 7/1989 | Kim et al. |
| 4,862,594 A | 9/1989 | Schierbeek et al. |
| 4,937,945 A | 7/1990 | Schofield et al. |
| 4,953,305 A | 9/1990 | Van Lente et al. |
| 5,090,231 A | 2/1992 | Gallagher |
| 5,095,631 A | 3/1992 | Gavril et al. |
| 5,131,154 A | 7/1992 | Schierbeek et al. |
| 5,239,264 A | 8/1993 | Hawks |
| 5,255,442 A | 10/1993 | Schierbeek et al. |

(Continued)

OTHER PUBLICATIONS

Michael J. Caruso, "Applications of Magnetic Sensors for Low Cost Compass Systems," Honeywell, SSEC, p. 1–8, no date.

Primary Examiner—Yonel Beaulieu
(74) Attorney, Agent, or Firm—Price, Heneveld, Cooper, DeWitt & Litton, LLP

(57) ABSTRACT

An electronic compass system includes a magnetic sensor circuit having at least two sensing elements for sensing perpendicular components of the Earth's magnetic field vector. A processing circuit is coupled to the sensor circuit to filter, process, and compute a heading. The processing circuit further selects an approximating geometric pattern, such as a sphere, ellipsoid, ellipse, or circle, determines an error metric of the data points relative to the approximating pattern, adjusts the pattern to minimize the error, thereby obtaining a best fit pattern. The best fit pattern is then used to calculate the heading for each successive sensor reading provided that the noise level is not noisy and until a new best fit pattern is identified. The electronic compass system is particularly well suited for implementation in a vehicle rearview mirror assembly.

41 Claims, 27 Drawing Sheets

U.S. PATENT DOCUMENTS

| | | |
|---|---|---|
| 5,339,529 A | 8/1994 | Lindberg |
| 5,455,716 A | 10/1995 | Suman et al. |
| 5,511,319 A | 4/1996 | Geerlings et al. |
| 5,525,901 A * | 6/1996 | Clymer et al. ......... 324/207.21 |
| 5,632,092 A | 5/1997 | Blank et al. |
| 5,644,851 A | 7/1997 | Blank et al. |
| 5,664,335 A | 9/1997 | Suman et al. |
| 5,699,044 A | 12/1997 | Van Lente et al. |
| 5,708,410 A | 1/1998 | Blank et al. |
| 5,737,226 A | 4/1998 | Olson et al. |
| 5,761,094 A | 6/1998 | Olson et al. |
| 5,802,727 A | 9/1998 | Blank et al. |
| 5,808,197 A | 9/1998 | Dao |
| 5,878,370 A | 3/1999 | Olson |
| 5,924,212 A | 7/1999 | Domanski |
| 6,023,229 A | 2/2000 | Bugno et al. |
| 6,044,315 A | 3/2000 | Honeck et al. |
| 6,047,237 A | 4/2000 | Michmerhuizen |
| 6,084,406 A | 7/2000 | James et al. |
| 6,087,953 A | 7/2000 | DeLine et al. |
| 6,140,933 A | 10/2000 | Bugno et al. |
| 6,173,501 B1 | 1/2001 | Blank et al. |
| 6,192,315 B1 | 2/2001 | Geschke et al. |
| 6,222,460 B1 | 4/2001 | DeLine et al. |
| 6,243,660 B1 | 6/2001 | Hsu et al. |
| 6,301,794 B1 | 10/2001 | Parks et al. |
| 6,326,900 B2 | 12/2001 | DeLine et al. |
| 6,418,376 B1 | 7/2002 | Olson |
| 6,456,194 B1 | 9/2002 | Carlson et al. |
| 6,543,146 B2 | 4/2003 | Smith et al. |
| 6,642,851 B2 | 11/2003 | Deline et al. |
| 6,651,003 B2 | 11/2003 | Woloszyk et al. |

* cited by examiner

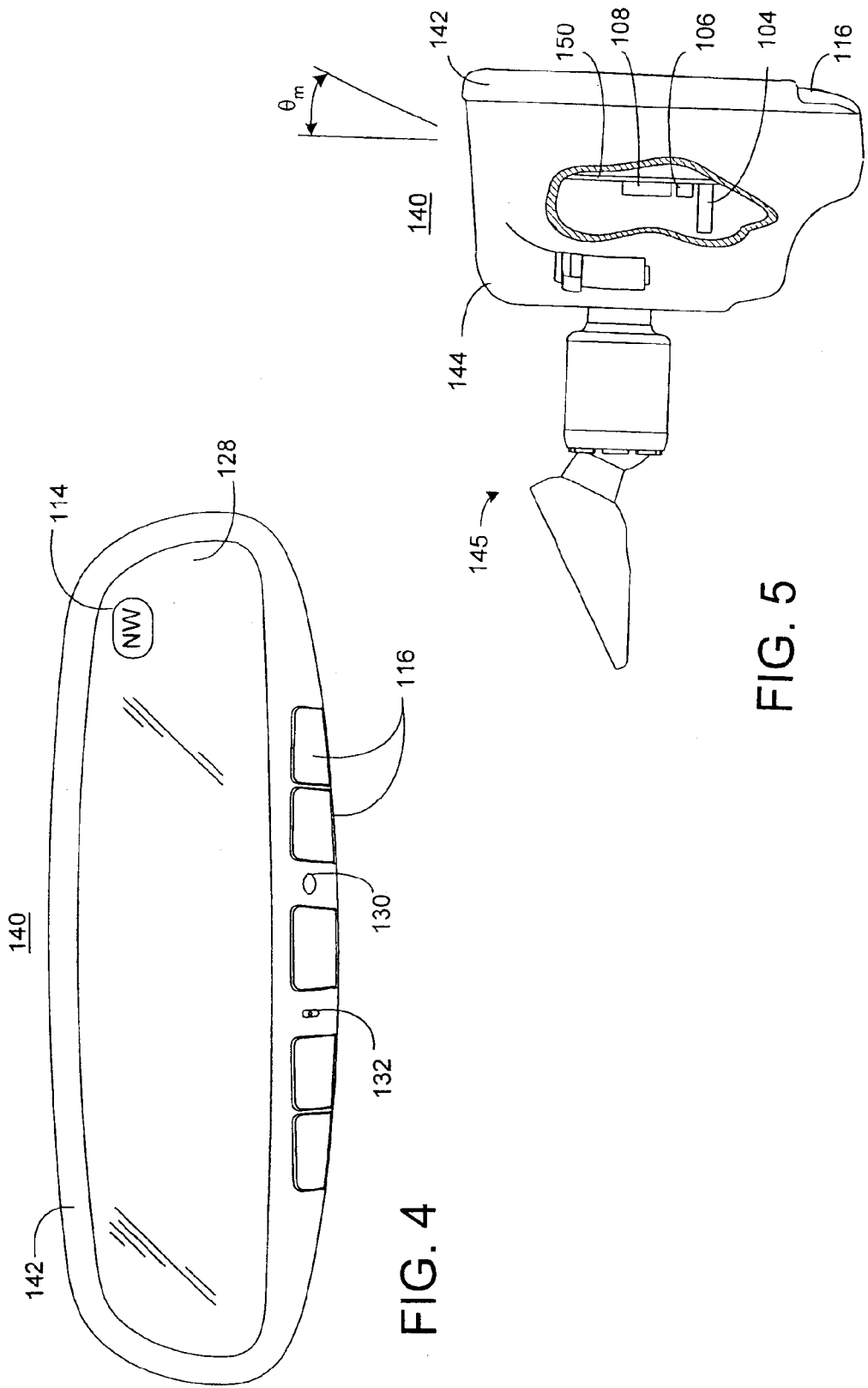

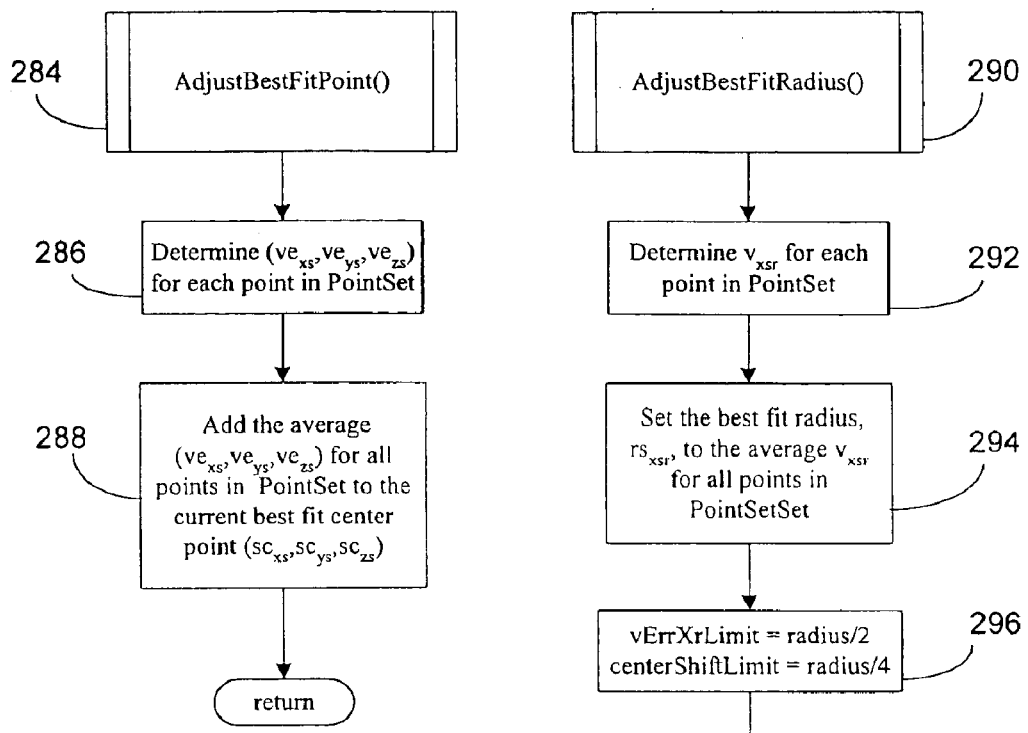
FIG. 15
FIG. 16
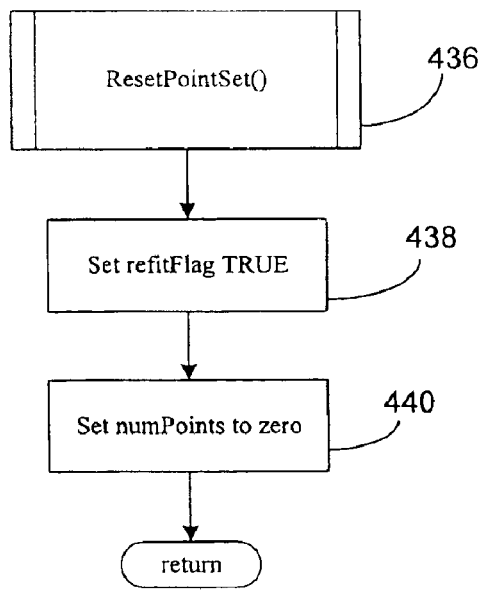
FIG. 21

ELECTRONIC COMPASS SYSTEM

CROSS-REFERENCE TO RELATED APPLICATION

This application is a continuation of U.S. patent application Ser. No. 10/210,910, entitled "ELECTRONIC COMPASS SYSTEM," filed on Aug. 2, 2002, by Harold Ockerse et al., which claims priority under 35 U.S.C. §119(e) on U.S. Provisional Patent Application No. 60/360,723, entitled "ELECTRONIC COMPASS SYSTEM," filed on Mar. 1, 2002, by Harold Ockerse et al., the entire disclosures of which are incorporated herein by reference.

BACKGROUND OF THE INVENTION

The present invention generally pertains to an electronic compass for a vehicle, and more particularly pertains to electronic compasses having improved data filtering, and/or heading determination.

Electronic compasses have become increasingly popular as an accessory in automobiles. The general construction of a typical electronic compass circuit 10 is shown in FIG. 1. Specifically, a typical electronic compass circuit includes a magnetic sensor circuit 12, which includes a Y-axis sensor 13 and an X-axis sensor 14. Magnetic sensor circuit 12 is coupled to a processing circuit 15, which operates under control of software code to process the data supplied by sensor circuit 12, calibrate the compass circuit based upon such processing, and to determine the heading of the vehicle based upon the data provided by sensor circuit 12. Processing circuit 15 is coupled to a non-volatile memory 16, which stores calibration data so that the compass does not need to be recalibrated each ignition cycle. The calculated vehicle heading is sent from processing circuit 15 to a heading display 18 for display to the vehicle occupants. The heading display is typically incorporated in an overhead console or rearview mirror assembly. User input switches 20 may also be provided that enable a user to interact with processing circuit 15 so as to cause processing circuit 15 to change the information displayed on display 18, manually recalibrate, and/or enter the geographic zone in which the vehicle is currently traveling. Additionally, a power supply circuit 22 is provided for receiving the 12-volt power from the vehicle's battery or ignition, and converts the power to power levels useful for the various components of the compass circuit 10.

The Y-axis sensor 13 is provided to sense magnetic fields perpendicular to the vehicle's direction of travel, while the X-axis sensor 14 is provided to sense magnetic fields in line with the vehicle's direction of travel. Both sensors 13 and 14 are typically mounted parallel to the Earth's surface. With such a mounting, if no magnetic field component is sensed by the Y-axis sensor 13, and a positive magnetic field component is sensed by X-axis sensor 14, processing circuit 15 would determine that the vehicle is headed north. Similarly, if no magnetic field component is sensed by the Y-axis sensor and a negative magnetic field component is sensed by the X-axis sensor, processing circuit 15 would determine that the vehicle is headed south. Likewise, if no magnetic field component is sensed by the X-axis sensor and a positive magnetic component is sensed by the Y-axis sensor, processing circuit 15 would determine that the vehicle is headed east. If no magnetic field component is sensed by the X-axis sensor and a negative magnetic field component is sensed by the Y-axis sensor, processing circuit 15 would determine that the vehicle is headed west. If equal positive magnetic field components are sensed by both the X- and Y-axis sensors, the processing circuit would determine if the vehicle is heading northeast. If equal negative magnetic field components are sensed by both the X- and Y-axis sensors, the processing circuit would determine that the vehicle is headed southwest. If a positive magnetic field component is sensed by the X-axis sensor that is equal to the absolute value of a negative magnetic field component sensed by the Y-axis sensor, the processing circuit would determine if the vehicle is heading northwest. If the absolute value of a negative magnetic field component that is sensed by the X-axis sensor is equal to the value of a positive magnetic field component sensed by the Y-axis sensor, the processing circuit would determine that the vehicle is headed southeast. Under ideal circumstances, if the output levels of the magnetic sensors were plotted relative to the X- and Y-axes as the vehicle turned through a 360° loop, the plot would form a circle, as depicted as circle A in FIG. 2.

Because such electronic compasses generally only display eight different headings (N, NE E, SE S, SW W, and NW) and because the magnetic field components sensed by the X- and Y-axis sensors are not always zero and are not always equal, the compass processing circuit generally computes a heading angle $\phi$ relative to the X and Y axis, and compares this heading angle to angle thresholds that define the boundaries between each of the eight different heading displays. Thus, the circular plot A, as shown in FIG. 2, is effectively split into eight angular segments of 45° corresponding to the eight different display headings. The compass processing circuit thus simply determines in which segment the heading angle $\phi$ lies to determine which of the eight headings to display.

As stated above, an ideal circumstance would be when the output levels of the X- and Y-axis sensors 13 and 14 form a circular plot A relative to the X- and Y-axis sensors with the center of the perfect circle at the origin of the coordinate system. In practice, however, the plot of the outputs of the X and Y sensors on an X and Y coordinate plane often does not form a perfect circle, nor is the center of such a circle coincident with the origin of the coordinate plane. Specifically, the plot may be somewhat elliptical and offset in both the X and Y directions from the origin as depicted by plot B in FIG. 2. When the actual plot is not a perfect circle and has a center point offset from the origin, the processing circuit cannot use a simple heading angle calculation to determine the appropriate heading. Such shifts and distortion of the circular plot are typically caused by the effect of the ferrous materials in the vehicle that may alter the magnetic field as sensed by the X- and Y-axis sensors. To enable ease of heading computation, the compass circuit is calibrated to account for the effects of the vehicle on the sensed magnetic field.

Not only must a compass circuit be initially calibrated, but it must continuously be recalibrated due to the fact that the influence on the magnetic field caused by the ferrous materials in the vehicle changes over time and due to external influences on the magnetic field that may only be temporary. For example, the addition of a roof-mounted antenna may cause a fluctuation in the magnetic field readings as may passing by an object with a large amount of ferrous material, such as railroad tracks, bridges, and large buildings or when the vehicle moves through a car wash. Accordingly, calibration and continuous recalibration of electronic compass circuits have received much attention.

In U.S. Pat. No. 4,953,305 issued to Van Lente et al., an electronic compass system is described having automatic continuous calibration. This patent discloses a calibration technique whereby data from the sensors is accumulated as the vehicle travels through numerous 360° loops, and is translated into data points on an X-Y coordinate plane. The processing circuit determines the maximum value of the accumulated data along the Y axis ($Y_{max}$), the minimum value along the Y axis ($Y_{min}$), the maximum value along the X axis ($X_{max}$), and the minimum value along the X axis ($X_{min}$). From the maximum and minimum values along the X axis, the span along the X axis may be computed between $X_{min}$ and $X_{max}$. Similarly, from the maximum and minimum values along the Y axis, the span along the Y axis between $Y_{min}$ and $Y_{max}$ may be computed. If these spans are not equal, the processing circuit may adjust the gain of one or both of the X- and Y-axis sensors until such time that the spans are equal to one another. This process is carried out to convert any elliptical plot of data into a circular plot of data prior to further processing. Subsequently, the maximum and minimum values from the X and Y sensors are utilized to calculate a center point ($X_E$, $Y_E$) of the plot B (see FIG. 2). X and Y error values ($X_E$ and $Y_E$) are then computed and subsequently utilized to offset each data point as it is received from the X and Y sensors, respectively. Once the compass has initially calibrated, it continues to automatically recalibrate based upon the maximum and minimum values subsequently accumulated along the X and Y axes.

One problem with the automatic calibration routine disclosed in the above-noted '305 patent is that it generally requires that the vehicle travel in numerous 360° loops to attain sufficient data for the system to have confidence that the calibration is accurate. This poses a problem to vehicle manufacturers who must then drive each vehicle through several loops before loading the vehicle on a vehicle carrier for delivery to a dealer. Unfortunately, there often is not sufficient space at the assembly plant for each vehicle to be driven in such loops and, even if there is space, the process takes precious time. If the vehicles are delivered to the dealership without having been driven through sufficient loops, a customer may purchase the vehicle or otherwise test drive the vehicle with an uncalibrated compass. In this event, the customer might erroneously be lead to believe that the compass is malfunctioning and thus make an unnecessary warranty claim with respect to the compass.

Several patents disclose various approaches to the above-noted problem. In U.S. Pat. No. 6,192,315 to Geschke et al., a calibration routine is disclosed whereby a compass is initially calibrated prior to installation in the vehicle based upon expected vehicle magnetism for the particular model in which the compass is being installed. This initial calibration is utilized until such time that the vehicle otherwise acquires enough data by traveling through a number of 360° loops. Once sufficient data is attained, the compass switches to the more recently acquired calibration data and the compass is then continuously recalibrated using the technique in the aforementioned '305 patent.

U.S. Pat. No. 5,737,226 issued to Olson et al. discloses a calibration technique whereby the processing circuit determines whether the raw data obtained from the sensors suggests that the compass is no longer accurately calculated. In which case, the processing circuit obtains two end points spaced apart by more than a predetermined angle using an assumed radius. Using the assumed radius, two potential center points for a circle are presented. The '226 patent discloses obtaining an intermediate data point in between the two end points to utilize for identifying which of the two center points calibration and to subsequently utilize when determining the vehicle heading.

U.S. Pat. No. 6,301,794 to Parks et al. discloses a calibration routine in which the compass is recalibrated each time three data points are obtained that meet specified criteria. Once three data points are obtained that meet the specified criteria, which includes averaging and spacing criteria, the center of a circle is computed using the equation for a circle such that the circle would necessarily include the three data points.

U.S. Pat. No. 4,807,462 issued to Al-Attar discloses a compass calibration routine, which calibrates the compass based upon acquisition of three points of data. The center of the circle used for calibration is determined by determining the point of intersection of the perpendicular bisectors of the two lines joining the adjacent ones of the three data points.

Although each of the above-noted patents discloses a calibration routine that more quickly calibrates the compass, some of the techniques disclosed are either overactive in that they recalibrate too frequently and thus are prone to calibration errors due to temporary magnetic field disturbances, or they do not respond quickly enough to changes in magnetic field variances that are more permanent in nature. Additionally, each of the above-noted calibration routines computes the center of a circle by assuming that three to four points are disposed exactly about the circumference of the circle. As will be explained in more detail below, it is possible that any one of these points may be offset from the circumference of a circle that would in fact better fit the data obtained. Furthermore, none of the above-noted patents disclose calibration routines that take into account the pitch of the vehicle or the strength of the vertical component of the Earth's magnetic field vector. Accordingly, if any of the above-noted compasses are mounted such that its sensors are provided in a movable structure relative to the vehicle, such as the housing of a rearview mirror assembly, these systems would be incapable of providing a quick and accurate response to movement of the housing.

Commonly assigned U.S. Pat. Nos. 6,023,229 and 6,140,933 issued to Bugno et al. disclose various techniques for mounting compass sensors in a rearview mirror housing, which may be pivoted horizontally and vertically relative to the vehicle in which it is mounted. Specifically, various mechanisms are disclosed for detecting when the mirror housing, and hence the sensors, has been tilted. When tilting of the mirror housing has been detected, a signal is sent to the compass processing circuit indicating that tilting has occurred so that the processing circuit does not otherwise assume that any drastic change occurred in the magnetic field vector. The processing circuit then determines a difference vector between data points obtained just prior to the tilt signal and those obtained just after the tilt signal to utilize for error compensation signal. In the '229 patent, a mechanism is disclosed where a third magnetic sensor aligned in the Z axis is provided. The Z-axis sensor output is utilized to determine whether a tilt has occurred once an abrupt change is first sensed in the X- and Y-sensor outputs. The processing circuit will respond to any such abrupt change in the X- and Y-sensor outputs by either identifying an error vector or by reinitiating calibration, depending on whether an abrupt change was also detected in the Z-axis sensor. This compass system, however, does not utilize the Z-axis sensor for determining the heading or identifying the center of a circle used for calibration.

SUMMARY OF THE INVENTION

According to a first embodiment of the present invention, an electronic compass for a vehicle comprises: a magnetic sensor circuit for sensing three perpendicular components of the Earth's magnetic field vector, and for generating output signals representing the three sensed components; and a processing circuit coupled to the magnetic sensor circuit for receiving the output signals, approximating a three-dimensional geometric pattern derived from the three sensed components, computing a heading of the vehicle as a function of at least two of the sensed components while referencing the three-dimensional geometric pattern, and generating a heading signal representing the computed heading.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, selecting an approximating geometric pattern that constitutes a best fit to select data points corresponding to the sensed components taken over time, computing a heading of the vehicle as a function of at least two of the sensed components while referencing the selected approximating geometric pattern, and generating a heading signal representing the computed heading.

According to another embodiment of the present invention, an electronic compass for a vehicle comprises: a magnetic sensor circuit for sensing three perpendicular components of the Earth's magnetic field vector, and for generating output signals representing the three sensed components; and a processing circuit coupled to the magnetic sensor circuit for receiving the output signals, determining a geometric pattern, computing a heading of the vehicle as a function of the at least two of the sensed components while referencing the geometric pattern, determining the magnitude of an error vector extending from the perimeter of the geometric pattern to the most recent sensed components from the three sensed perpendicular components, and generating a heading signal representing the computed heading when the magnitude of the error vector does not exceed a predetermined threshold.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, iteratively selecting an approximating geometric pattern by repeatedly comparing and changing the geometric pattern based on the sensed components taken over time, computing a heading of the vehicle as a function of at least two of the sensed components while referencing the geometric pattern, and generating a heading signal representing the computed heading.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, computing a heading of the vehicle as a function of at least two of the sensed components, and generating a heading signal representing the computed heading. The processing circuit is configured to: (a) establish a plurality of angle buckets each corresponding to mutually exclusive angular ranges about an approximating geometric pattern; (b) accumulate a point set including a plurality of data points each corresponding to the sensed components read at a different vehicle heading than the other data points; (c) calculate a heading angle for a data point in the point set; (d) select an angle bucket having an angular range in which the heading angle falls for the data point; (e) assign the data point to the angle bucket selected in step (d); (f) repeat steps (c)–(e) until all data points have been assigned to an angle bucket; and (g) adjust the approximating geometric pattern based on the data points in the point set.

According to another embodiment of the present invention, an electronic compass for a vehicle comprises: a magnetic sensor circuit including at least two sensing elements, each for sensing a component of the Earth's magnetic field vector that is perpendicular to the component sensed by the other sensor and for generating output data signals representative of the sensed components; and a processing circuit coupled to the magnetic sensor circuit for receiving the output data signals, associating the output data signals from each of the sensing elements to establish a data point, applying a smoothing filter to smooth the data point by utilizing a weighted average with the most recent data point given a greater weight than prior data points, computing a heading of the vehicle as a function of the most recent data point, and generating a heading signal representing the computed heading.

According to another embodiment of the present invention, an electronic compass for a vehicle comprises: a magnetic sensor circuit including at least two sensing elements, each for sensing a component of the Earth's magnetic field vector that is perpendicular to the component sensed by the other sensor and for generating output data signals representative of the sensed components; and a processing circuit coupled to the magnetic sensor circuit for receiving the output data signals, associating the output data signals from each of the sensing elements to establish a data point, determining a second derivative of the position of the data point relative to at least one prior data point, comparing the magnitude of the second derivative to a first threshold to determine whether the output data signals of the sensing elements are noisy, computing a heading of the vehicle as a function of the most recent data point, and generating a heading signal representing the computed heading.

According to another embodiment of the present invention, an electronic compass for a vehicle comprises: a magnetic sensor circuit including at least two sensing elements, each for sensing a component of the Earth's magnetic field vector that is perpendicular to the component sensed by the other sensor and for generating output data signals representative of the sensed components; and a processing circuit coupled to the magnetic sensor circuit for receiving the output data signals, associating the output data signals from each of the sensing elements to establish a data point, determining a noise level of the output data signals of the sensing elements by monitoring variations in the sensed levels, setting a delay counter as a function of the noise level, preventing use of the output data signals for geometric approximation until the delay counter has expired, computing a heading of the vehicle as a function of the most recent data point, and generating a heading signal representing the computed heading.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, selecting an elliptical approximating geometric pattern, computing a heading of the vehicle as a function of at least two of the sensed components while referencing the elliptical approximating geometric pattern, and generating a heading signal representing the computed heading.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, determining a calibration point based on a number of reference data points derived from the sensed components, determining a noise threshold that varies as a function of the number of reference points used to compute the current calibration point, determining whether the sensed components exceed the noise threshold, computing a heading of the vehicle as a function of the at least two of the sensed components while referencing the calibration point when the sensed components do not exceed the noise threshold, and generating a heading signal representing the computed heading.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, determining an approximating geometric pattern based on a plurality of reference data points derived from the sensed components, determining a noise threshold that varies as a function of the extent to which the approximating geometric pattern fits the reference data points used to define the approximating geometric pattern, computing a heading of the vehicle as a function of the at least two of the sensed components while referencing the approximating geometric pattern when the sensed components do not exceed the noise threshold, and generating a heading signal representing the computed heading.

According to another embodiment of the present invention, an electronic compass for a vehicle comprises: a magnetic sensor circuit including first and second sensing elements each for sensing substantially horizontal perpendicular components of the Earth's magnetic field vector, and a third sensing element for sensing a substantially vertical component of the Earth's magnetic field vector, the sensing elements being mounted in the mirror housing and for generating output signals representing the three sensed components; and a processing circuit coupled to the magnetic sensor circuit for receiving the output signals, determining a tilt angle of the mirror housing by monitoring the third sensing element during travel of the vehicle through a predetermined range of vehicle headings, compensating the sensed components of the first and second sensing elements for the tilt angle of the mirror housing, computing a heading of the vehicle as a function of the sensed components of the first and second sensing elements, and generating a heading signal representing the computed heading.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, selecting a first approximating geometric pattern based on a first set of reference data points derived from the sensed components, computing a heading of the vehicle as a function of at least two of the sensed components while referencing the first approximating geometric pattern, generating a heading signal representing the computed heading, selecting a second approximating geometric pattern based on reference data points received after the first approximating geometric pattern is selected, utilizing the second approximating geometric pattern if the second approximating geometric pattern is significantly different from the first approximating geometric pattern, and reselecting the first approximating geometric pattern if the subsequently obtained reference data points better fit the first approximating geometric pattern.

According to another embodiment of the present invention, an electronic compass for a vehicle comprises: a magnetic sensor circuit for sensing at least two perpendicular components of the Earth's magnetic field vector and for generating output signals representative of the sensed components; and a processing circuit coupled to the magnetic sensor circuit for receiving the output signals, determining an approximating geometric pattern based on at least five reference data points derived from the sensed components, computing a heading of the vehicle as a function of the at least two of the sensed components while referencing the approximating geometric pattern, and generating a heading signal representing the computed heading.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 4 is an elevational view of the front of a rearview mirror assembly incorporating at least a portion of the electronic compass circuit of the present invention;

FIG. 5 is an elevational view that is partially cut away of the side of a rearview mirror assembly with the magnetic sensing elements mounted within the mirror housing;

FIG. 15 is a flow chart of a best fit center point adjusting subroutine called during the compass flow control routine of FIGS. 12A–12D;

FIG. 16 is a flow chart of a best fit radius adjusting subroutine called during the compass flow control routine of FIGS. 12A–12D;

FIG. 21 is a flow chart of a point set resetting subroutine called during the compass flow control routine of FIGS. 12A–12D;

DETAILED DESCRIPTION OF THE PREFERRED EMBODIMENTS

Figure 2:
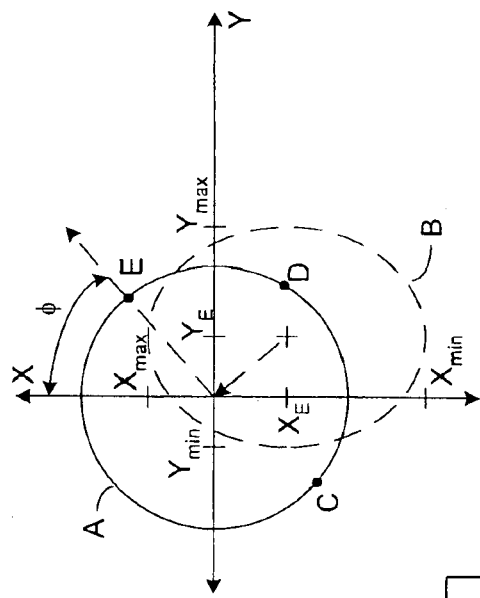
FIG. 2 is a graph illustrating calibration techniques utilized by prior art electronic compass systems.
Figure 1:
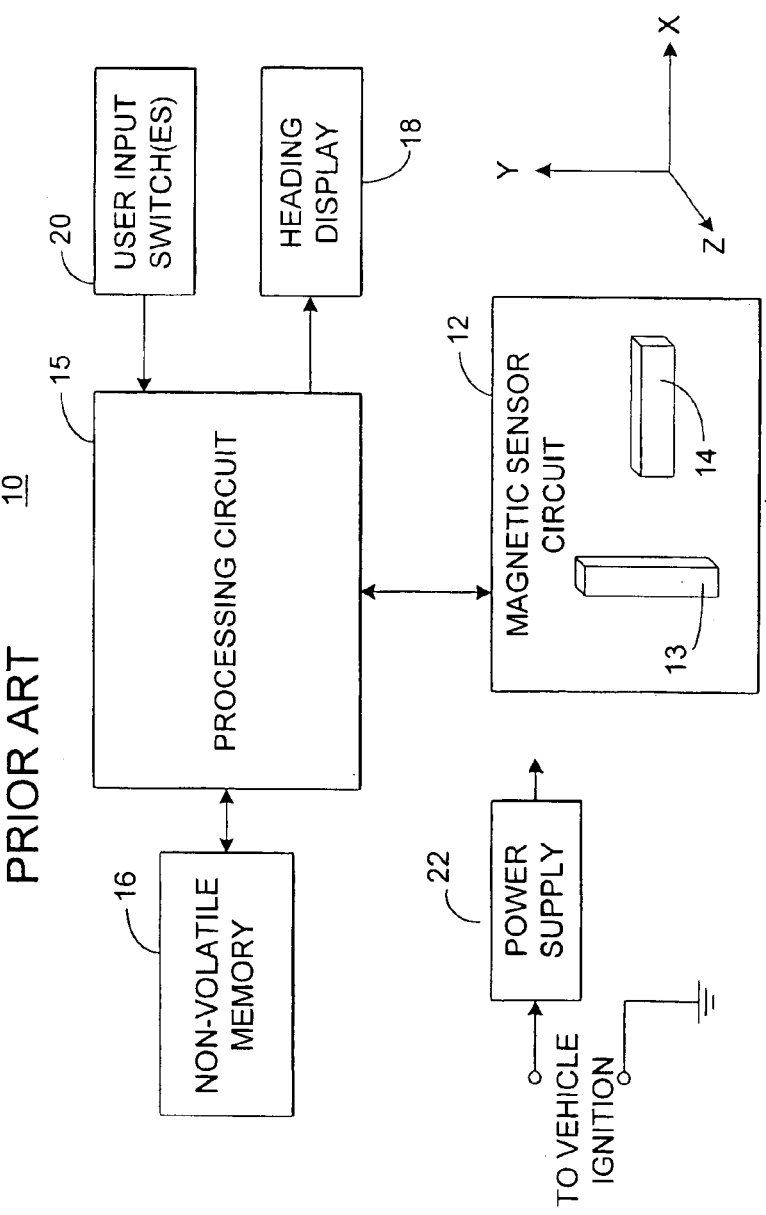
FIG. 1 is an electrical circuit diagram in block form of a prior art electronic compass circuit.
Figure 3:
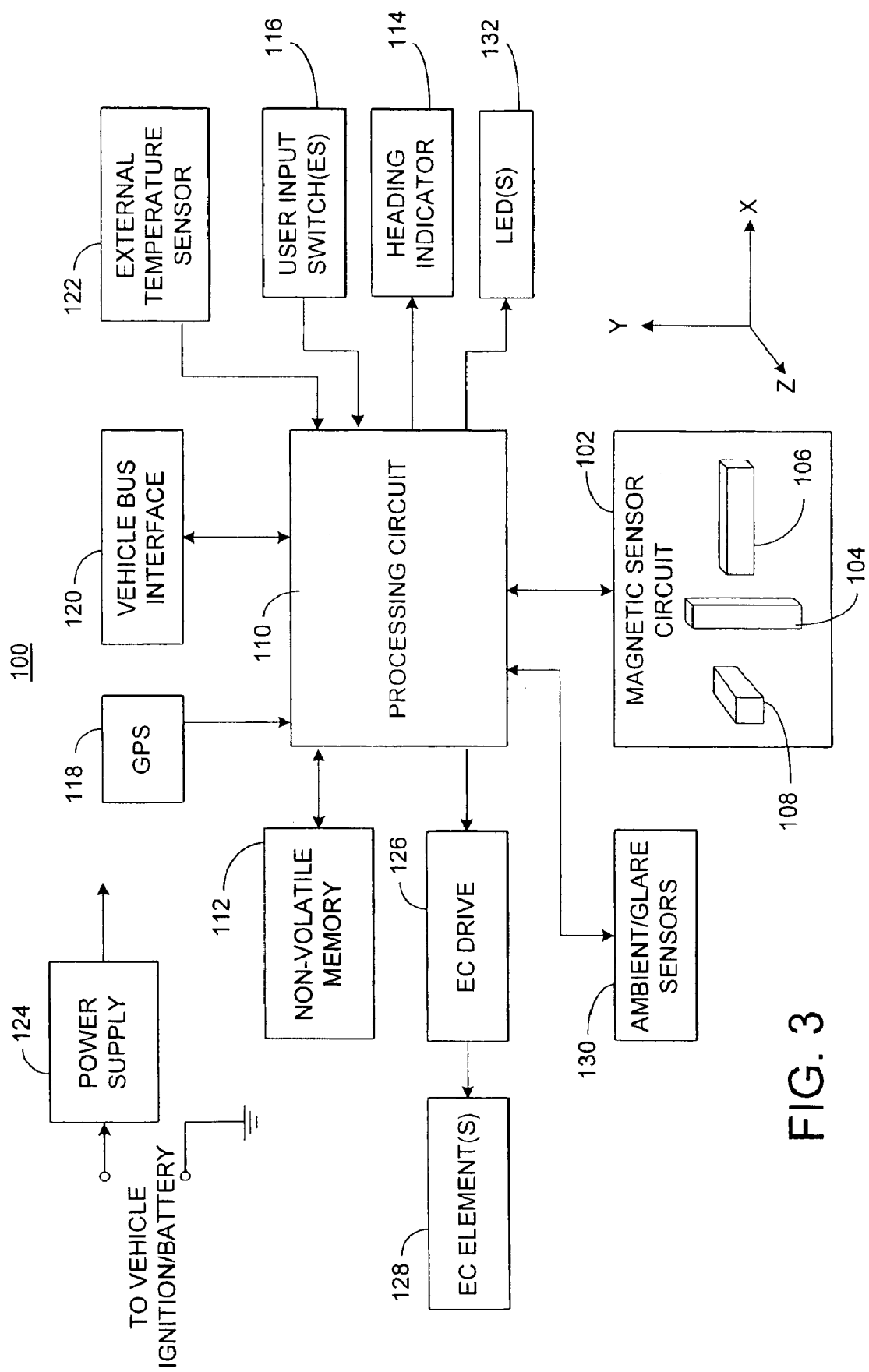
FIG. 3 is an electrical circuit diagram in block form of an electronic compass circuit constructed in accordance with the present invention.

FIG. 3 shows an electronic compass circuit 100 constructed in accordance with the present invention. Compass circuit 100 includes a magnetic sensor (i.e., magnetometer) circuit 102 having at least two sensor elements 104 and 106 for sensing perpendicular components of the Earth's magnetic field vector and for generating output signals representative of the sensed components. In some of the embodiments of the present invention, a third sensor 108 is preferably provided to sense a third perpendicular component of the Earth's magnetic field vector. Electronic compass circuit 100 further includes a processing circuit 110 that is coupled to magnetic sensor circuit 102 for receiving the output signals from sensor circuit 102.

Processing circuit 110 computes the vehicle heading as a function of the sensed components of the Earth's magnetic field vector. Processing circuit 110 also generates a heading signal representing the computed heading. This heading signal may be supplied to any other electronic component in the vehicle and is preferably supplied to a heading indicator device 114, which provides an indication of the vehicle heading to a vehicle occupant. The heading indicator may be configured to provide either a visual or an audible indication of the vehicle heading. Preferably, heading indicator 114 is a display device for visually displaying the vehicle heading. It will be appreciated, however, that the heading signals generated by the processing circuit 110 may be supplied via discrete wiring or via a vehicle bus interface 120 coupled to a bus of the vehicle to any other electrical component within the vehicle, such as a navigation system or the like. Such a navigation system could, for example, either display the heading directly or modify the orientation of a displayed map in accordance with the vehicle's current heading.

As noted above, the heading signal is preferably provided to a heading indicator 114 in the form of a display device. The display device may display the heading in alphanumerical format (i.e., N, NE, E, SE, S, SW, W, and NW). An example of a suitable display is disclosed in commonly assigned U.S. Pat. No. 6,346,698, the entire disclosure of which is incorporated herein by reference. The display disclosed in this patent displays not only the heading information, but also simultaneously displays the current external temperature as provided from an external temperature sensor 122. Alternatively, if temperature or other information is to be provided on the same display, but not simultaneously, appropriate and conventional user input switches 116 may be provided to allow the user to toggle between or selectively activate and deactivate the compass, temperature, and/or other display information.

An alternate form of display is disclosed in commonly assigned U.S. Pat. No. 6,356,376, the entire disclosure of which is incorporated herein by reference. Specifically, a graphic compass display is disclosed for providing a heading indication in graphic format. Any of the other forms of displays disclosed in this patent may alternatively be utilized, including vacuum fluorescent displays, LED displays, organic LED displays, liquid crystal displays, light emitting polymer displays, etc.

Magnetic sensor circuit 102 may be of any conventional construction modified to provide the output from additional magnetic sensor 108, where applicable. The magnetic sensor circuit may utilize flux gate, magneto-inductive, or magneto-resistive sensors. Examples of magneto-resistive sensors are disclosed in U.S. Pat. No. 5,632,092, the entire disclosure of which is incorporated herein by reference. Preferably, magnetic sensor circuit 102 is constructed in accordance with any of the embodiments disclosed in commonly assigned U.S. patent application Ser. No. 09/989,559, filed on Nov. 20, 2001, entitled "MAGNETOMETER HAVING A DYNAMICALLY ADJUSTABLE BIAS SETTING AND ELECTRONIC VEHICLE COMPASS INCORPORATING THE SAME," by Timothy R. Friend et al., now U.S. Pat. No. 6,653,831, the entire disclosure of which is incorporated herein by reference. It should be noted that any microprocessing circuitry utilized in the magnetic sensor circuit may be integrated with any such circuitry in processing circuit 110 and then appropriately programmed to perform all the necessary functions of both circuits. Alternatively, the microprocessing circuitry may be maintained separately.

Electronic compass circuit 110 may further include non-volatile memory 112, which may be external to processing circuit 110 or incorporated internally within one of its components. Processing circuit 110 would utilize non-volatile memory 112 for storing best fit approximating data and any other information that would need to survive between ignition cycles if the system is powered by the vehicle ignition.

Electronic compass circuit 100 may also be coupled to a global positioning system (GPS) receiver 118. The information from GPS 118 may be transmitted directly to processing circuit 110 or indirectly through the vehicle bus and bus interface 120. Information from GPS 118 or from any other positioning system, such as GLONASS or LORAN, may be utilized by processing circuit 110 for various purposes. Specifically, the information may be utilized to identify in which geographic zone the vehicle is currently traveling such that processing circuit 110 may utilize the appropriate magnetic field offset, which corresponds to the offset of the magnetic north pole from the actual North Pole as would be sensed in that particular geographic zone. Additionally, information from GPS 118 may be utilized to derive the speed of the vehicle, distance traveled, or simply whether the vehicle is currently moving. GPS information 118 may also be utilized to compute the vehicle heading and such vehicle heading may be compared to that computed using magnetic sensor circuit 102 so as to determine whether or not reapproximation or recalibration may be needed. Such use of GPS information by a compass circuit is disclosed in detail in commonly assigned U.S. Pat. No. 6,407,712, filed on Jun. 28, 2000, entitled "REARVIEW MIRROR WITH INTEGRATED MICROWAVE RECEIVER," by Robert R. Turnbull et al., and U.S. Patent Application Publication No. 2002/0032510 A1, filed on Apr. 5, 2001, entitled "VEHICLE REARVIEW MIRROR ASSEMBLY INCORPORATING COMMUNICATION SYSTEM," by Robert R. Turnbull et al., the entire disclosures of which are incorporated herein by reference. A system in which a LORAN receiver and/or antenna is incorporated in a rearview mirror assembly is disclosed in commonly assigned U.S. patent application Ser. No. 09/882,855 entitled "AUTOMOTIVE MIRROR WITH INTEGRATED LORAN COMPONENTS," filed on Jun. 15, 2001, by Robert R. Turnbull, now U.S. Pat. No. 6,539,306, the entire disclosure of which is incorporated herein by reference.

As noted above, processing circuit 110 may be coupled to the vehicle bus via a vehicle bus interface 120. Information provided on the vehicle bus that would be useful for processing circuit 110 would include the speed of the vehicle, distance traveled, whether the vehicle is stationary or moving, and whether the steering wheel of the vehicle is being turned. Other information that may be useful could be provided by inclinometers or other forms of roll sensors provided in the vehicle.

As shown in FIG. 3, compass circuit 110 may further include a power supply circuit 124, which is coupled to a power line from either the vehicle battery or ignition. Power supply 124 converts the power supplied from the vehicle to voltages useful for the various electronic components in the compass circuitry. In the event that the voltage from either the vehicle battery or ignition is in excess of 12 volts, a power supply circuit may be utilized such as that disclosed in commonly assigned U.S. Pat. No. 6,262,831, the entire disclosure of which is incorporated herein by reference.

As described below, all or portions of electronic compass circuit 100 are mounted on or within a rearview mirror assembly of the vehicle. It will be appreciated, however, that all or portions of compass circuit 100 may be mounted elsewhere within the vehicle, such as in an overhead console, a console mounted to the front windshield, a console on the A pillar of the vehicle, the instrument panel of the vehicle, or any other location. For example, the sensors 104, 106, and optionally 108, may be mounted on or within the rearview mirror assembly while the remainder of the compass system may be located elsewhere in the vehicle, such as in the overhead console or instrument panel. The output of the sensors may be used for other vehicle systems such as a navigation system and/or a telematics system.

Figure 6:
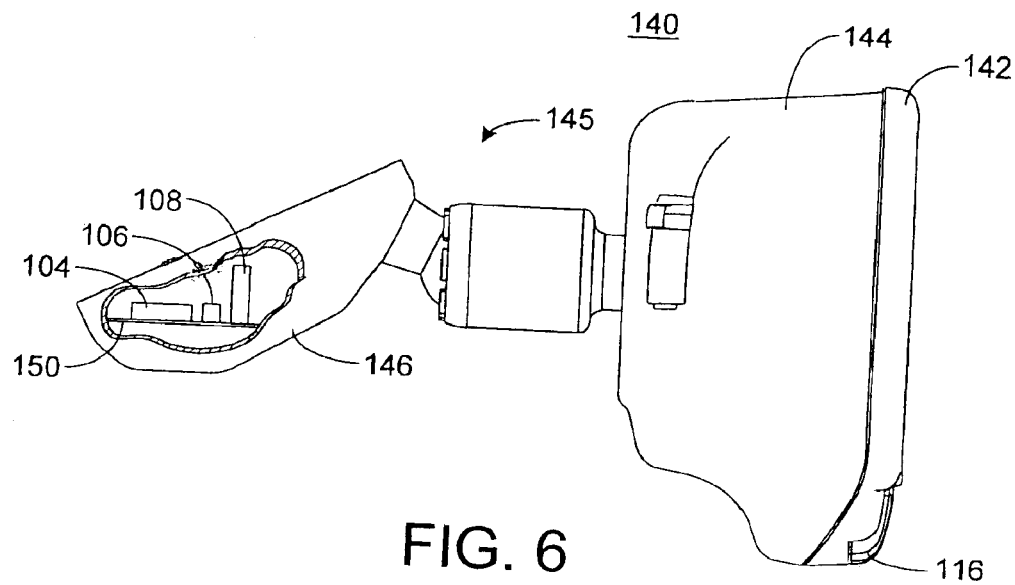
FIG. 6 is an elevational view that is partially cut away of the side of a rearview mirror assembly with the magnetic sensing elements mounted in a mounting foot of the mounting structure of the rearview mirror assembly.
Figure 7:
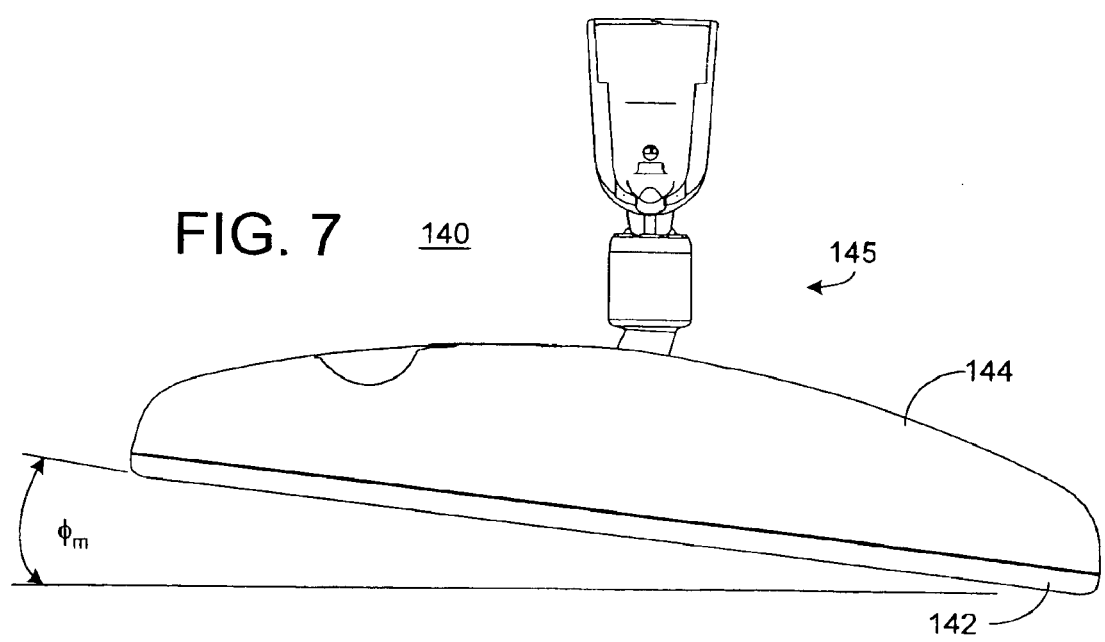
FIG. 7 is a plan view showing the top of a rearview mirror assembly in which the sensing elements are mounted within the mirror housing.

FIG. 4 is a front view of a rearview mirror assembly 140 incorporating at least the heading indicator 114 in the form of an alphanumeric display. FIG. 5 shows a side view of such a rearview mirror assembly that is partially cut away to show the mounting of sensors 104, 106, and optional sensor 108 to a circuit board 150 within the mirror housing 144 of assembly 140. FIG. 6 shows a side view of rearview mirror assembly 140, but with sensors 104, 106, and 108 mounted on a circuit board 150 disposed within the mounting foot 146 of the mounting structure 145 of rearview mirror assembly 140. FIG. 7 shows a top view of the mirror assembly 140 shown in FIGS. 4 and 5. As shown in each of FIGS. 4 through 7, rearview mirror assembly 140 includes a mirror housing 144 that is pivotally coupled to a mounting structure 145, which in turn may mount to the inside of the vehicle windshield or alternatively may mount to the roof structure or headliner extending along the top of the vehicle windshield. Housing 144 includes a bezel 142, which is placed around the periphery of the front of housing 144 to hold in place a mirror element 128.

Mirror element 128 is preferably an electrochromic mirror element, which changes reflectivity in response to an applied voltage signal. As shown in FIG. 3, processing circuit 110 of compass circuit 100 may be coupled to an electrochromic (EC) drive circuit 126, which in turn provides a driving voltage to the electrochromic mirror element 128 and to any outside electrochromic mirror elements as well. Processing circuit 110 may then be programmed to be responsive to the output signals of ambient/glare sensors 130. Specifically, the glare sensor is disposed so as to sense light from the rear of the vehicle while the ambient light sensor is generally disposed on the opposite side of mirror housing 144 to sense ambient light levels in front of the vehicle. By responding to the light levels sensed by sensors 130, processing circuit 110 could then control EC drive circuit 126 and thereby control the reflectivity of electrochromic mirror element 128 as well as any outside electrochromic mirror elements. Suitable EC drive circuits are well known in the art, an example of which is disclosed in commonly assigned U.S. Pat. No. 6,247,819, the entire disclosure of which is incorporated herein by reference. The rearview mirror assembly 140 may include an appropriate user input switch 116 to allow the user to activate or deactivate automatic control of the reflectivity of the electrochromic mirror. An indicator LED 132 or the like may be provided to indicate whether the electrochromic mirror is in an automatic state.

User input switches 116 may have any form conventionally utilized on rearview mirror assemblies or on other accessories within the vehicle. Suitable constructions for user input switches are disclosed in commonly assigned U.S. Pat. Nos. 6,407,468 and 6,420,800, both entitled "REARVIEW MIRROR WITH BUTTONS INCORPORATING DISPLAY," the entire disclosures of which are incorporated herein by reference. Another suitable construction is disclosed in commonly assigned U.S. patent application Ser. No. 09/687,743 entitled "MIRROR WITH IMPROVED BUTTON CONSTRUCTION," now U.S. Pat. No. 6,471,362, the entire disclosure of which is incorporated herein by reference.

As shown in FIG. 4, heading indicator display 114 may be provided behind rear element 128 with a transparent window formed in the reflective surface of mirror 128 so as to allow the heading to be viewed through the mirror. Mirror 128, however, may also be constructed to incorporate any of the features disclosed in the above-noted, commonly assigned U.S. Pat. No. 6,356,376. This patent discloses various mirror structures that allow viewing of a display positioned behind the mirror without completely eliminating the reflectivity in front of the display. It will further be appreciated that a suitable display 114 or other heading indicator may be provided on or proximate to bezel 114, on or proximate the mounting structure 145, or in an accessory proximate to or remote from rearview mirror assembly 140, such as in an instrument panel, an overhead console, or the like.

As shown in FIG. 5, magnetic sensor elements 104, 106, and 108 may be mounted to a circuit board 150 that is provided in mirror housing 144. Circuit board 150 may be vertical, horizontal, or provided in any other orientation, provided the sensors are generally oriented such that X-axis sensor 104 has its axis aligned generally in parallel with the longitudinal axis (i.e., direction of travel) of the vehicle and the Y-axis sensor 106 aligned with its axis generally horizontal and lateral with respect to the vehicle and perpendicular to the axis of X-axis sensor 106. Both X-axis and Y-axis sensors 104 and 106 are preferably aligned with their axes lying in a horizontal plane. Z-axis sensor 108, if provided, is mounted with its axis generally vertical and perpendicular to the axes of sensors 104 and 106. If the sensors are mounted in mirror housing 144, it may be preferable to provide a tilt sensor (not shown) within mirror housing 144 to sense when the mirror housing 144 and hence the sensor elements have been manually tilted, particularly if Z-axis sensor 108 is not otherwise utilized. Examples of suitable tilt sensors are disclosed in commonly assigned U.S. Pat. Nos. 6,023,229 and 6,140,933, the entire disclosures of which are incorporated herein by reference. As will be noted below, however, if Z-axis sensor 108 is provided, a tilt sensor may otherwise not be necessary.

FIG. 6 shows an alternative construction in which sensors 104, 106, and 108 are mounted within the mounting foot 146 of mounting structure 145. An advantage of mounting sensors 104, 106, and 108 in mounting foot 146 is that they will be maintained in a fixed relation with respect to the vehicle.

Another suitable mounting implementation for the magnetic sensors is disclosed in commonly assigned U.S. patent application Ser. No. 09/800,460, entitled "SYSTEM FOR CONTROLLING EXTERIOR VEHICLE LIGHTS," now U.S. Pat. No. 6,587,573, the entire disclosure of which is incorporated herein by reference. In this patent application, the compass sensors are disclosed as being mounted to a support structure that is adjustably positioned within a housing attached to a mirror mounting foot. The support structure disclosed in this application is also utilized to support a camera system for use in a headlamp control system and/or rain sensing system. The support member is adjustably positioned within the housing to ensure that the camera is mounted generally horizontal with respect to the vehicle. Because the angle of the windshield on different vehicles can vary considerably, the ability to adjust the angle of the camera and compass sensors within the otherwise fixed housing enables the structure to be utilized in various vehicle model platforms without having to redesign each such mirror mounting structure for each different vehicle. An advantage of mounting the compass sensors in this fashion is not only to ensure that the X and Y sensors are mounted horizontally with respect to the vehicle, but also the images obtained from the camera may be utilized when, for example, the vehicle is positioned in front of a target, to ensure proper orientation of the compass sensors following attachment to the vehicle windshield.

In the event it is desirable to mount a GPS antenna to the rearview mirror assembly 140, the antenna may be mounted in accordance with the teachings of commonly assigned U.S. Pat. No. 6,396,446, entitled "MICROWAVE ANTENNA FOR USE IN A VEHICLE," the entire disclosure of which is incorporated herein by reference. Another suitable antenna is disclosed in commonly assigned U.S. Patent Application Publication No. 2002/0032510 A1 entitled "VEHICLE REARVIEW MIRROR ASSEMBLY INCORPORATING COMMUNICATION SYSTEM," the entire disclosure of which is incorporated herein by reference.

Having described the hardware for the electronic compass system, a general overview is provided below of the inventive process to be executed by processing circuit 10. Following the general overview, a detailed description of a first embodiment illustrating one implementation of some of the inventive concepts is provided with reference to FIGS. 11–21.

As noted above, in the preferred embodiments, the magnetic sensor circuit 102 includes a Z-axis sensing element 108 that is disposed substantially vertically to sense magnetic field components perpendicular to the components sensed by the X and Y axis sensors 104 and 106. Accordingly, the inventive process preferably maps the data in a three-dimensional coordinate system. Ideally, the mapped data would then correspond to a sphere rather than a circle in a single fixed plane.

Figure 8:
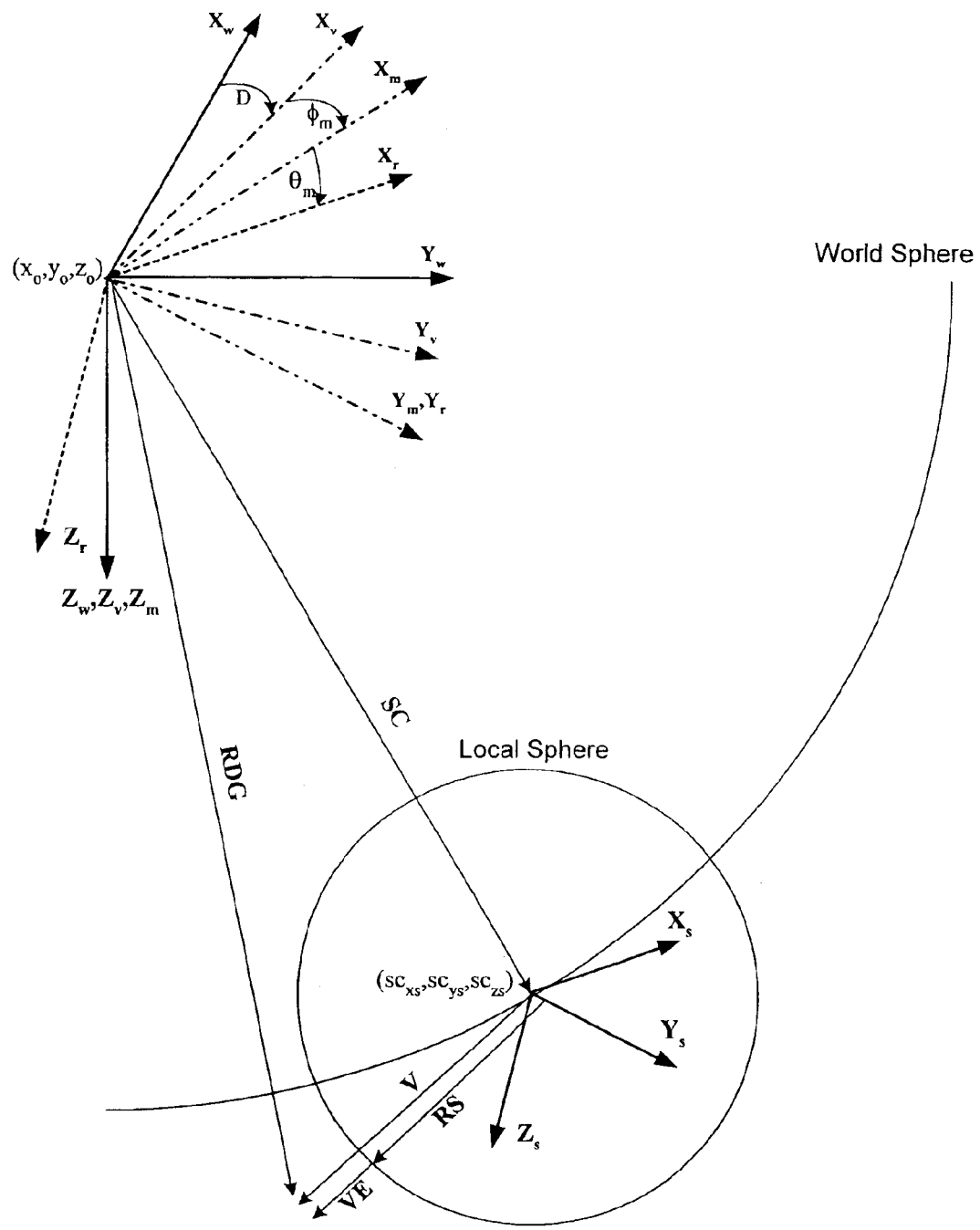
FIG. 8 is a graph of a local sphere relative to a world sphere as sensed by the compass.

To better illustrate the principles of the present invention, reference is now made to FIG. 8, which shows the coordinate system of the magnetic sensors of the compass as modified to account for offset of the true North Pole form the magnetic north pole, and shifting of the sensor orientation relative to the vehicle. More specifically, a portion of the "world sphere" is depicted along with a coordinate plane labeled $X_W$, $Y_W$, $Z_W$ in which, the $X_W$ coordinate axis is aligned with the vehicle's direction of travel and is generally horizontal (i.e., tangent to the Earth's surface), the $Z_W$ coordinate axis is vertical (i.e., points to the center of the Earth), and the $Y_W$ coordinate axis is horizontal and laterally disposed perpendicular to the vehicle's direction of travel.

The true North Pole (i.e., the northern pole of the Earth's rotational axis) does not actually correspond to the magnetic north pole, and therefore a magnetic compass must account for the declination angle D, which corresponds to the angular offset of the magnetic north pole from the actual North Pole for the particular location on the Earth's surface where the compass is located. The mappings of the declination angle D relative to various geographic zones on the Earth's surface are readily known and available. To account for the declination angle, a second coordinate plane shown in dashed lines and labeled $X_V$, $Y_V$, $Z_V$ in which, the $X_V$ and $Y_V$ axes are simply rotated from $X_W$ and $Y_W$ axes equally about the $Z_W$, $Z_V$ axis by angle D.

Assuming ideal conditions and that the compass sensors were permanently fixedly mounted in the vehicle with the X-axis sensor aligned in the direction of vehicle travel, the Z-axis sensor aligned perfectly vertical, and the Y-axis sensor aligned perpendicular to both the X- and Y-axis sensors, one would only need to subtract the declination angle D from the angle $\phi$ that the sensed Earth's magnetic field vector forms relative to the X and Y sensors to derive the true heading of the vehicle. However, when the sensors are mounted on a housing that may be moved relative to the vehicle, such as a rearview mirror housing 144 (see FIGS. 5 and 7), and the mirror housing is rotated at an angle $\phi_m$ about the vertical Z axis (see FIG. 7), the $X_m$ and $Y_m$ coordinate axes of the sensor coordinate system rotate by the same angle $\phi_m$ relative to the $X_V$ and $Y_V$ coordinate axes, while the $Z_m$ axis remains coincident with the $Z_W$ axis. Provided that the mirror rotation angle $\phi_m$ is assumed or can be identified, it can be subtracted from the heading angle along with the declination angle D to provide an accurate heading.

The computation becomes increasing complicated when the mirror housing 144 is tilted about its horizontal lateral axis (i.e., its $Y_m$ axis) to accommodate drivers of different heights (see FIG. 5). Such tilting about the $Y_m$ axis maintains the resultant $Y_r$ axis coincident with the $Y_m$ axis, but rotates the $X_r$ and $Z_r$ axis from the $X_m$ and $Z_m$ axis by an angle $\theta_m$.

As noted above, the vehicular magnetism, as well as external magnetic fields other than the Earth's magnetic field, influences the magnetic field sensed by the sensors. If there were no such influences and the sensors were not tilted relative to horizontal (i.e., $\theta_m=0°$), a plot of the data obtained from the sensors would traverse a circle about the surface of a sphere having the same radius and center point as the circle, the center point would correspond to the origin of the coordinate plane, the radius would correspond to the magnitude of the Earth's magnetic field vector, and the circle would lie in a plane parallel to the horizontal X-Y coordinate plane of the sensors (i.e., the z component value would remain constant at least locally). However, tilting the mirror causes the circle, which remains horizontal to be inclined relative to the X-Y plane by the angle of tilt $\theta_m$, and thus the z component value changes as a function of the direction of the vehicle. If only the X and Y sensor outputs were considered and plotted, the data in the X-Y plane would appear elliptical. The tilting of the mirror can be accounted for by factoring in an assumed mirror tilt angle $\theta_m$ based on the average tilt angle for an average person, or it may be measured by monitoring the variance of the data obtained from the Z-axis sensor as the vehicle is driven through a 360° turning angle.

The influences of the vehicular magnetism and external magnetic fields typically cause a dramatic shift of the center of the local sphere ($sc_{xs},sc_{ys},sc_{zs}$) from the origin ($x_0,y_0,z_0$) of the coordinate system of the sensors. Because the origin as x, y, and z values of zero, compensation for this shift can be made by subtracting the vector SC extending from the origin to the center of the world sphere from each vector RDG, which extends from the origin to a corresponding point of magnetic sensor data ($rdg_{xs},rdg_{ys},rdg_{zs}$) (see also FIGS. 9 and 10). This compensation is accomplished by subtracting the x, y, and z values ($sc_{xs},sc_{ys},sc_{zs}$) of the local sphere's center point to each data point ($rdg_{xs},rdg_{ys},rdg_{zs}$) obtained from the sensors. The resultant vector V extends from the center of the local sphere to the data point. As shown in both FIGS. 8 and 9, the local sphere has a radius vector RS (with a magnitude of $rs_{xsr}$) and a center point ($sc_{xs},sc_{ys},sc_{zs}$) that is initially assumed and then recalculated through the approximation sequence described further below. To assist in the approximation process, an error vector VE may be determined for the point ($rdg_{xs},rdg_{ys},rdg_{zs}$) by subtracting the present radius RS from vector V. Such error vectors VE may be computed for each data point obtained from the sensors and then averaged or otherwise utilized to determine the quality of the approximation data (i.e., center point ($sc_{xs},sc_{ys},sc_{zs}$) and radius $rs_{xsr}$). As described further below, the center point and radius may subsequently be varied to obtain a "best fit" solution to the data obtained from the sensors that has the lowest average error. The center point and radius providing the best fit may then be stored for subsequent use in ascertaining the heading angle $\phi_s$ from the most recent sensor reading and hence the vehicle heading to be displayed.

Use of a ball position (or tilt and/or rotation) sensor which may be used among other things to correct heading angle and to determine when the mirror housing 144 has been moved and trigger re-approximation or re-calibration is described in commonly assigned U.S. Pat. Nos. 6,023,229 and 6,140,933, the entire disclosures of which are incorporated herein by reference.

In many vehicles, driver position is consistent enough that changes in angular adjustment ($\phi_m$ of the mirror about a vertical axis is typically relatively small from one driver to the next so that a correction for this change may be less important than compensating for changes in the effect of the disturbing field in the vehicle when the position and/or angular orientation of the mirror is changed relative to this field. This problem is most pronounced for two ball mirror mounts for which substantial positional adjustment may be made in addition to the changes in angular orientation. A mirror position sensor is also more complicated for a two ball mirror mount. Furthermore, many of the mirrors are used in parts of the world in which the vertical component of the earth's magnetic field is substantially larger than the horizontal component so that in some instances, an increment of tilting $\theta_m$ of the mirror housing about horizontal axis $Y_m$ may have an effect on the compass reading which is several times greater than a rotation $\phi_m$ of the same magnitude about vertical axis $Z_m$.

For drivers using a mirror housing-mounted compass, a reasonably likely scenario is for two or more drivers who adjust the mirror to widely differing positions to be traveling together and sharing the driving. In such a case, it is likely that travel may generally be in one direction for an extended period of time so a mirror which evaluates and updates approximation continuously or quasi continuously and which makes effective approximation adjustments based on ranges in direction of travel which are substantially less than 360 degrees and even substantially less than 180° or even 90° is desirable. It is desirable to apply criteria to determine when best fit approximation data is satisfactory for displaying heading information. It may also be desirable to base this determination more heavily on the quality with which the approximating geometry that is used fits the sample data than, for example, on a minimum threshold for the angle spanned by accumulated turns. For example, quality of fit may be measured by a criteria related to least squares. Then, when the average of the squares of the errors for each sample data point in fitting the approximating geometry is generally low and in an acceptable range and preferably when it also converges to a predominant minimum, the approximating geometry may be used as a basis for calculation and display of heading information. This may be true even when the total change in direction spanned by the sample points is small, perhaps well under 90° and the acceptance criteria for the average of the square of the error may be either a set threshold or a variable dependent on other factors. This is an example, and many other measurements of the quality of fit may be used and the acceptance criteria may be used for other or additional uses of the compass data.

In the scenario above, some of the greatest changes in direction may occur as a driver is reentering highway traffic after pulling off the highway to make the change in drivers. A system which acquires and screens readings quickly and reliably is desirable to take advantage of quick, and often relatively large changes in direction of travel which often occur when a driver begins a segment of a journey. As will be apparent from the description below, the compass systems of the present invention exhibit these desirable features.

The raw data points read by the sensors may be filtered and/or averaged with multiple readings. Other data such as spread and standard deviation may be included with the readings as stability indicators. Optional data conversions may be applied, which may include one or more of the conversions discussed below. Scale factors, which may be determined and stored as part of a factory calibration, may be applied to approximate, calibrate or simply to equalize gain for two or more of the directional components of the magnetometer reading. The points may optionally be evaluated on the basis of the statistical data compiled with the reading, and also, optionally, on the basis of how the points fit the current approximating geometry, and also optionally on how the vertical Z-axis component of the reading agrees with that of current sample points and perhaps on additional criteria as well. If the data point qualifies under these evaluations and if the approximating geometry qualifies for use as a basis for processing magnetic data for readings, heading indications based on the acquired data point are generated and optionally displayed. The processed magnetometer data may also be used for other purposes.

The points are evaluated for logging or for immediate inclusion in the active sample set and currently stored active and inactive points are evaluated for change in status and for possible deletion or replacement in the sample set. A sample set is then assembled and maintained. Development of a good sample set generally improves accuracy of the compass readings and serves as a base for relatively fast response to shifts in the approximating requirements which among other things result from adjustment of a mirror where the magnetic sensor is contained in the movable mirror housing.

Next, an analysis of the sample points is performed to provide data needed to extract the heading information from the magnetometer readings. A preferred way to do this is to select and perhaps refine a pattern which is characteristic of, for example, a sort of fingerprint of the pattern of response of the magnetometer readings to the Earth's magnetic field due to changing vehicle direction and to statistically fit this pattern to a set of magnetometer readings recorded in the vehicle as it assumes varying orientations. Data from this pattern fitting process is then used to extract the component of subsequent readings which is primarily due to the earth's magnetic field from disturbing effects from other sources of magnetic disturbance, especially those within the vehicle. The extracted reading and/or data obtained in the extraction process are then used to compute heading direction. Although not necessary in every embodiment, the fitting algorithm may generate a number which indicates the quality of fit, this is preferably used in an iterative sequence to find the modification of and/or the orientation of the pattern which gives an approximate best fit. The quality of fit as indicated by the above number is preferably also utilized as one of the variables on which to base other decisions. For example, the quality of fit may be used as a partial basis for determining when approximation is satisfactory to use as a basis to process and output heading indications. If different starting conditions for the pattern lead to convergence to different local minima in the fitting process, the quality of fit may be used to in part determine which one to select as the best fit. In this case, if one of the local minima is not a clear best fit, this may be cause to inhibit use of the fit as a basis to compute heading information and to refine the sample set to resolve the indecision. Preferably, components of the calculation process used for the fitting algorithm may serve other uses.

As examples, in a preferred embodiment, the distance of a reading from the approximating pattern is calculated in vector form as the above-described error vector VE for each reading under consideration. The square of the distance, i.e. the square of the magnitude of the error vector, is used in the fitting calculation, and components of the error vector are used in an algorithm to effectively predict the next position of, or alteration to, the pattern in an iterative process to determine the approximate best fit. Furthermore, calculations used to determine the error vector are used directly to convert the error vector to the desired base coordinate system. Also, an angle calculated in the determination of the distance of the point from the pattern is directly useful in determining heading angle for a given reading and perhaps to also determine which readings are adjacent to each other and to approximately gauge their spacing. The distance of a point from the approximate best fit pattern may be used as a partial basis to add or reject a point in the sample set used to determine the best fit pattern or to accept or reject a point for use in determining the current heading. In the preferred configuration, substantial portions of the same calculation are used to analyze each point of the sample set in turn as part of the calculation to evaluate the quality of fit, to determine the next fit approximation in the iterative sequence, and to apply the current best fit pattern to process individual readings to make partial evaluation of their quality and to determine the associated heading.

As stated above, the approximating geometry may optionally be continuously or periodically adjusted to better fit the sample points. For example, if the approximating pattern or geometry is a sphere, the radius of the sphere may be adjusted. The radius of the sphere is normally related to the strength of the Earth's magnetic field or to the horizontal component thereof depending on the type of approximation which is being used. In either event, this parameter should be stable for a given locality even when disturbances such as a change in the pattern of magnetization of the vehicle or adjustment of a mirror in which the sensor is mounted occur. Particularly when the sensor is mounted in a mirror, it is desirable to adjust the approximation quickly and, thus, with a minimum amount of data after a change in the mirror position. For such a change, the best fit radius is not likely to change much if at all, and furthermore, a good determination of the radius normally requires sample points which are well distributed about the approximating pattern. It is prudent to favor retention of a previous best fit radius for the approximating geometry until the distribution and the quality of the sample points is favorable to give data for proper adjustment of this value. By using the previously determined radius, effective use may be made of a more limited sample set to quickly and adequately respond to a needed change in compass approximation. It is preferable to extend this approach to other parameters as well, that is to establish a general hierarchy of the parameters which may be adjusted to attain an approximate best fit according to the relative stability of the parameters in the face of changes in approximation or in expected relatively short term changes in vehicle environment. The values for parameters which are most stable to these changes are preferably retained until data which is likely to result in an improved setting is available.

In some embodiments, there may be cases when it would be desirable to switch to a different approximating reference pattern rather than to simply adjust the existing pattern. For example, to switch between a circular and an elliptical reference pattern, or perhaps between two-dimensional and three-dimensional patterns.

The approximating pattern is then compared with the active sample points and an indication of the quality of the fit is given. A numerical indication of the quality of fit and an analysis such as a least squares fit are desirable. Subsequently, prediction of the changes to the shape and/or position of the approximating pattern to result in a better fit may be made. These approximations may range from simply stepping through an array of possible choices to calculating either an absolute or incremental modification to apply to determine the pattern to use for the next best fit approximation. Furthermore, to limit program size and computation time, it may be preferable to utilize a prediction process which shares intermediate numerical results with other necessary calculations such as those used to measure the quality of fit. The predictions may then be iteratively applied to step to an approximate best fit.

When starting out initially or after a major shift in approximation, the sample set may be confined to a very small portion of the approximating geometry. In such a case, it may be advantageous to add additional constraints in order to achieve a reasonably accurate approximation with the limited sample set. For example, when an approximating sphere whose radius is approximately equivalent to the horizontal component of the Earth's magnetic field is used, the center of the sphere should normally fall roughly at the center of the circle traversed by the magnetic field vector as the vehicle is turned through a full circle. In such a case, the center of the approximating sphere will fall roughly in the horizontal plane of the circle of sample points. This is also approximately the horizontal plane defined by the vertical component of the center of gravity of the sample points. Thus, when the sample points are not distributed well enough to define this plane, it may be advantageous to, for example, constrain the center of the approximating sphere to the horizontal plane which contains the center of gravity of the sample points (equal or unequal weights may be assigned to each point).

Another problem may occur particularly when the sample points in the sample set span a limited part of the total range and also when the sample set does not contain at least three points with reasonable separation from one another. In these cases, it is difficult to distinguish the correct center for the sphere from a center point which is generally the mirror image of the first one relative to the points in the sample set. Another starting center location which gives problems in convergence to the proper center point is one which lies generally on the perpendicular bisector of the line which connects the two center points which were just described. In this case, for example, with the predictor described elsewhere in the write-up, the convergence will be such that it will first generally place the center of gravity of the points close to the approximating sphere, and then it will converge slowly toward either the correct center or the incorrect mirror image center. A preferred way to deal with the problem is to either routinely or, in cases where there is any question about the quality of convergence, try several starting center points which may, for example, fall generally on a circle about the center of gravity of the sample points. For each starting point, an iteration should be performed to achieve the approximating best fit given the starting point. Then, the centers corresponding to the approximate best fit for each of the starting locations should be compared, and if they are not approximately the same point, the quality of the fit for each should be compared. If the quality of fit for one is substantially better than for the others, the center to which it corresponds should be the one which is chosen. Otherwise, the sample set should be refined until the best fit of highest quality is obtained for a single approximating best fit center point.

It is preferable as part of the production approximation to measure the relative gain of the magnetic sensor for each of its sensing directions. It is then preferable to store approximation constants and to apply these constants to each reading which is subsequently taken by the magnetometer in order to preferably approximate and at least equalize the relative gain of the magnetometer for each of its sensing axes. When there are conditions which give an inherently elliptical response pattern, it may be preferable to pre-scale the data so that a circular or spherical fitting process may then be used. Particularly when the sensor is mounted in the mirror, it is normally convenient to have the nominal vertical axis parallel to the approximately vertical face of the circuit board. However, in the vehicle, the circuit board in the mirror will normally not be in a vertical position for a median driver. Assuming that one sensor, say the Y-axis sensor, is also parallel to the circuit board and in the horizontal plane, it is preferable to do a coordinate rotation about this axis to establish a coordinate system for which the X and Y axes fall generally in the horizontal plane for a median driver and the transformed Z axis is nominally vertical for a median driver.

For the first preferred embodiment, a sphere is selected as the approximating pattern. In a preferred arrangement, the approximating radius is preferably set to the value for which the circle which is generally traced by the magnetic readings as the vehicle is turned in the circle will approximately form the equator of this sphere in its best fit position. It is preferable to adjust this radius only when a set of sample points which are of relatively high quality and which have a relatively good distribution is available. Then, it is preferable, for example, to iterate through a set of trial radii to find the one for which the fit is good and for which the sample points fall close to the equator of the approximating sphere. Once a reasonable center point has been established, except for the situations noted below, it is preferable to use the previously established center point as the starting point for a new iteration. It may also be preferable to use the average of the sum of the error vectors for each of the sample points as the vector to add to the previous center point to establish the new center point for successive steps in the iterative process. The iterative sequence is preferably continued until the change in center for several successive iterations is below a threshold value.

When the quality of fit is questionable, as indicated by a relatively high error indication for the approximation, additional iterations similar to or roughly equivalent to those outlined below should also be applied here.

In some embodiments, it may be preferable not only to calculate, but to also store with each point in the same point set, an indication of how well the point fits the approximating geometric data pattern. This may be a quality indication or an error indication such as the square of the distance from approximating pattern. It may also be preferable to save an indication of the time or at least of the relative order in which the sample point was acquired with the sample point set. This, for example, may be a sequence number, a time and date, or a mileage. The order of acquisition of the sample points may be maintained by storing the sample points in memory on a first-in, first-out (FIFO) basis.

For a given sample point set, the quality/error indication and the accompanying description may be stored with each point of the sample point set. The points may then be ordered according to the angle $\phi$ that is calculated for each point. Then, pairs of points which are next to each other in the ordered list, including the pair consisting of the first and the entries in the ordered last, may be considered to be adjacent points. The magnitude of the difference in the angles $\phi$ modulo 360° for the angle associated with each point of the pair may be used as the indication of the spacing between the two members of the respective pair of adjacent points.

An optional calculation similar to that used to find a center of gravity is useful to determine a center of the distribution of sample points. Each sample point may, for example, be assigned a hypothetical mass of one and the x component of the center of mass is then equal to the average of the x components of the points in the set. The y and z components are similarly equal to the average of the y components of the member points and to the average and of the z components of the member points, respectively.

There are a number of possible techniques for applying the selection criteria. In general, given a new point which is a candidate to replace one of the existing active sample points, a decision should be made first as to whether or not to make the replacement and secondly, if the replacement is to be made, which point of the existing active sample set is to be replaced. One way to apply the criteria is to, for example, temporarily, successively, and one at a time replace each point of the existing active sample set with the candidate point. For each temporary replacement of a single sample point by the candidate point, the calculations are applied as needed and information required for comparison of the results to apply the criteria for the replacement is logged. The logged results are then compared with each other and with similar data for the existing sample set to see if any of the replacements meet the combined criteria and, if so, to choose which one of the members to replace to best meet the criteria. Then, if no replacement is satisfactory, the sample set is not changed and the candidate point is not used as an active member of the sample set. Otherwise, the replacement which yielded the most favorable result is retained and the replaced point is either discarded or assigned to an inactive set.

Next, the angles for the largest and next largest spacings are logged as each of the replacements is made and these results for each of the replacements are compared with each other and with the results for the largest and next largest spacings in the original sample set to determine suitability of any of the possible replacements and to rank the options for suitability under this criteria.

The centers of gravity for the original sample set and for sample sets with each of the replacements are compared and ranked in a manner similar to that used for the evaluation of the spacings described above.

It is preferable to eventually purge older points and to at least know the relative times of acquisition when a change is detected in the pattern. This information is useful when data which fits the new pattern needs to be separated from data which does not. Here, separation of or partitioning of the sets of points may be partially based on the order in which they were acquired. It is also good to give preference to retaining data which fits the pattern well and for which statistical data on acquisition indicated that a stable reading was made and to favor rejection of data which fits poorly or which was acquired under noisy conditions.

The vertical component of the Earth's magnetic field and the additional effects to the measured vertical field component due to the vertical components of magnetic fields within the vehicle should be relatively stable even when turns are made in a horizontal plane. Substantial changes in the vertical components of the readings are likely to be caused either by transient conditions or by a change which results in a more permanent shift in the approximation. If the change is transient, the measured point may not be a good one for use either as a sample point or for heading calculation. If the shift is prolonged or semi-permanent, a relatively quick response to properly re-approximate the compass may be needed. In either event, a comparison of the vertical component of the field strength for a particular point with the prevailing average of the vertical component or perhaps with the average of the vertical component for a particular group of points is useful in determining when the particular reading is not likely to fit the current pattern. Determination of whether such a change is transient or relatively permanent is preferably made in part by accumulating a history of readings. If there is a relatively stable shift in vertical components of the readings, a shift in approximation is likely. Here, it is advantageous to have stored representative readings after the shift was first detected so the readings may be evaluated for inclusion in a new approximation sample set and it may be advantageous to purge or make points acquired before the approximation shift inactive. If the vertical components of the readings generally revert to the previous or prevailing value after a short distance or driving period, the change may be assumed to be a transient one, and values having the shift are best purged from the sample set.

When the sensor is mounted in the movable mirror assembly, a mirror adjustment which may change approximation is often made just before or just as a driver begins a new part of a journey. Turns are likely to be made as, for example, when backing out of a driveway and turning onto a street, when backing out of the parking position and turning onto a street, or when traveling around a clover leaf-type interchange to enter a freeway. These situations may often present the best opportunity to quickly collect data points in varying orientations. This data is potentially very useful in making a quick correction to the compass approximation. It is, however, risky to quickly purge all of the existing data prior to obtaining more points to confirm that the approximation has really changed. The acquisition and temporary storage of these points followed by their subsequent qualification as valid sample points has the advantage of acquiring points when the data is available while exercising caution so as to avoid purging good data points with data which may prove to be problematic before there is reasonable verification that it is stable and not a passing transient.

In addition to the foregoing, it may be beneficial for the compass system to receive an indication whether the vehicle is moving. For example, if the vehicle were not moving, the compass system could be configured to not update the displayed heading, nor change the stored approximating geometry (or the associated point set). In this way, when the sensors are mounted in the mirror housing and the driver adjusts the mirror during a time that the vehicle is stationary, the displayed heading would not change. This would be advantageous since a driver is unlikely to believe the compass is operating properly if the heading changes while the vehicle is not moving. The indication whether the vehicle is moving may be in the form of a signal transmitted from another component in the vehicle (such as a GPS) that indicates simply whether the vehicle is stationary or moving. The signal would not have to indicate the speed the vehicle is travelling but merely whether it was moving. According to some embodiments of the present invention, a signal representing the vehicle speed could nevertheless be used to determine whether the vehicle is stationary. Additionally, the compass may be programmed to assume the vehicle is moving if a minimal noise level (e.g., more than 2 mG) is present in the data read from the sensors over a specified time period.

Having described the general concepts behind the inventive approximation process, a more specific example of the first embodiment, which implements some of the above concepts, is described below. The present invention is not, however, limited to the specifics in this example.

Figure 11:
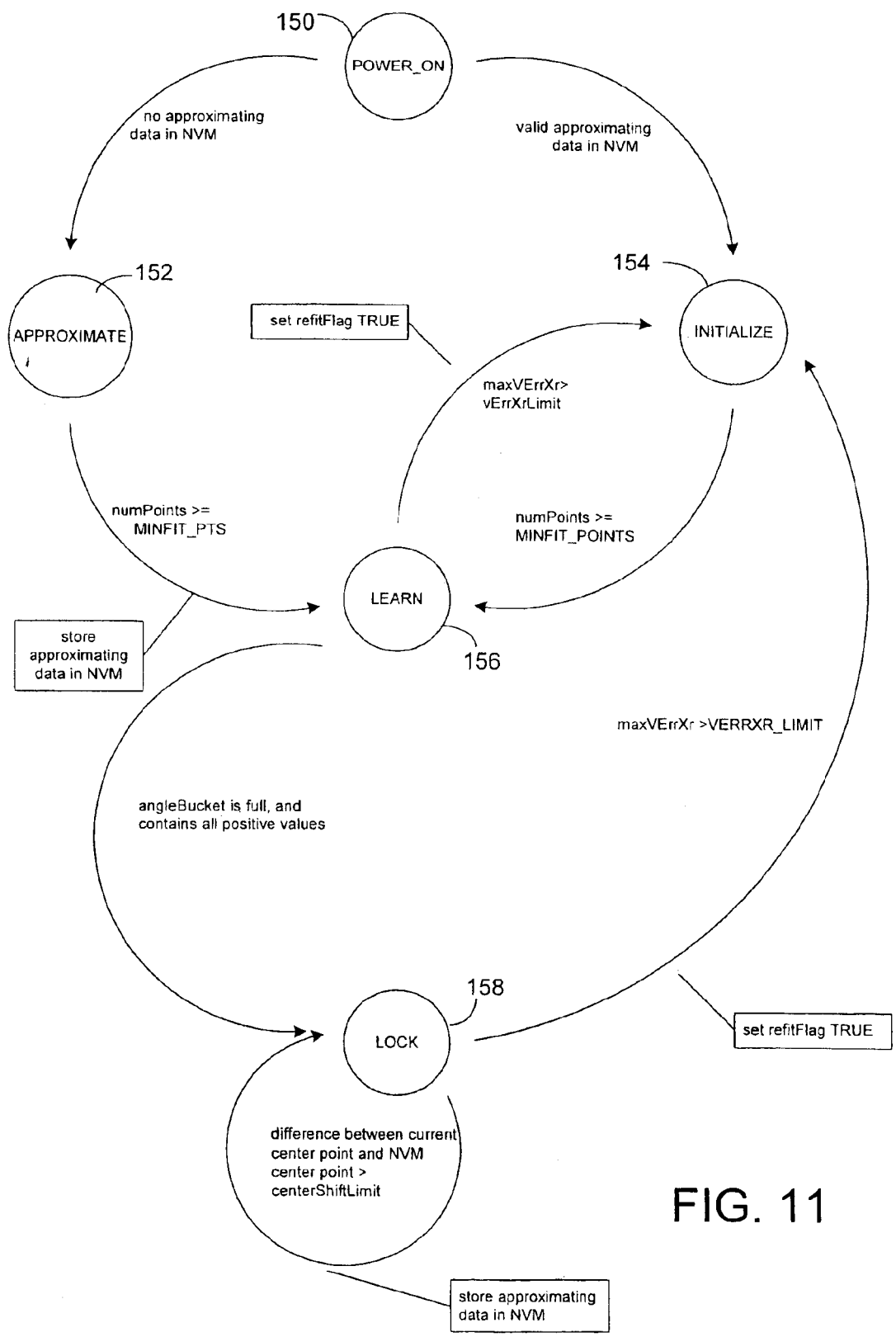
FIG. 11 is a state diagram showing the various operating states of the compass processing circuit according to a first embodiment and their relation to one another.

Processing circuit 110 is preferably programmed to operate as a state machine. FIG. 11 shows the various states of operation and the criteria used to change states. More detailed information regarding the entry or exit from any of the states is described further with reference to the flowcharts beginning with FIG. 12A. With respect to the state diagram shown in FIG. 11, the processing circuit first operates in a POWER_ON state 150 when the vehicle ignition is engaged. If the approximating geometry of the compass has never previously been calculated, there will be no approximating data stored in non-volatile memory (NVM) 112 thereby causing the processing circuit 110 to enter the APPROXIMATE state 152. The processing circuit remains in the APPROXIMATE state 152 until a specified number of data points are obtained that meet certain criteria. From these points, approximating best fit data is attained and stored in NVM 112 and subsequently used to calculate and display the vehicle heading. Processing circuit 110 then enters the LEARN state 156. If the vehicle is subsequently turned off and then turned on again, processing circuit 110 enters the state diagram in the POWER_ON state 150. This time, however, valid approximation data had been stored in NVM 112 and, thus, processing circuit 110 would enter the INITIALIZE state 154. During the INITIALIZE state, the processing circuit 110 processes data from the sensors until a minimum number of points are attained that meet certain criteria while at the same time calculating and displaying the vehicle heading using the approximation data stored in NVM 112. At this point, processing circuit 110 enters the LEARN state 156. During the LEARN state, processing circuit 110 continues to accumulate additional data points meeting certain criteria for use in updating the approximation data that was previously attained in either the APPROXIMATE or INITIALIZE states. As will be described further below, if any of these data points are spaced a distance from the outer surface of the approximating geographic pattern (i.e., the local sphere) such that the magnitude of the error vector VE exceeds a predetermined threshold, processing circuit 110 sets a refitFlag to TRUE, clears all the data points previously attained, and reenters the INITIALIZE state 154 where the circuit remains until a minimum number of points are again attained meeting the specified criteria.

When the processing circuit 110 is in the LEARN state 156 and has attained a specified number of data points in excess of the minimum data points required to enter the LEARN state, processing circuit 110 enters the LOCK state 158 where it remains until such time that the magnitude of an error vector VE is identified that exceeds a specified maximum. At this point, the processing circuit would return to the INITIALIZE state 154 while setting the refitFlag to TRUE and clearing all the previously attained data points. Otherwise, processing circuit 110 remains in the LOCK state 158. Each time that the difference between the most currently generated approximation data and the approximation data stored in NVM 112 exceeds a limit, the old approximation data in the NVM is overwritten by the new approximation data.

Figure 12A:
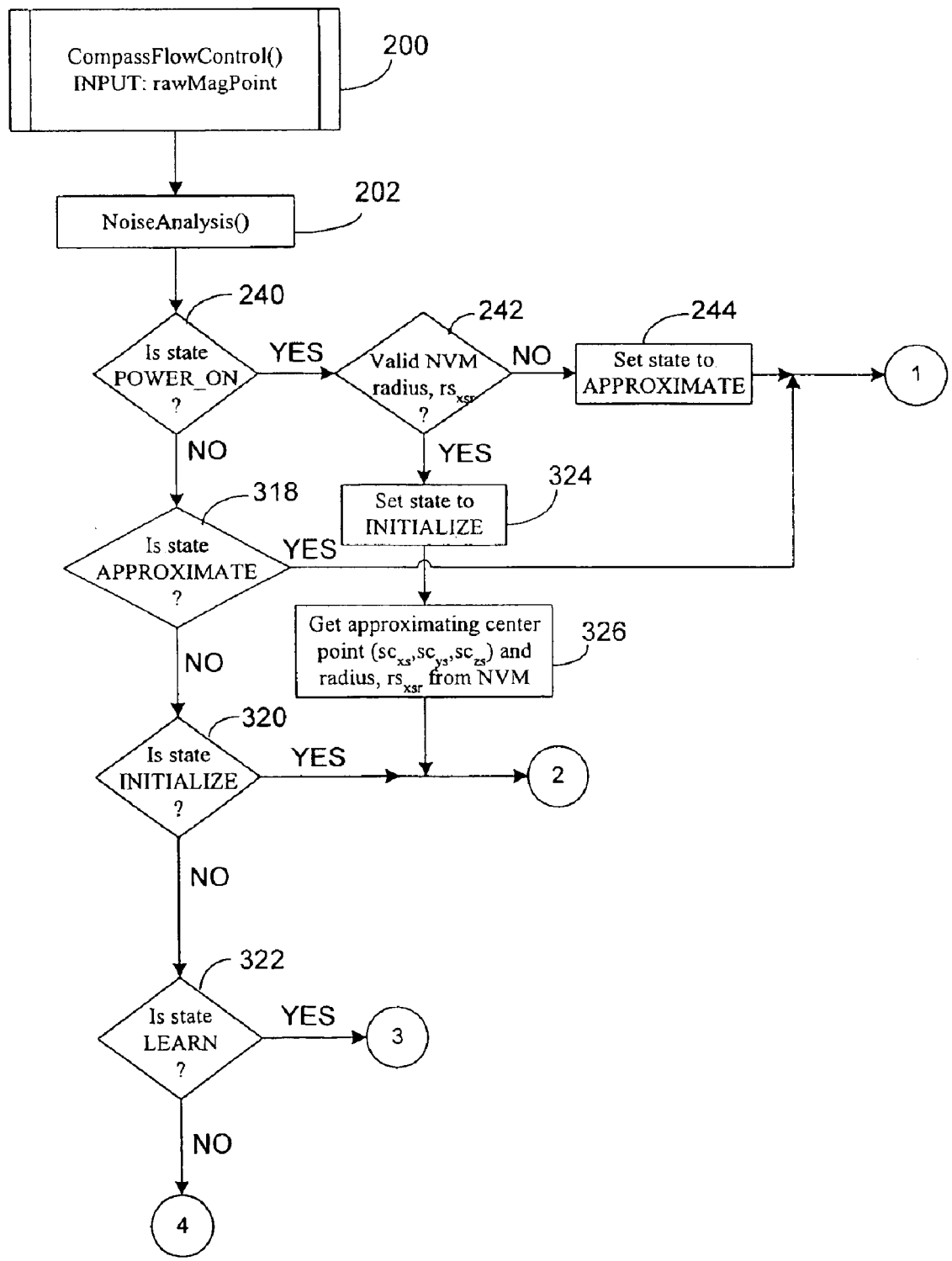
FIGS. 12A–12D are collectively a flow chart for a compass flow control routine executed by the processing circuit of the electronic compass of the first embodiment of the present invention.
Figure 13:
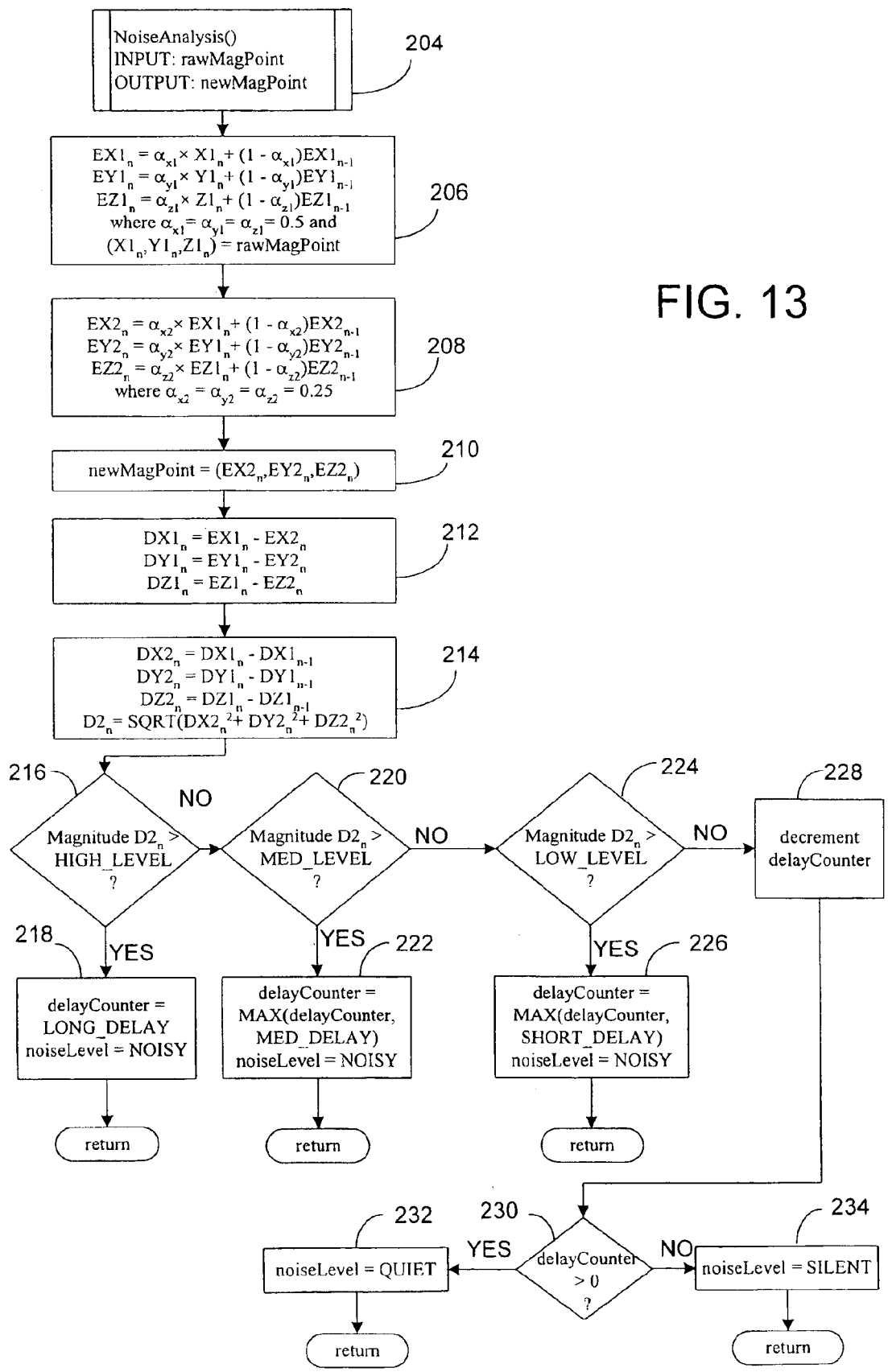
FIG. 13 is a flow chart of a noise analysis subroutine called during the compass flow control routine of FIGS. 12A–12D.

FIG. 12A illustrates the steps performed by processing circuit 110 while executing a compass flow control algorithm 200. The first step that processing circuit 110 performs under this routine is to receive data from magnetic sensor circuit 102, which represents the X, Y, and Z coordinates of the most recent raw magnetometer point attained from magnetic sensor circuit 102. Processing circuit 110 then executes step 202, which is a call to the NoiseAnalysis subroutine 204, which is illustrated in FIG. 13.

The NoiseAnalysis subroutine 204 is used to filter and smooth the raw magnetometer points (rawMagPoint) as received from sensor circuit 102. In step 206, processing circuit 110 first filters the raw magnetometer point using exponential smoothing based upon the equations:

$$EX1_n = \alpha_{x1} \times X1_n + (1-\alpha_{x1})EX1_{n-1}$$

$$EY1_n = \alpha_{y1} \times Y1_n + (1-\alpha_{y1})EY1_{n-1}$$

$$EZ1_n = \alpha_{z1} \times Z1_n + (1-\alpha_{z1})EZ1_{n-1}$$

where $\alpha_{x1} = \alpha_{y1} = \alpha_{z1} = 0.5$ and $X1_n$, $Y1_n$, $Z1_n$, respectively equal the X, of the rawMagPoint. In this equation, $EX1_{n-1}$, $EY1_{n-1}$, $EZ1_{n-1}$, respectively represents the corresponding X, Y, or Z component values of the previously filtered raw data point. When the first data point is attained by the compass system, however, $EX1_{n-1}$, $EY1_{n-1}$, and $EZ1_{n-1}$ are simply set equal to $X1_n$, $Y1_n$, and $Z1_n$, respectively, since there is no data with which to smooth the first rawMagPoint. The filtered rawMagPoint ($EX1_n, EY1_n, EZ1_n$) is then passed to step 208 where a second exponential smoothing filter with $\alpha_{x2} = \alpha_{y2} = \alpha_{z2} = 0.25$ are utilized in the following equation:

$$EX2_n = \alpha_{x2} \times EX1_n + (1-\alpha_{x2})EX2_{n-1}$$

$$EY2_n = \alpha_{y2} \times EY1_n + (1-\alpha_{y2})EY2_{n-1}$$

$$EZ2_n = \alpha_{z2} \times EZ1_n + (1-\alpha_{z2})EZ2_{n-1}$$

As noted above, in a preferred embodiment, $\alpha_{x1} = \alpha_{y1} = \alpha_{z1} = 0.5$ and $\alpha_{x2} = \alpha_{y2} = \alpha_{z2} = 0.25$. However, these values can be varied based on the level of noise and performance desired. For example, setting $\alpha_{z1} = 0.125$ and $\alpha_{z2} = 0.0625$ will result in more heavily smoothed Z data and hence less response to noisy conditions in the data set. In these equations, ($EX2_{n-1}, EY2_{n-1}, EZ2_{n-1}$) represents the corresponding X, Y, or Z component value of the previously filtered newMagPoint. By using a second filtering step, gain is added due to the inherent phase delay between the two filters, which increases with frequency. It will be appreciated, however, that this second filtering step is optional. Then in step 210, processing circuit 110 stores the value of ($EX2_n, EY2_n, EZ2_n$) in the variable newMagPoint (newMagPoint=($EX2_n, EY2_n, EZ2_n$)).

The variation of the output of the first exponential smoothing filter in block 206 is then analyzed by comparing it to the variation of the output of the second exponential smoothing filter in step 208. This analysis, which is performed in step 212, assigns a figure of quality based on the amount of variation measured, and on the amount of time elapsed since a notable amount of variation has occurred. Thus, this step effectively computes the first derivative of the position of the twice-filtered data point, which represents the rate of change (i.e., analogous to velocity) in position of the filtered data point. This can be written as follows:

$$DX1_n = EX1_n - EX2_n$$

$$DY1_n = EY1_n - EY2_n$$

$$DZ1_n = EZ1_n - EZ2_n$$

In step 214, processing circuit 110 computes the second derivative of the position of the twice-filtered data point, which represents the rate of change of the rate of change (i.e., analogous acceleration) of the position of the data point, using the equations:

$$DX2_n = DX1_n - DX1_{n-1}$$

$$DY2_n = DY1_n - DY1_{n-1}$$

$$DZ2_n = DZ1_n - DZ1_{n-1}$$

where $DX2_{n-1}$, $DY2_{n-1}$, $DZ2_{n-1}$, are the prior values for $DX2_n$, $DY2_n$, $DZ2_n$ rawMagPoint. Steps 206–214 are performed for each X, Y, and Z value of rawMagPoint and then the magnitude of the resulting vector $D2_n$ ($D2_n$=SQRT $(DX2_n{}^2+DY2_n{}^2+DZ2_n{}^2)$) in step 216 first to a predefined value HIGH_LEVEL. If the magnitude of $D2_n$ (Magnitude $D2_n$) exceeds HIGH_LEVEL, processing circuit 110 executes step 218 in which the variable delayCounter is set equal to the constant LONG_DELAY and the variable noiseLevel is set equal to the constant NOISY prior to returning the process flow to step 240 (FIG. 12A) in CompassFlowControl routine 200.

If, in step 216, processing circuit 110 determines that Magnitude $D2_n$ does not exceed HIGH_LEVEL, it proceeds to step 220 where it compares Magnitude $D2_n$ to the constant MED_LEVEL. If Magnitude $D2_n$ exceeds MED_LEVEL, processing circuit 110 proceeds to step 222 where it sets the variable delayCounter equal to the greater of either the prior value of delayCounter or the constant MED_DELAY. Processing circuit 110 also sets noiseLevel equal to NOISY in step 222 prior to returning to the CompassFlowControl routine 200 at step 240.

If Magnitude $D2_n$ does not exceed HIGH_LEVEL or MED_LEVEL, processing circuit 110 proceeds to step 224 where it determines whether Magnitude $D2_n$ exceeds the constant LOW_LEVEL. If the constant LOW_LEVEL is exceeded in step 224, processing circuit 110 sets the variable delayCounter equal to the greater of either the prior value of delayCounter or the constant SHORT_DELAY while also setting the variable noiseLevel to NOISY (step 226) prior to returning to step 240 in routine 200.

If Magnitude $D2_n$ does not exceed LOW_LEVEL, processing circuit 110 decrements the delayCounter in step 228 prior to proceeding to step 230 in which it determines whether the delayCounter is greater than zero. If the delayCounter is greater than zero, processing circuit 110 sets the noiseLevel to QUIET in step 232 prior to returning to step 240 in routine 200. If, in step 230, processing circuit 110 determines that delayCounter does not exceed zero, it proceeds to step 234 in which it sets the noiseLevel equal to SILENT, prior to step 240 in routine 200. The different values used in steps 216–226 may, for example, be HIGH_LEVEL=25, MED_LEVEL=15, LOW_LEVEL=5, LONG_DELAY=8, MED_DELAY=4, and SHORT_DELAY=2.

Figure 12B:
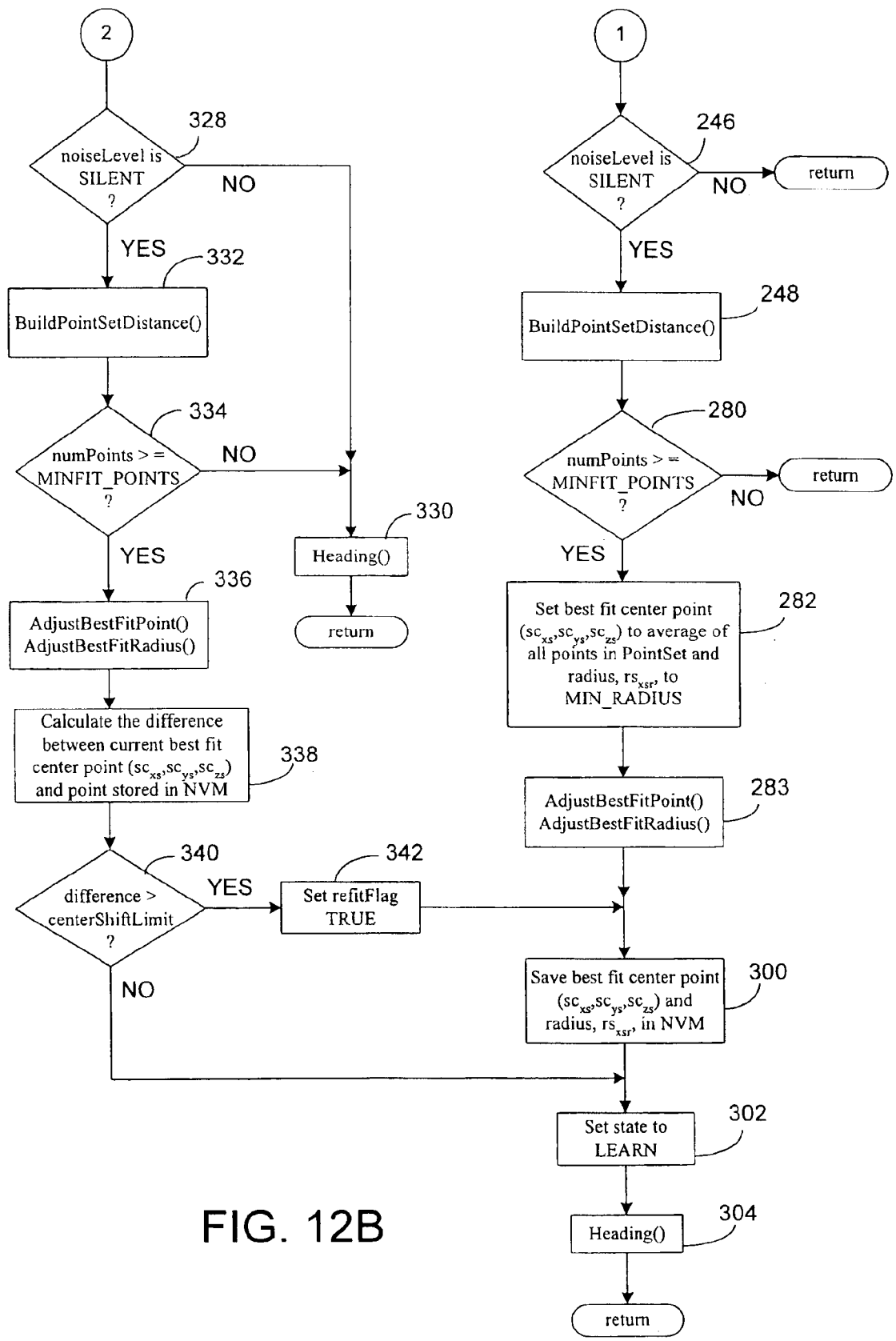

Referring back to FIG. 12A, in step 240, processing circuit 110 determines whether it is presently in the POWER_ON state. If so, processing circuit 110 proceeds to execute step 242 in which it determines whether a valid approximation radius $rs_{xsr}$ is stored in NVM 112. Initially, no such radius would be stored in nonvolatile memory unless preapproximation data was previously stored in the compass. Provided no valid radius is stored in NVM 112, processing circuit 110 proceeds to step 244 in which it sets its state to APPROXIMATE. The process then flows through connector "1" to step 246, which is shown in FIG. 12B.

Figure 14:
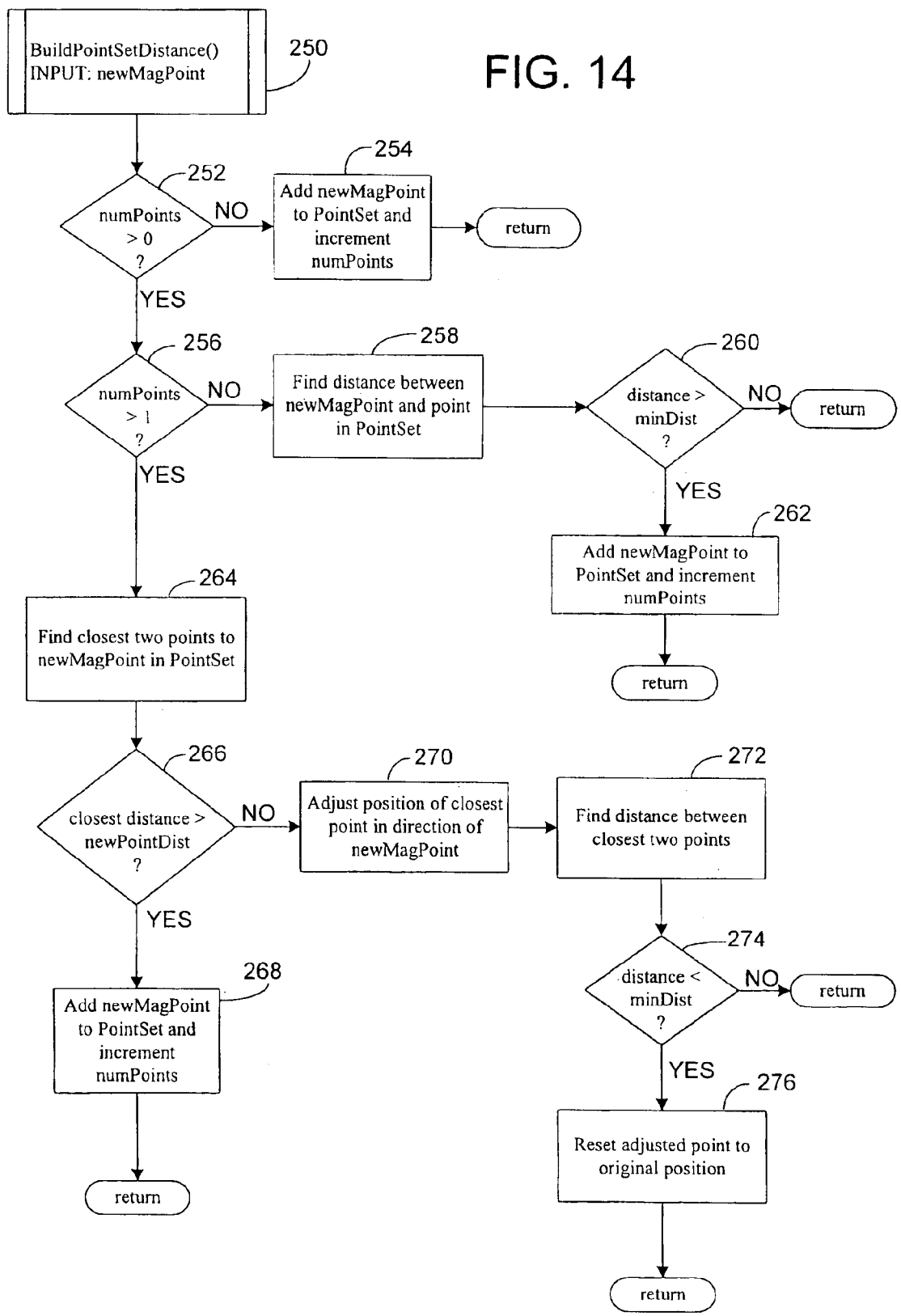
FIG. 14 is a flow chart of a first point set building subroutine called during the compass flow control routine of FIGS. 12A–12D.

In step 246, processing circuit 110 determines whether the noiseLevel is SILENT. If not, processing circuit 110 returns to CompassFlowControl routine 200 at which point a new rawMagPoint is attained prior to again executing the NoiseAnalysis subroutine 204 described above. Processing circuit 110 then determines in step 318 that it is in the APPROXIMATION state and proceeds back to step 246 and continues to loop through steps 200 through 246 (and step 318) until such time that the noiseLevel is SILENT. The length of time that it takes to achieve this result depends upon the consistency of the data received and the degree to which it varied initially due to the length of the delayCounter that would otherwise be set. Once the noiseLevel is SILENT, processing circuit 110 executes step 248, which is a call to the BuildPointSetDistance subroutine 250 that is shown in FIG. 14.

In a preferred implementation, a delay of, for example, ten seconds, after power-on is added during which magnetometer data is collected and run through the noise filters. However, the BuildPointSetDistance routine 250 is not called until after the ten second delay has expired. This prevents various magnetic transients from causing an incorrect point to be learned. These transients can be caused internally from the battery charging, a door being open, mirror position adjustment, etc. Transients may also be caused externally such as the presence of gas pumps, metal garage doors, metal beams in parking ramps, etc. After the delay has expired, the BuildPointSetDistance routine 250 is called every time new magnetometer data is available until two points are found. This indicates that the magnetic field is changing, most likely due to movement of the vehicle. A vehicleUnderway flag is then set to track this event. When this event occurs, the two learned points are discarded and the BuildPointSetDistance routine 250 is called to start anew the building of PointSet with Point[1]. Alternatively, a vehicle moving flag may be used.

In the BuildPointSetDistance routine 250, processing circuit 110 first determines in step 252 whether the variable numPoints is greater than zero. Initially, this variable is set to "0" so that the first time through this routine, the processing circuit will advance to step 254 where it adds the most recent value of newMagPoint to Point[1] in an array hereinafter referred to as "PointSet." PointSet stores a plurality of magnetometer data points up to a limit specified by the constant TOTAL_POINTS, which may, for example, be equal to twelve, such that a total of twelve points are stored in PointSet where numPoints is successively incremented from "1" to TOTAL_POINTS. It is the data points stored in PointSet that are subsequently utilized for approximating the center point of the local sphere and determining the radius of the sphere, which together constitute the approximation data that is then used to provide a relative basis for determining the vehicle heading.

In addition to adding the newMagPoint to the PointSet in step 254, the processing circuit increments the variable numPoints and then returns control to the CompassFlowControl routine 200 at step 280 (FIG. 12B). In step 280, the processing circuit determines whether the variable numPoints is greater than or equal to the constant MINFIT_POINTS. If it does not, the processing circuit then returns to step 200 where a new rawMagPoint is attained and subjected to the NoiseAnalysis subroutine 204. The processing circuit 110 then proceeds with the new MagPoint attained from subroutine 204 to again enter the BuildPointSetDistance subroutine 250 provided the noiseLevel is SILENT. Otherwise, processing circuit 110 continues to attain new rawMagPoints until noiseLevel is again SILENT.

Upon entering BuildPointSetDistance subroutine 250 a second time, the value of numPoints is no longer equal to zero and thus the processing circuit executes step 256 in which it determines whether the value of numPoints is greater than one. Because the value of numPoints will not exceed one the second time through this subroutine, the processing circuit will then advance to step 258 in which it will determine the distance between the newMagPoint and Point[1] in the PointSet. Then, in step 260, the processing circuit determines whether this distance exceeds the variable minDist, which is defined as:

minDist=2×defRadius×sin(MIN_ANGLE/2)

where MIN_ANGLE=2×π/(3×TOTAL_POINTS)

The value of defradius is either a preset constant of, for example, 150, or preferably, the value of the approximation radius stored in NVM 112. Thus, the minimum distance (minDist) is a function of the number of TOTAL_POINTS to be attained and used for approximation purposes. If the distance between the two points thus attained does not exceed minDist, the subroutine returns to step 200 to acquire a new data point and continues until such time that a second newMagPoint is attained that is spaced a distance greater than minDist from the first acquired point, in which event processing circuit executes step 262 in which it adds newMagPoint to PointSet in the Point[2] location while also incrementing the value of numpoints. The processing circuit then returns to step 200 to acquire and filter a new rawMagPoint.

After acquiring the first two points in PointSet, the processing circuit will then go through the above-noted steps and will reenter the BuildPointSetDistance subroutine 250 provided that the noiseLevel remains SILENT. Upon entering BuildPointSetDistance subroutine 250, the processing circuit will proceed to step 264 because the value of numPoints will exceed one.

In step 264, the processing circuit finds the closest two points stored in PointSet to the newMagPoint most recently attained. The first time through this path of the flow diagram, the two points correspond to the two previously attained points, Point[1] and Point[2]. Then, in step 266, the processing circuit will determine whether the distance between the closest point in the PointSet and newMagPoint exceeds the value of variable newPointDist, which is defined as:

newPointDist=2×defRadius×sin(NEW_POINT_ANGLE/2)

where NEW_POINT_ANGLE=2×π/TOTAL_POINTS

If this distance exceeds the value of newPointDist, the processing circuit increments the value of numPoints and then adds the newMagPoint to the PointSet in the location Point[numPoints] (step 268). The processing circuit then returns to step 200 where a new rawMagPoint is attained and then processed. Again, assuming the noiseLevel remains SILENT, the BuildPointSetDistance subroutine 250 will again be executed. This subroutine will continue to be called in step 248 until such time that the value of numPoints equals or is greater than the constant MINFIT_POINTS, which may, for example, be set equal to four.

Assuming that subroutine 250 is once again entered, and in step 266 the processing circuit determines that the closest distance does not exceed the value newPointDist, the processing circuit adjusts the position of the closest point in the direction of newMagPoint in step 270. For example, if any of the X, Y, and Z values of newMagPoint are greater than the X, Y, and Z points of the closest point, such X, Y, and Z values of the closest point may each be incremented by a value such as "1." Similarly, if any of the X, Y, or Z values of newMagPoint is less than any value of the closest point, the corresponding X, Y, or Z value of the closest point may be decremented by a value such as "1." Subsequently, in step 272, the processing circuit finds the distance between the point in the PointSet whose position was just adjusted and the point closest to it. Then in step 274, if the processing circuit determines that this distance is less than the value minDist, it proceeds to step 276 where it resets the position of the point whose position was adjusted to its original position. Otherwise, the processing circuit simply returns to step 200 without first performing step 276. These latter two steps are performed to ensure that a point in the PointSet does not have its position adjusted so as to then become too close to another point in the PointSet. This assures that the points are maintained in an adequately spaced relation about the periphery of the local sphere.

Once the value of numPoints is greater than or equal to MINFIT_POINTS, the process proceeds to step 282 (FIG. 12B) where it sets the approximation best fit center point $(sc_{xs}, sc_{ys}, sc_{zs})$ to the average of all points in PointSet and sets the best fit radius $rs_{xsr}$ to the constant MIN_RADIUS. This step is an initial step used prior to going through the iterative subroutines AdjustBestFitPoint and AdjustBestFitRadius, which are called in the subsequent step 283 and described below, to make further adjustments to this approximation data based upon the error metric so as to provide a best fit approximating local sphere. As shown in FIG. 15, the AdjustBestFitPoint subroutine 284 first determines the values $(ve_{xs}, ve_{ys}, ve_{zs})$ for each point presently stored in the PointSet (step 286). The value of $ve_{xs}$ for a given point is the X component of the vector VE. As noted above and shown in FIGS. 8 through 10, vector VE is the error vector, which is the difference between the vector V, which extends from the center of the approximating local sphere to the particular data point in the PointSet, and the computed approximation radius vector RS (with magnitude $rs_{xsr}$). The value $ve_{ys}$ and $ve_{zs}$ respectively correspond to the Y and Z component values of vector VE.

After step 286, the processing circuit executes step 288 in which it adds the average $(ve_{xs}, ve_{ys}, ve_{zs})$ for all points in the PointSet to the current approximation center point $(sc_{xs}, sc_{ys}, sc_{zs})$. Then, in executing AdjustBestFitRadius subroutine 290, the processing circuit determines the value $v_{xsr}$ for each point in the PointSet (step 292). The value $v_{xsr}$ corresponds to the magnitude of the vector V as described above with respect to FIGS. 8 through 10. Then, the processing circuit sets the approximation radius $rs_{xsr}$ to the average of $v_{xsr}$ for all points in the PointSet (step 292). Then, in step 296, the variable vErrXrLimit is set equal to $rs_{xsr}/2$ and the variable centerShiftLimit is set equal to $rs_{xsr}/4$. The significance of these variables will be discussed further below.

Figure 9:
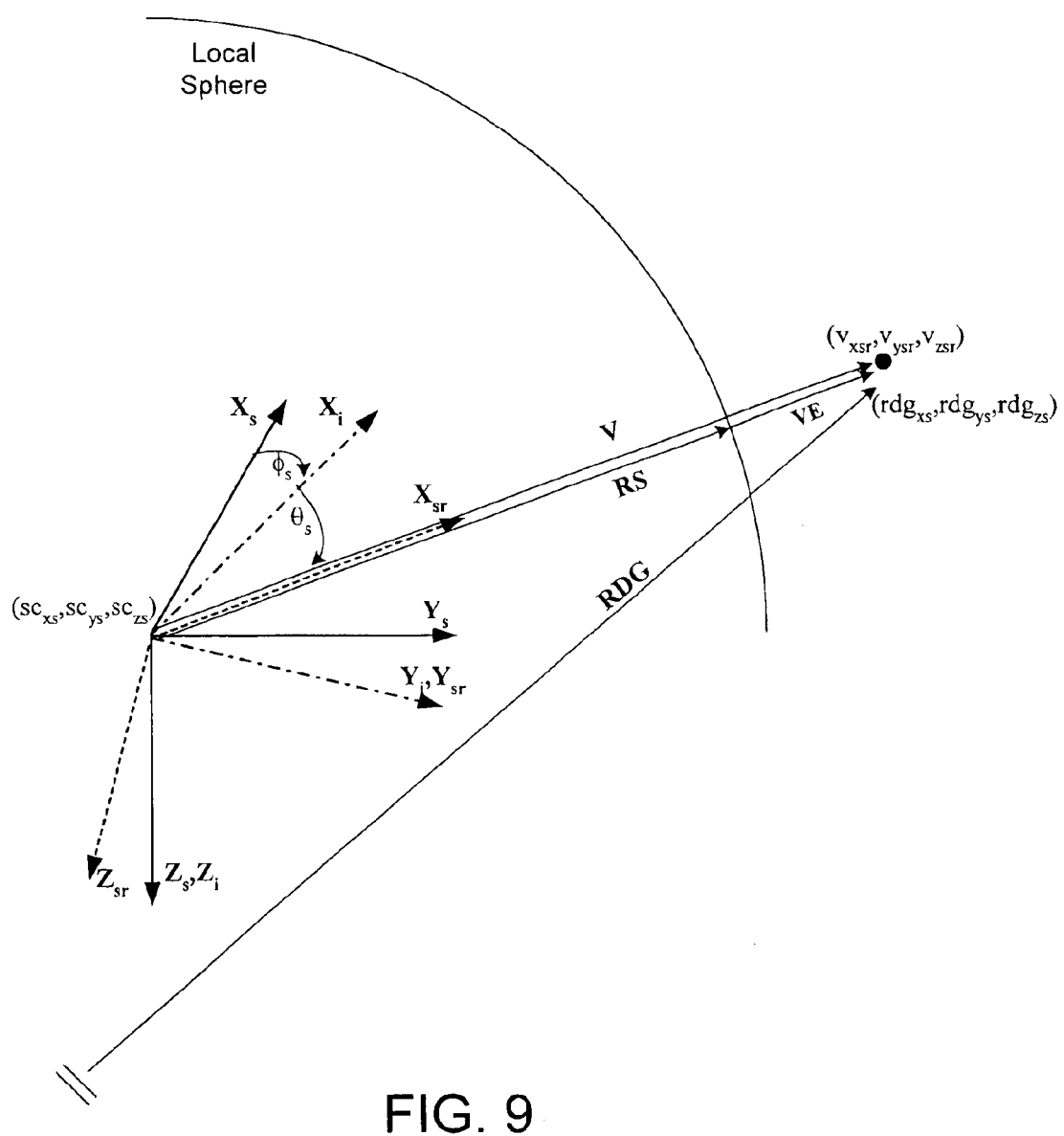
FIG. 9 is a graph of a local sphere as sensed by the compass relative to various coordinate axes.
Figure 10:
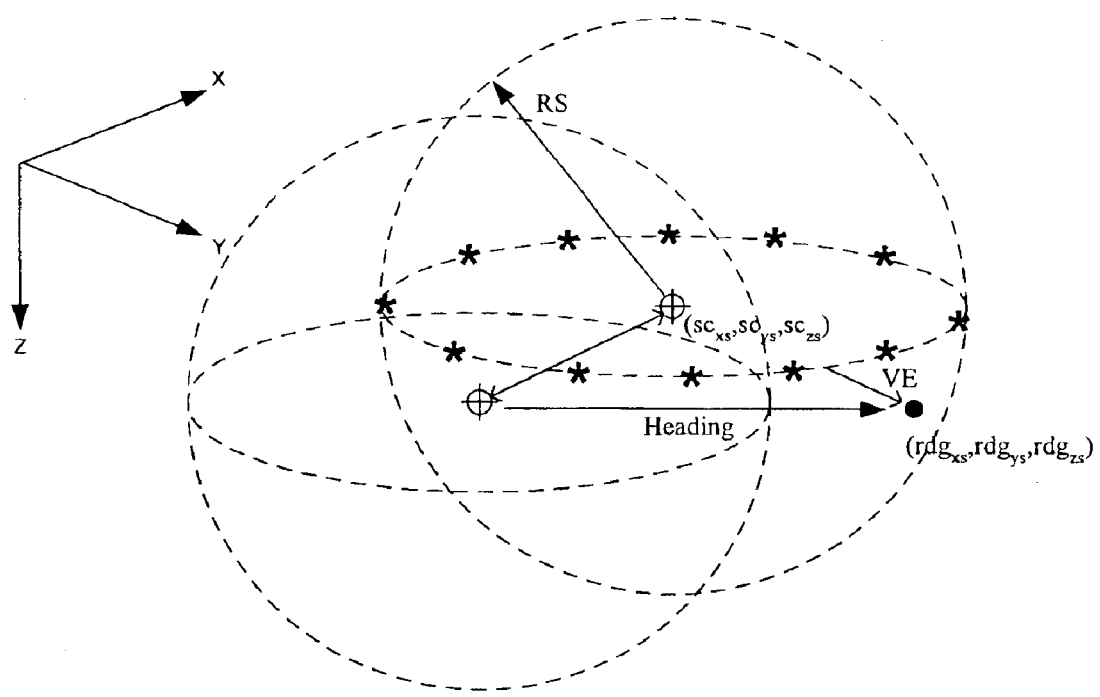
FIG. 10 is a graph of a sample data set plotted relative to a local sphere as sensed by the compass.

To calculate the error vector for a newMagPoint, one takes the magnetometer reading of the field strength RDG (or newMagPoint in the flow diagrams) shown in FIG. 9, $$RDG=(rdg_{xs},rdg_{ys},rdg_{zs})=\text{newMagPoint}$$

and the field strength at the center of the approximating sphere $$SC=(sc_{xs},sc_{ys},sc_{zs})$$

to find the vector V.

$$V=RDG-SC=(v_{xs},v_{ys},v_{zs})$$

The vector V is then rotated about the $Z_s$-axis giving the new coordinate space $X_i,Y_i,Z_i$ $$\phi_s=\arctan(v_{ys}/v_{xs})$$

$$v_{xi}=v_{xs}\times\cos(\phi_s)+v_{ys}\times\sin(\phi_s)$$

Then rotate about the $Z_i$-axis giving new coordinate space $X_{sr}, Y_{sr}, Z_{sr}$ $$\theta_s = \arctan(v_{zs}/v_{xi})$$

$$v_{xsr} = v_{xi} \times \cos(\theta_s) + v_{zs} \times \sin(\theta_s), v_{ysr} = 0, v_{zsr} = 0$$

The resulting term $v_{xsr}$ is the magnitude of vector V. The error vector VE is defined as $$VE = V - RS$$

To determine the magnitude of the error vector VE, subtract the magnitude of the approximating sphere from the magnitude of vector V.

$$ve_{xsr} = v_{xsr} - rs_{xsr}$$

Finally, the individual components of the error vector are determined by performing a rotation back to coordinate space $X_s, Y_s, Z_s$ $$ve_{xs} = ve_{xsr} \times \cos(\theta_s) \times \cos(\phi_s)$$

$$ve_{ys} = ve_{xsr} \times \cos(\theta_s) \times \sin(\phi_s)$$

$$ve_{zs} = ve_{xsr} \times \sin(\phi_s)$$

As will be apparent to those skilled in the art, the AdjustBestFitPoint subroutine 284 and the AdjustBestFitRadius subroutine 290 adjust the approximation center point data based upon an error metric to iteratively determine the best fit of an approximating geometric pattern (in this case a sphere) with respect to the data points attained. Then, returning after the execution of these two subroutines to step 300 in FIG. 12B, in which the currently calculated approximation center point and radius are stored in NVM 112 in a manner so as to overwrite the previously stored approximation data, the process then proceeds to step 302 where the processing circuit enters the LEARN state.

Figure 17:
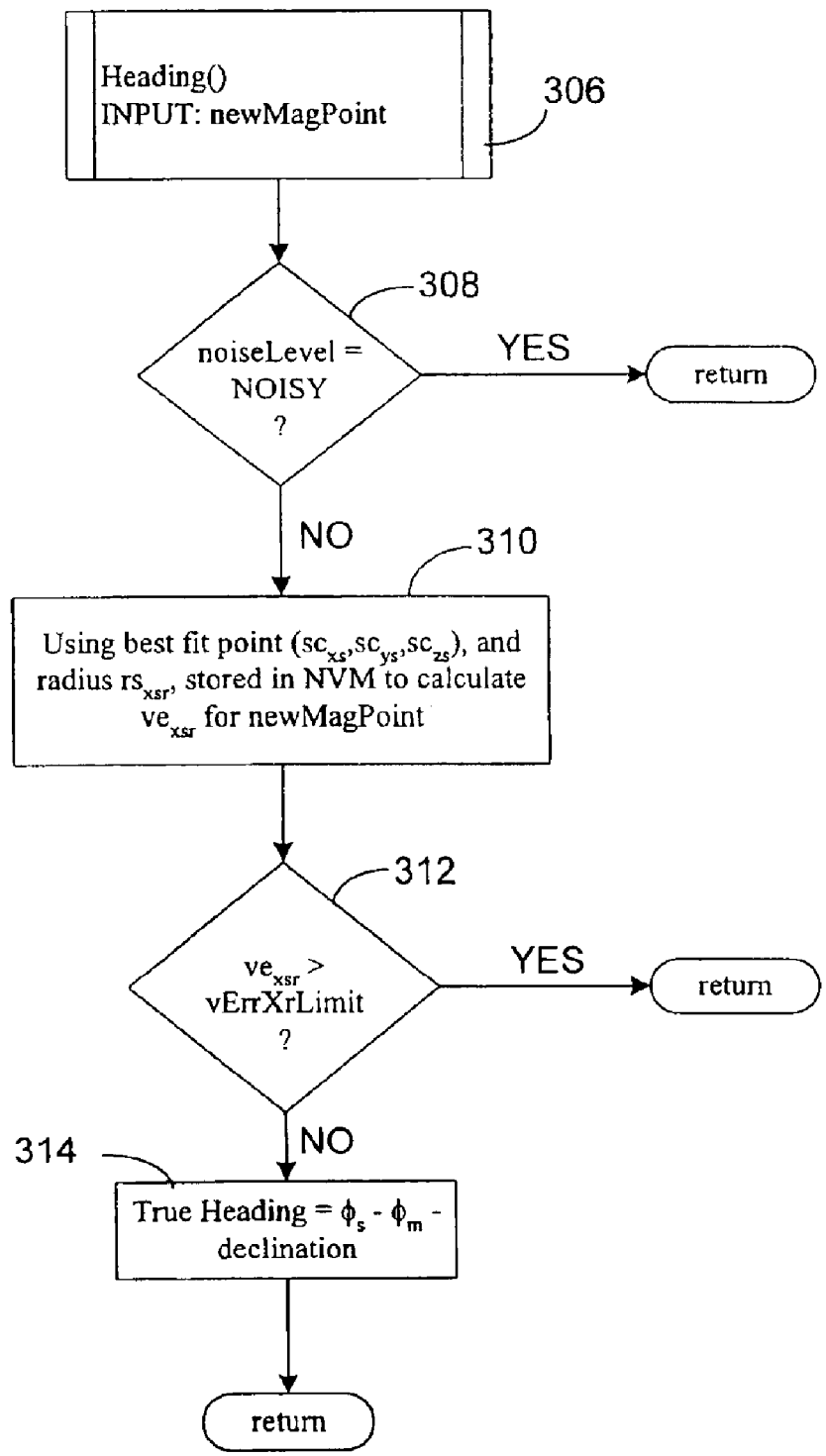
FIG. 17 is a flow chart of a heading calculating subroutine called during the compass flow control routine of FIGS. 12A–12D.

Following step 302, the processing circuit then executes in step 304 to call the Heading subroutine 306, which is illustrated in FIG. 17. The Heading subroutine 306 has as an input the value presently stored in newMagPoint, which is generated by the NoiseAnalysis subroutine 204. The processing circuit then determines in step 308 whether the value noiseLevel is set equal to NOISY. If so, the processing circuit exits the Heading subroutine and returns to step 200 of the CompassFlowControl routine where a new rawMagPoint is attained.

If the processing circuit determines that the noiseLevel is not set to NOISY in step 308 (i.e., it is either QUIET or SILENT), the processing circuit executes step 310 in which the approximation center point ($sc_{xs}$, $sc_{ys}$, $sc_{zs}$) and the radius $rs_{xsr}$, which are stored in NVM 112, are used to calculate the heading angle $\phi_s$, $ve_{xsr}$, and error vector ($ve_{xs}$, $ve_{ys}$, $ve_{zs}$) for the newMagPoint. The method used to determine these values are as described previously with the exception that the approximation center point stored in NVM 112 is used in place of the current approximation center point.

Then, in step 312, the processing circuit determines whether the value $ve_{xsr}$ as calculated for newMagPoint exceeds the variable vErrXrLimit, which was previously set in step 296 of AdjustBestFitRadius subroutine 290 (FIG. 16). If the value of $ve_{xsr}$ exceeds this limit, the process returns to step 200 in FIG. 12A without displaying a heading. Otherwise, if this error vector is sufficiently small, the processing circuit computes the True Heading in step 314. The True Heading is equal to $\phi_s - \phi_m - D$ (if the magnetic sensors are mounted in mirror housing 144), where $\phi_m$ is the mirror rotation angle (FIG. 7) and D is the declination angle discussed above with respect to FIGS. 8 through 10.

After executing the Heading subroutine 306 following the call in step 304, the process returns to step 200 with the processing circuit now in the LEARN state as set in step 302. The routine will again attain a new rawMagPoint in step 200 and perform NoiseAnalysis subroutine 204 as previously performed with respect to each new rawMagPoint. Then, the processing circuit will determine in step 240 that it is no longer in the POWER_ON state and also in step 318 that it is not in the APPROXIMATE state. Then, it will determine in step 320 that it is not in the INITIALIZE state, in which event it will determine in step 322 whether it is in the LEARN state. If the processing circuit is in the LEARN state, it will then proceed to step 350 (FIG. 12C) otherwise it would be in the LOCK state in which case it would proceed to step 470 in FIG. 12D.

In the event that the vehicle ignition is turned off while the vehicle is in the LEARN state or in any other state, the processing circuit will initially enter the POWER_ON state when power is restored via turning on the vehicle ignition. The processing circuit would begin with step 200 and proceed to step 240 in which case it would determine that it was in fact in the POWER_ON state and would proceed to step 242. Now, assuming that a valid radius $rs_{xsr}$ is stored in NVM 112, the processing circuit will proceed to step 324 where it will set the state to the INITIALIZE state prior to proceeding to step 326. In step 326, the approximation center point ($sc_{xs}$, $sc_{ys}$, $sc_{zs}$) is retrieved along with radius $rs_{xsr}$ from NVM 112 and is used as the current approximation center point and radius. The process then proceeds to step 328 shown in FIG. 12B.

In step 328, the processing circuit determines whether the variable noiseLevel is SILENT. If not, the processing circuit calls the Heading subroutine 306 in step 330, returns to step 200 to process a new rawMagPoint, and then proceeds to step 240 where it determines that it is no longer in the POWER_ON state. In this case, it will proceed through step 318 where it determines it is not in the APPROXIMATE state onto step 320 where it will determine that it is in the INITIALIZE state. The process then returns to step 328. This loop continues until such time that noiseLevel is SILENT. If the noiseLevel is SILENT, step 332 is executed whereby the subroutine BuildPointSetDistance 250 is called. The BuildPointSetDistance subroutine 250 is then continuously executed and the Heading subroutine called (step 330) as long as the noiseLevel is SILENT until such time that numPoints is greater than or equal to the constant MINFIT_POINTS (step 334). The execution of BuildPointSetDistance is necessary since all the values in the PointSet are cleared when the vehicle ignition is turned off. Clearing the values in PointSet each time the vehicle is turned off allows the compass system to quickly reapproximate in the event that a new driver subsequently enters the vehicle and shifts the position of the mirror housing 144 in which the magnetic sensors may be mounted.

Figure 18:
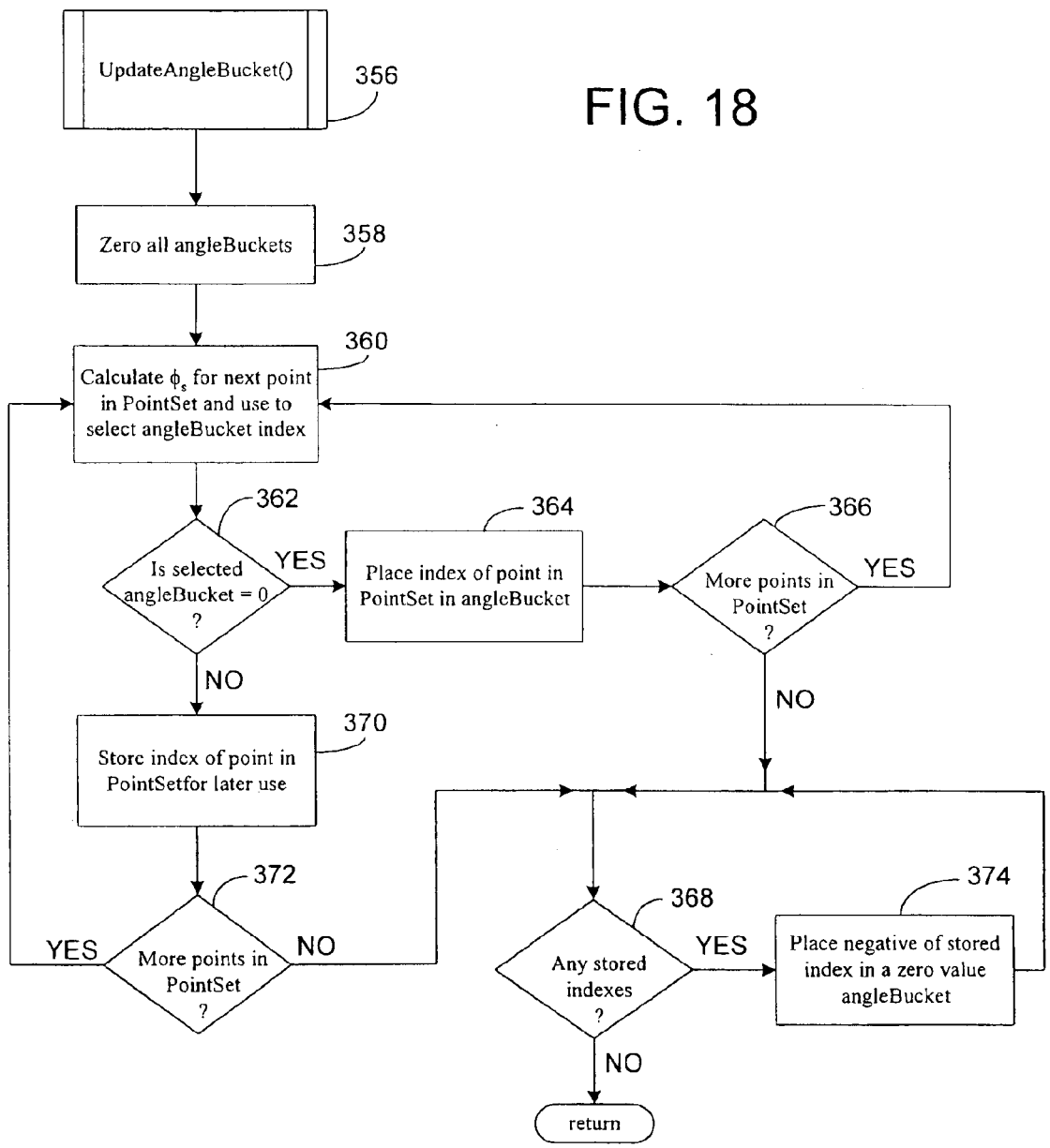
FIG. 18 is a flow chart of an angle bucket updating subroutine called during the compass flow control routine of FIGS. 12A–12D.

Once a sufficient number of points in the PointSet have been attained, the processing circuit proceeds to step 336 in which the AdjustBestFitPoint and AdjustBestFitRadius subroutines are called. Then, in step 338, the processing circuit calculates the difference between the current approximation center point ($sc_{xs}$, $sc_{ys}$, $sc_{zs}$) and the point currently stored in NVM 112. If the difference between these points exceeds the variable centerShiftLimit (step 340), which was set in step 296, the processing circuit sets the refitFlag to TRUE in step 342 prior to proceeding to execute step 300 in which the currently calculated approximation center point and radius are stored in NVM 112 in a manner so as to overwrite the previously stored approximation data. The process then proceeds to step 302 where the processing circuit enters the LEARN state. If, in step 340, the processing circuit determines that the difference between the approximation center point that was currently calculated and that which was previously stored in NVM 112 does not exceed the variable centerShiftLimit, the processing circuit advances to step 302 skipping steps 342 and 300. In step 302, the state is set to LEARN and the Heading subroutine is called in step 304. Following the Heading subroutine, the process returns to step 200 in the CompassFlowControl routine or a new rawMagPoint is attained and processed. Control then flows through step 322 where it is determined that the processing circuit is in the LEARN state. The processing circuit then proceeds to step 350 (FIG. 12C) where it determines whether the value noiseLevel is SILENT. If not, the Heading subroutine is called in step 352 where the vehicle heading would be updated if the noiseLevel is QUIET, otherwise the heading would not be updated and the routine would return to step 200 to process a new rawMagPoint and subsequent rawMagPoints until such time that noiseLevel is SILENT. Once noiseLevel is silent, the processing circuit executes step 354 in which it calls the UpdateAngleBucket subroutine 356, which is illustrated in FIG. 18.

The UpdateAngleBucket subroutine 356 serves the purpose of establishing a number of angleBuckets corresponding in number to the total number of points in the PointSet, which is stored in the constant TOTAL_POINTS. When the total number of points is twelve, for example, there are twelve angleBuckets, each corresponding to mutually exclusive 30° segments of a 360° circle. The angleBuckets are designated as a linear array in the form angleBucket[1] through angleBucket[TOTAL_POINTS]. Thus, for example, angleBucket[1] will correspond to angles of 0° through 29°, angleBucket[2] will correspond to angles 30° through 59°, etc. The more angleBuckets there are, the smaller the angular range to which the angleBucket corresponds. Conversely, the fewer angleBuckets, the larger the angular range that is associated with each angleBucket. The values stored in the angleBucket array correspond to the index of an associated Point[index] stored in the PointSet. If a "0" is stored in an angleBucket, this designates that there is no associated point in the PointSet stored in this particular angleBucket. As will be described further below, if there is a negative value stored in an angleBucket, this means that the Point[index] in the PointSet whose index corresponds to the absolute value of the negative number stored in the angleBucket, has an angle that is associated with a different angleBucket, but that different angleBucket is already full. Note that there is only one point allowed to be associated with any one angleBucket. This is to ensure that the points are adequately spaced about the circumference of the approximating circle. The objective is to fill each of the angleBuckets with a different and single point in the PointSet where each angleBucket has a positive value.

The heading angle $\phi_s$ associated with each sensor data point in the current sample PointSet is preferably used to arrange these points in order beginning with the point having the smallest associated heading angle and ending with the point having the largest associated heading angle. Angles should be figured modulo 360° with angular increments which include 0° treated as they normally would be with compass readings. Other units such as radians or custom units may be used to express the angular measurements.

Figure 12C:
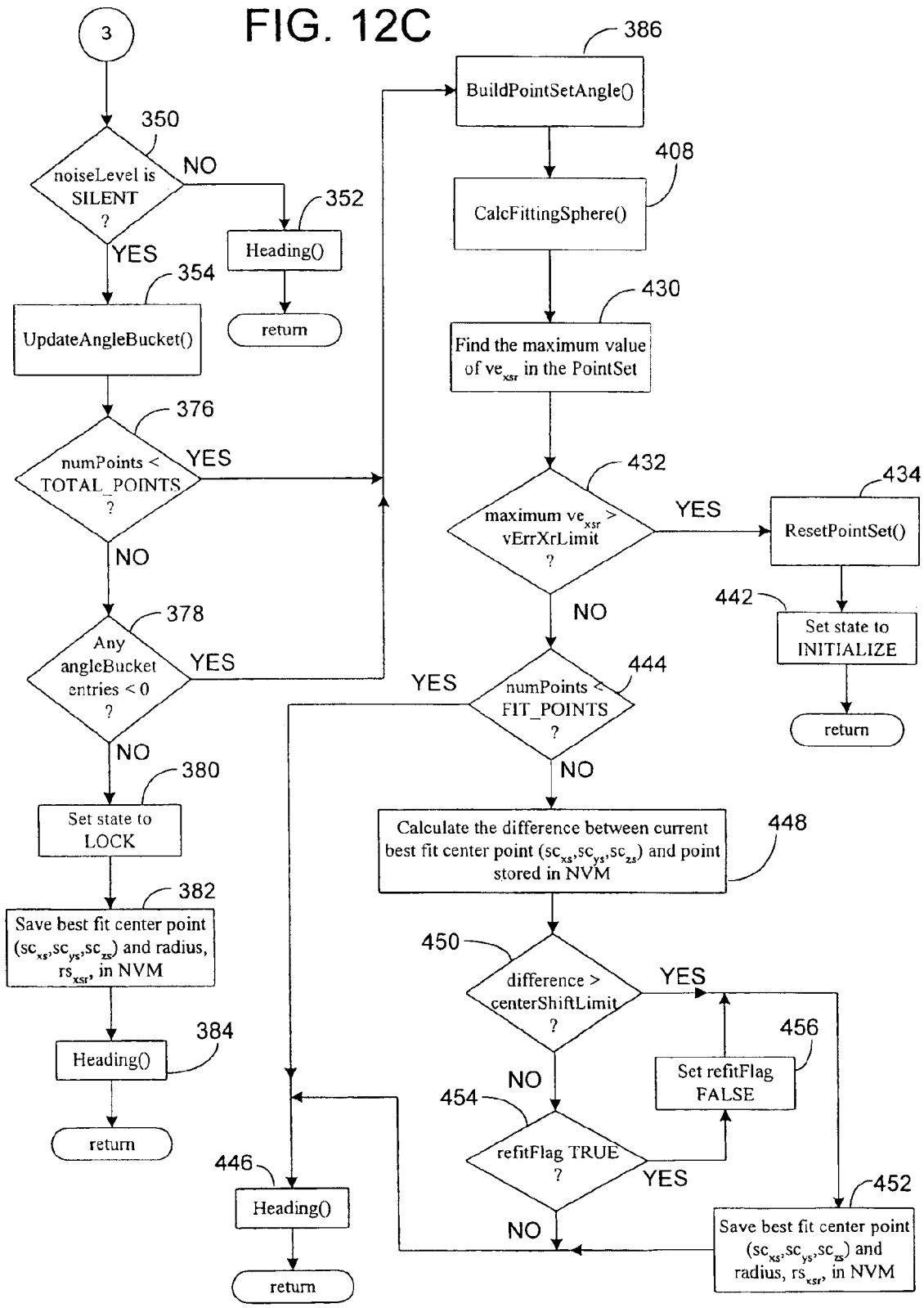
Figure 12D:
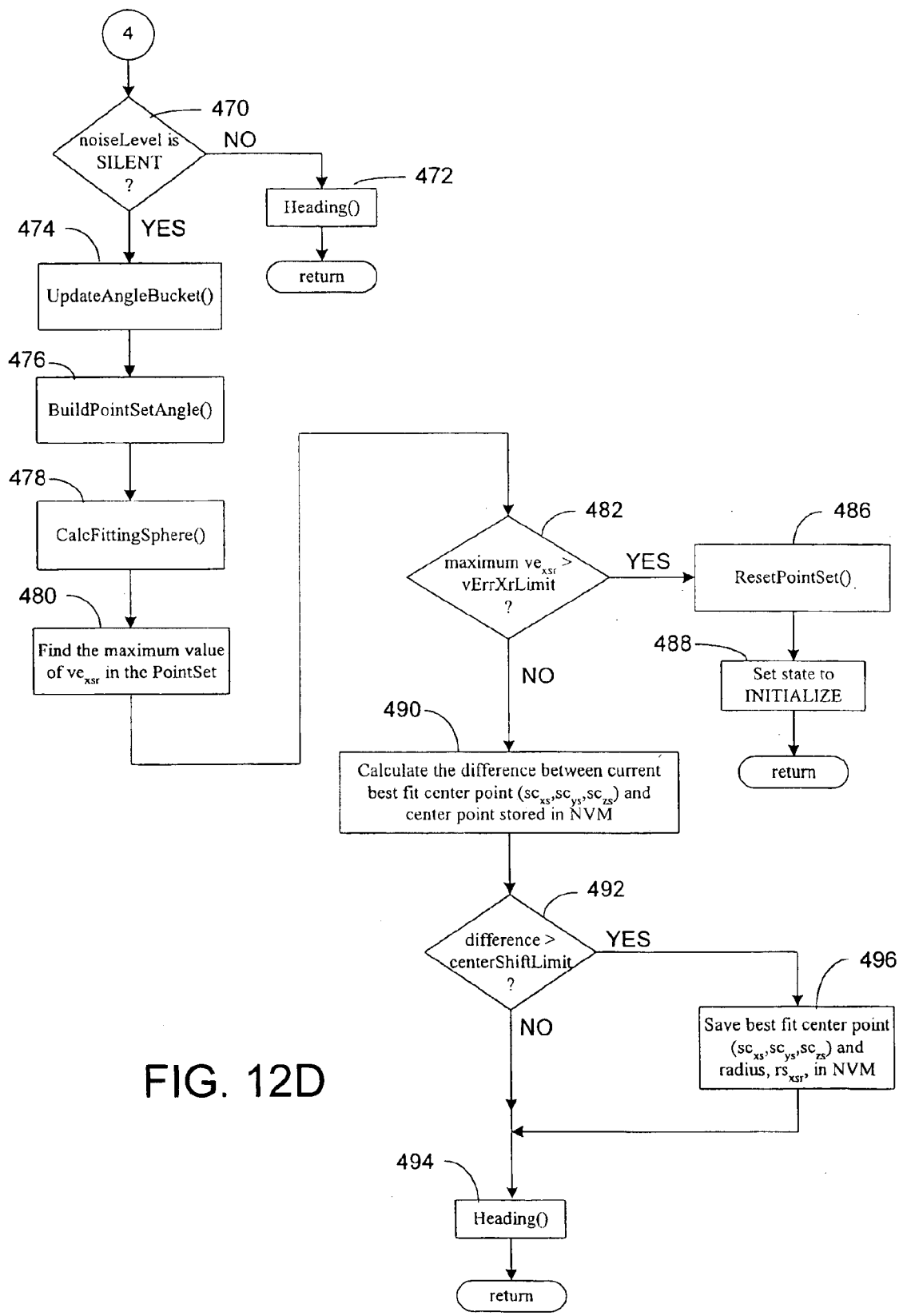

The first step in the UpdateAngleBucket subroutine 356 is to zero all the angleBuckets (step 358). This allows the angleBuckets to be freshly reassigned points in the PointSet. Then, in step 360, the angle $\phi_s$ is calculated for the first point in the PointSet (i.e., Point[1]) and the value of $\phi_s$ is used to identify to which angleBucket this point corresponds. Then in step 362, the processing circuit determines whether the selected angle bucket has a value of "0". If it does, the index of the point in the PointSet is stored in this angleBucket (step 364). For example, if the first point is Point[1], then the index value "1" is stored in the selected angleBucket. Then, in step 366, it is determined whether or not there are any more points in the PointSet to be assigned to an angleBucket. If so, processing circuit 110 calculates $\phi_s$ for the next point in the PointSet and uses this angle to select a corresponding angleBucket (step 360). If the selected angleBucket has a value "0" stored therein, the process again proceeds to step 364 where the index of the point in the PointSet is stored in the selected angleBucket. This process continues until the processing circuit determines in step 366 that there are no more points in the PointSet to assign. In this case, the processing circuit then executes step 368 to determine whether there are any stored indexes from step 370. If not, the UpdateAngleBucket subroutine 356 is completed and the process returns to step 376 (FIG. 12C).

In the UpdateAngleBucket subroutine 356, if a point in the PointSet selected in step 360 has an angle $\phi_s$ such that the selected angleBucket was previously selected for another point, the value in the angleBucket would no longer be "0" and this would be determined in step 362 such that the processing circuit would then advance to step 370 where it would store the index of the most recently selected point in the PointSet for later use in steps 368 and 374. The routine would then continue to look for more points in the PointSet in step 372 while accumulating additional indexes of any points that correspond to an already assigned angleBucket. Then, once all the points have been assigned, the process continues to step 368 where it is determined whether there are any stored indexes, which would have occurred in step 370. If yes, the processing circuit places a negative of the stored index in an angleBucket otherwise having a zero value. Thus, for example, if Point[2] had already been assigned to angleBucket[5], angleBucket[5] would have the value "2" stored therein. Then, if Point[7] had an angle $\phi_s$ that corresponded to the angular range of angleBucket[5], which already stored a value "2," the process would store in step 370 the index "7", which would be identified in step 368. The process would then place a "−7" in one of the unused angleBuckets whose value is "0". Note that there would always be an angleBucket having a value of "0" because the number of angleBuckets corresponds to the maximum number of points that may be in the PointSet. The significance of the negative index number in a non-corresponding angleBucket will be discussed further below. Once all the points in the PointSet have been assigned in some manner to an angleBucket, the process returns to step 376 in FIG. 12C.

In step 376, it is determined whether the present value of numPoints is less than TOTAL_POINTS. If numPoints is equal to TOTAL_POINTS, the process proceeds to step 378 in which a determination is made as to whether or not there are any angleBucket entries that are less than zero (i.e., any negative entries). If not, the process proceeds to step 380 where the processing circuit is set into the LOCK state. The approximation center point and radius are then stored in NVM 112 (step 382) and the Heading subroutine is called in step 384. The process then returns to step 200 (FIG. 12A).

Figure 19:
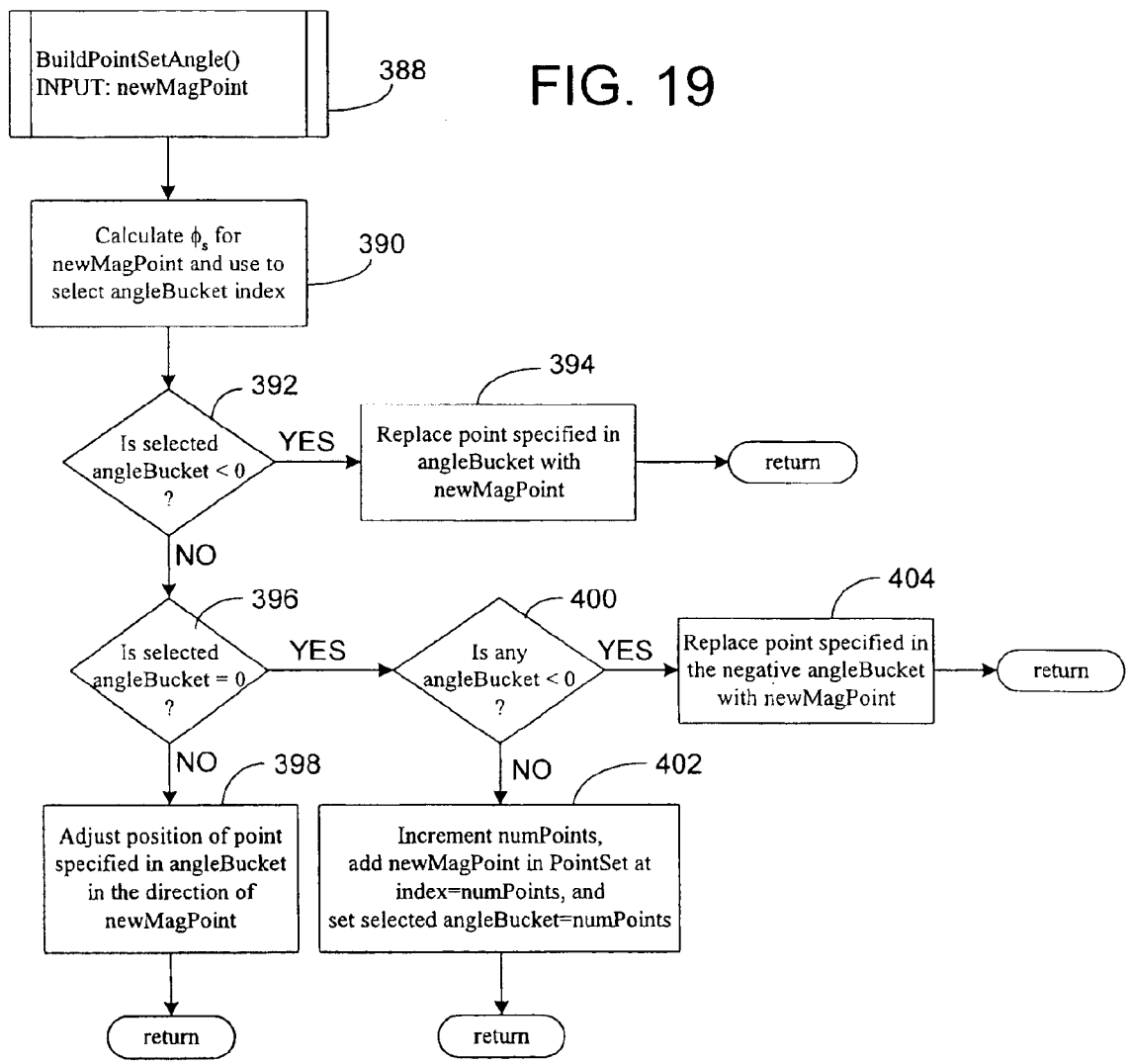
FIG. 19 is a flow chart of a second point set building subroutine called during the compass flow control routine of FIGS. 12A–12D.

If in step 376 it is determined that numPoints is less than TOTAL_POINTS or in step 378 that there are any negative values stored in any angleBuckets, the processing circuit proceeds to step 386 where the BuildPointSetAngle subroutine 388 is called, which is shown in FIG. 19.

The BuildPointSetAngle subroutine 388 is called after the UpdateAngleBucket subroutine 356 has been executed. The BuildPointSetAngle subroutine 388, however, utilizes as an input the newMagPoint most recently attained whereas the UpdateAngleBucket subroutine only utilizes those points that are stored in the PointSet. The purpose of the BuildPointSetAngle subroutine is to assign the newMagPoint to a point in the PointSet where possible and to assign the new point to an angleBucket. This process begins in step 390 where the angle $\phi_s$ is calculated for the newMagPoint and is used to select an angleBucket having an angle range within which the angle $\phi_s$ falls. In step 392, it is determined whether the selected angleBucket has a negative value stored therein. If so, the processing circuit identifies which point in the PointSet is associated with that angleBucket by looking at the absolute value of the value stored in that angleBucket, and replaces the X, Y, and Z values for the points stored in that point of the PointSet with the X, Y, and Z values of newMagPoint (step 394). The processing circuit further will store a positive value of the index of that replaced point in the selected angleBucket so that newMagPoint is now associated in that particular angleBucket. The process would then return to step 408 in FIG. 12C. If the selected angleBucket is determined in step 392 to not have a negative value, a determination is made in step 396 whether the selected angleBucket is equal to zero. If it is not equal to zero, meaning that another point had already been assigned to that angleBucket, the position of the point in the PointSet specified in the angleBucket is adjusted in the direction of newMagPoint (step 398) in the manner described above with respect to step 270 of the BuildPointSetDistance subroutine 250 (FIG. 14). Otherwise, if the selected angleBucket is equal to zero, the processing circuit determines in step 400 whether any angleBucket has a negative value. If not, the value of numPoints is incremented, newMagPoint is added to the PointSet at the index numPoints, and the selected angleBucket is set to the value of numPoints so that the newMagPoint is now associated with the selected angleBucket (step 402).

Figure 20:
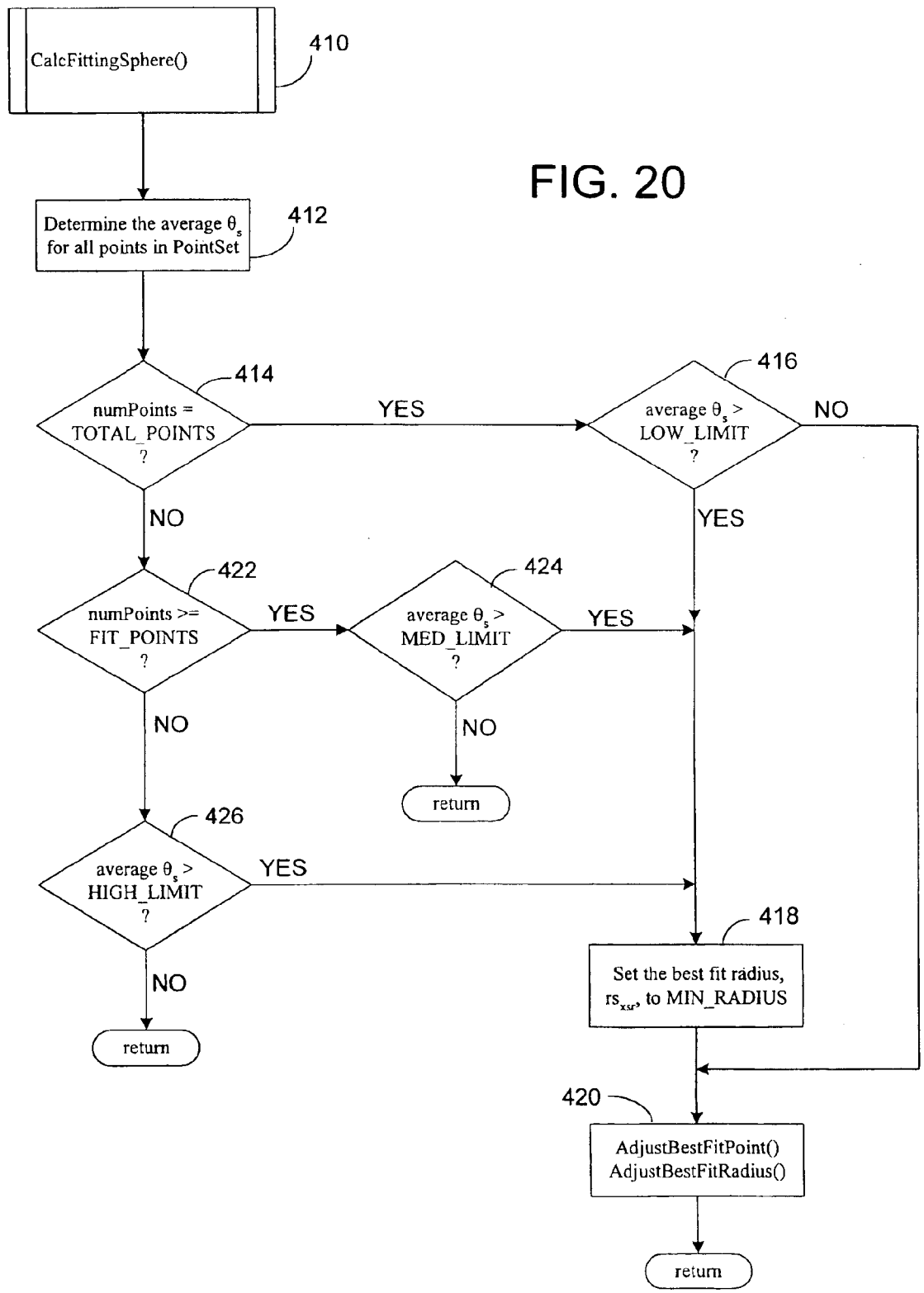
FIG. 20 is a flow chart of a local sphere fit calculating subroutine called during the compass flow control routine of FIGS. 12A–12D.

If in step 400 the processing circuit determines that there are some angleBuckets with a negative index stored therein, it executes step 404 in which the point in the PointSet identified by the absolute value of the negative index stored in an angleBucket and the newMagPoint data is written over any data previously stored in that identified point in the PointSet, and the index of that overwritten point is then stored in the selected angleBucket that previously had a value "0." The angleBucket that had the negative index is then assigned a value "0." The process then returns to the flow shown in FIG. 12C at step 408, which is a call to the CalcFittingSphere subroutine 410, which is shown in FIG. 20.

The first step in this subroutine is to determine the average $\theta_s$ for all the points in the PointSet (step 412). The $\theta_s$ for each point in the PointSet is found by calculating $\theta_s$=arctan $(v_{zs}/v_{xi})$ for each point in the PointSet. It should be remembered that the $\theta_s$ angle represents the deviation from the X, Y plane of the sensor coordinates. Variation of the $\theta_s$ angle will be null when the X, Y plane is parallel with the surface of the Earth. Any tilt of the X, Y plane will result in $\theta_s$ variation. Ideally, the circle formed by the points in the PointSet should all fall within a plane as close as possible to the X, Y plane. In reality, however, each point may have a different Z component as sensed by Z sensing element 108, thus providing a different $\theta_s$ value.

After computing the average $\phi_s$ for all the points in the PointSet in step 412, the processing circuit determines whether numPoints is equal to TOTAL_POINTS in step 414. If so, the average $\theta_s$ value is compared to a value LOW_LIMIT in step 416. If average $\theta_s$ does not exceed a LOW_LIMIT, the process proceeds to step 420 where the AdjustBestFitPoint and AdjustBestFitRadius subroutines are called before returning to step 430 (FIG. 12C). Otherwise, the process proceeds to step 418 where the approximation radius $rs_{sr}$ is set to the constant MIN_RADIUS. Subsequently, in step 420, the AdjustBestFitPoint subroutine is called and then the process returns to step 430 in FIG. 12C.

If the value of numPoints is not equal to TOTAL_POINTS in step 414, the processing circuit determines whether the value of numPoints is greater than or equal to a value FIT_POINTS in step 422, which may, for example, be eight when the value of TOTAL_POINTS is twelve. If the value of numPoints is greater than or equal to FIT_POINTS, the processing circuit determines whether the average of $\theta_s$ is greater than a value MED_LIMIT in step 424. If not, the process returns to step 430 in FIG. 12C, otherwise the process proceeds to step 418 where it sets the approximation radius $rs_{xsr}$ to MIN_RADIUS and calls the AdjustBestFitPoint and AdjustBestFitRadius subroutines in step 420 prior to returning to step 430. If the value of numPoints is not equal to TOTAL_POINTS and does not exceed FIT_POINTS, the processing circuit determines in step 426 whether the average $\theta_s$ exceeds the value HIGH_LIMIT. If the average $\theta_s$ does not exceed HIGH_LIMIT, the process proceeds to step 430 in FIG. 12C, otherwise it first executes steps 418 and 420 before returning. As will be apparent to those skilled in the art, different limits for the average $\theta_s$ are applied depending upon the number of points in the PointSet. The more points, the lower the limit permitted. In this case, the radius of the sphere is too large since the points of the PointSet form a ring spaced too far away from the equator of the sphere (i.e., the radius of the sphere is larger than that of the circle of points in the PointSet). By reducing the radius of the sphere to MIN_RADIUS, the circular radius of the circle of points will then fit within the circle of points on the sphere and the size of the sphere is reduced. The smaller the sphere, the more likely the points of the PointSet will fall near the equator of the sphere, which is desirable. Subsequently, the AdjustBestFitPoint and AdjustBestFitRadius subroutines will move the radius and center back out to the circle of points if it is not already there. The different limits used in steps 416, 424, and 426 may, for example, be LOW_LIMIT=5°, MED_LIMIT=10°, and HIGH_LIMIT=20°.

Referring back to FIG. 12C, in step 430, the processing circuit finds the maximum value of $ve_{xsr}$ in the PointSet. If the maximum $ve_{xsr}$ exceeds vErrXrLimit (step 432), the processing circuit calls the ResetPointSet subroutine 436 in step 434. The ResetPointSet subroutine 436 is shown in FIG. 21 and begins with a step 438 in which the refitFlag is set equal to TRUE. Then, in step 440, each of the points in the PointSet is reset to zero. The process then returns to step 442 in FIG. 12C where the state of the processing circuit is set to INITIALIZE and the process returns to step 200 to begin reaccumulating points for the PointSet.

If the maximum $ve_{xsr}$ does not exceed the limit in step 432, the processing circuit determines whether the value of numPoints is less than FIT_POINTS in step 444. If numPoints is less than FIT_POINTS, the Heading subroutine is called in step 446 prior to returning to step 200 in FIG. 12A. If, however, numPoints is equal to or greater than FIT_POINTS, the processing circuit calculates in step 448 the difference between the current approximation center point ($sc_{xs}$, $sc_{ys}$, $sc_{zs}$) and the approximation center point presently stored in NVM 112. If the difference is greater than centerShiftLimit (step 450), the processing circuit proceeds to step 452 where it saves the most recent approximation center point and radius in NVM 112 by overwriting the prior approximation data prior to executing the Heading subroutine in step 446 and then returning to step 200.

If the difference between the approximation center points does not exceed centerShiftLimit, the processing circuit checks in step 454 whether refitFlag is set to TRUE. If not, the process flows to step 446 where the Heading subroutine is called prior to returning to step 200. Otherwise, if the refitFlag is TRUE, the refitFlag is then set to FALSE in step 456 and the approximation center point most recently attained, as well as the radius, is written over the approximation data in NVM 112 in step 454. Again, following step 452, the Heading subroutine 446 is called prior to returning back to step 200.

If the processing circuit is set in the LOCK state, this will be determined in flowing through the CompassFlowControl routine 200 shown in FIG. 12A when it does not respond positively to a determination of whether it is in any of the other states. Thus, the process would proceed to step 470 in FIG. 12D in which a determination is made whether the noiseLevel is SILENT. If not, the process calls the Heading subroutine in step 472 prior to returning to step 200 in FIG. 12A. This would continue until such time that the noiseLevel is SILENT, in which event step 474 would be executed in which the UpdateAngleBucket subroutine 356 would be called. Subsequently, the BuildPointSetAngle subroutine 388 would be called in step 476 and then the CalcFittingSphere subroutine 410 would be called in step 478. Once again, the maximum value of $ve_{xsr}$ for the points in the PointSet would be determined in step 480 and the maximum $ve_{xsr}$ would be compared to vErrXrLimit in step 482. If the maximum $ve_{xsr}$ exceeds this limit, the processing circuit would proceed to step 486 where it would call the ResetPointSet subroutine 436 and subsequently enter the INITIALIZE state in step 488 prior to proceeding back to step 200 in FIG. 12A.

If the maximum $ve_{xsr}$ does not exceed the limit in step 482, the processing circuit executes step 490 in which it calculates the difference between the current approximation center point and the approximation center point presently stored in NVM 112. If the difference between these points exceeds the centerShiftLimit in step 492, the most recent approximation center point and radius are stored in NVM 112 in place of the prior approximation data (step 496) prior to executing the Heading subroutine in step 494 and then returning to step 200. If the difference between approximation center points does not exceed centerShiftLimit, step 496 is bypassed and the Heading subroutine is called in step 494 prior to proceeding back to step 200.

While the electronic compass of the first embodiment of the present invention has generally been described as having three sensing elements, various aspects and combinations of aspects discussed above represent novel improvements to compass circuits having only two sensing elements. Therefore, the present invention is not limited to systems with three sensing elements.

The second embodiment of the present invention has several similarities to the first embodiment. For example, the same hardware may be utilized to implement both embodiments. The specific example of the second embodiment described below, however, differs insofar as it utilizes only the X- and Y-axis sensors and in that it plots out a two-dimensional approximating geometric pattern. Nevertheless, the second embodiment described below may be modified to incorporate a third sensor and/or to manipulate the sensor data in three dimensions.

Like the first embodiment, the second embodiment derives the vehicle heading utilizing an approximating geometric pattern, which is a best-fit pattern determined through several iterations. As data is obtained from the magnetic sensors, the data is first processed to determine whether the data point is stable. Stable data points are then processed to create a list of reference data points that are maintained in a reference list with the most recent reference data point on top. As older reference points are revisited, they are moved to the top of the list. Obsolete points are thus dropped out of the bottom of the stack as explained further below. The reference points are utilized to determine the best-fit geometric approximating pattern and hence the calibration point that is used to determine the vehicle heading. The approximating geometric pattern is calculated through the several iterations based upon the X and Y values of the reference points, an assumed radius R, and an elliptical constant K that is used to allow the approximating geometry to be either circular or elliptical. Once the best fit approximating pattern is determined (i.e., that pattern that provides the lowest error metric value), the error metric is utilized to determine a confidence level. The confidence level may additionally be determined based upon the number of reference points that are in the list, and the distance and/or time of vehicle travel. As explained further below, the confidence level is then utilized to set thresholds for determining whether the magnetic data point just read is sufficiently stable to be used as a reference point for subsequent calibration of the compass system. The confidence level may also be used to determine whether a stable magnetic data point may be added to the reference list or averaged with a point already on the list. The details of this process are described further below in reference to the remaining drawing figures.

Figure 22A:
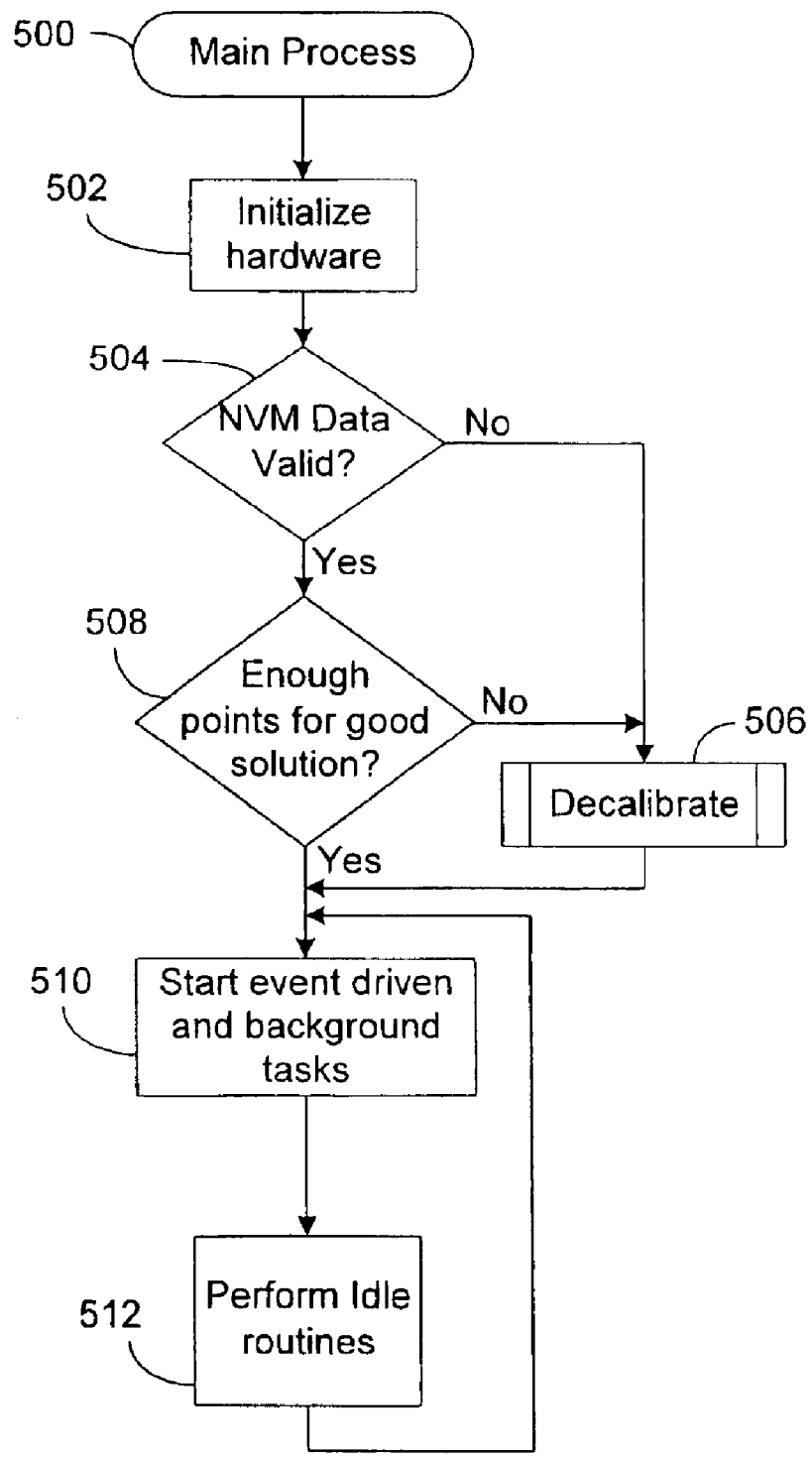
FIGS. 22A–22G are collectively a flowchart for a compass flow routine executed by the processing circuit of the electronic compass of the second embodiment of the present invention.

The main process flow diagram for the specific example of the second embodiment is shown in FIG. 22A. The main process 500 begins with step 502, in which the hardware is initialized. This includes initialization of I/O, memory, the magnetometer, and the display. Then in step 504, processing circuit 110 of compass circuit 100 (FIG. 3) determines whether the data stored in the nonvolatile memory (NVM) 112 is valid. If not (as would be the case upon initial startup in a new vehicle), the process flows to the decalibrate subroutine 506, which is described in detail below with respect to FIG. 22B. Otherwise, if there is valid data in NVM 112, processing circuit 110 determines whether there are enough reference points accumulated and stored for a good calibration solution (e.g., four or more reference points). If not, the decalibrate subroutine 506 is executed. Otherwise, the process proceeds to step 510 in which event driven and background tasks are started. When the process returns from the decalibrate routine 506, the process also flows to step 510. Event and background tasks that are performed during step 510 include a magnetic field processing task (FIG. 22C), stable point processing (FIG. 22D), and a display update task (FIG. 22E). These tasks are described further below.

Following execution of event driven and background tasks, processing circuit 110 proceeds to step 512 in which it performs any idle task or routines. Such idle tasks or routines are described below with respect to FIGS. 22F and 22G and include the process of identifying the best-fit geometric approximating pattern.

Steps 510 and 512 are continuously performed so long as the vehicle ignition remains on. Once the vehicle ignition is turned off, the process begins with step 502. Thus, the decalibrate subroutine 506 would only be performed following actuation of the vehicle ignition.

Figure 22B:
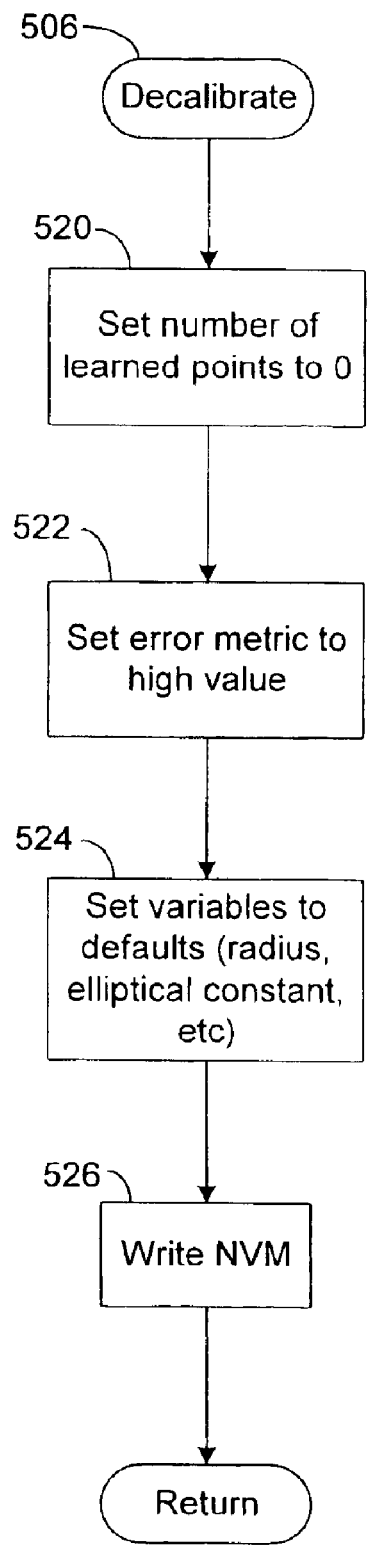

As shown in FIG. 22B, the decalibration subroutine 506 begins with step 520 in which the number of learned reference points is set to zero. This allows the newest calibration solution to be based on fresh reference points. This may be significant when the magnetic sensors are mounted in the mirror housing since a new driver may have entered the vehicle between ignition cycles and tilted or rotated the mirror housing. Another advantage would be to throw out transient data that may be obtained as the vehicle travels down the assembly line during manufacture.

Next, in step 522, processing circuit 110 sets the error metric to a high value. This is done to ensure that the confidence level is at a low level thereby lowering the threshold requirements for a magnetic data point to qualify as a reference point, which in turn more quickly populates the list of reference points that are used to calibrate the compass system.

In step 524, the processing circuit 110 sets variables to default levels, such as setting the assumed radius R and elliptical constant K to default values. In the preferred implementation, the radius is set to 200 mG and the elliptical constant is set to K=128. The manner in which these variables are utilized is described further below.

Then, in step 526, information is written to NVM 112. Such information may include the present values of the radius and elliptical constant and may also include the number of data points and the error metric value. Subsequently, the decalibration routine 506 is completed and the process returns to step 510 of main process 500 shown in FIG. 22A.

Figure 22C:
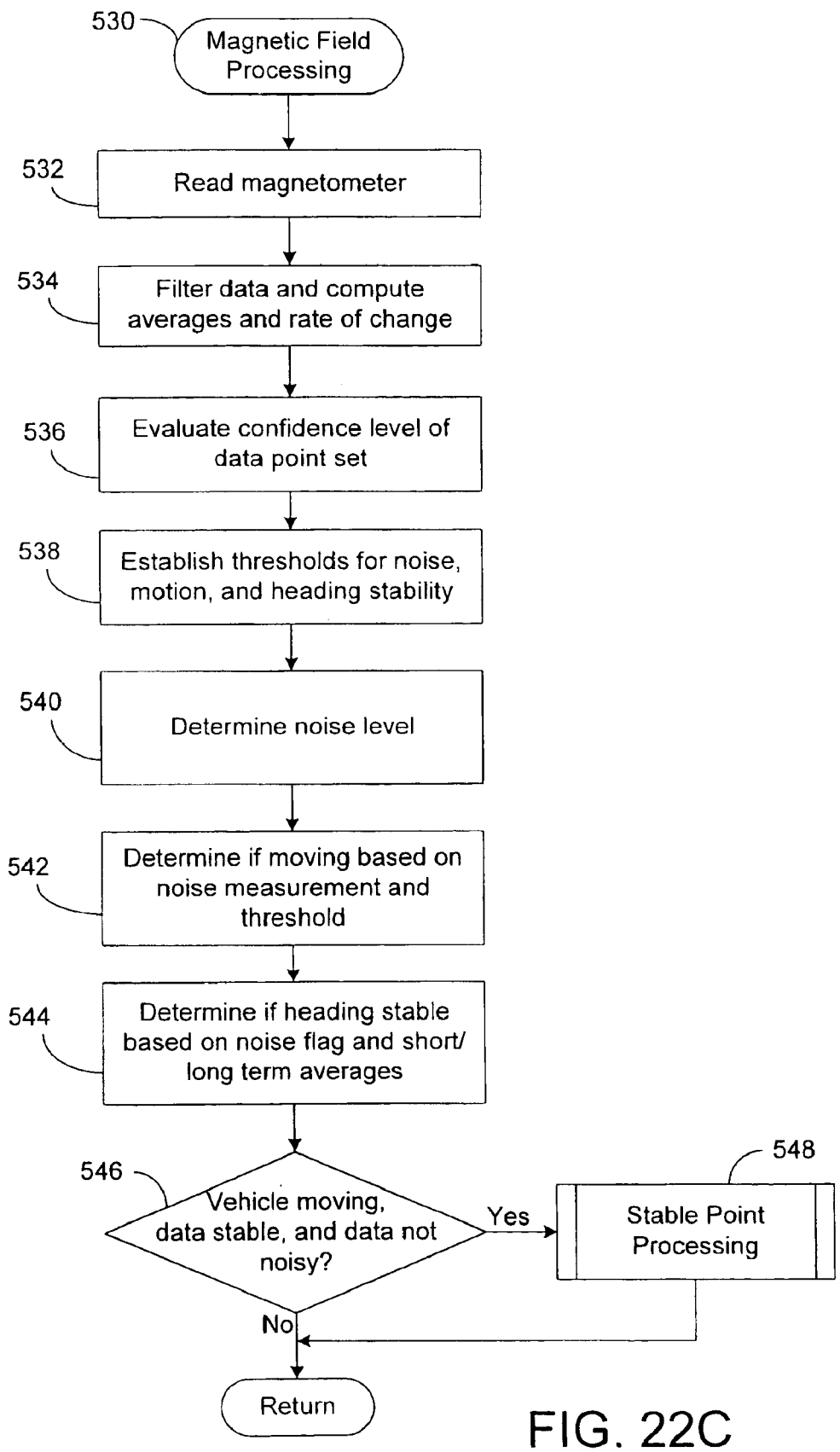

As noted above, one of the event driven and background tasks that are executed in step 510 of main process 500 includes magnetic field processing task 530, which is illustrated in FIG. 22C. The magnetic field processing task 530 is executed at a periodic sampling rate of, for example, between 4 and 20 Hz. As shown, the first step in such processing is to read the data from the magnetometer sensors 532. This raw data is then filtered and then averages for the x and y values and second derivatives are calculated in step 534. Specifically, in this process, the filtered values ($x_f$ and $y_f$) of raw data x and y are calculated as follows:

$$x_f=(x+x_{avg})/2$$

$$y_f=(y+y_{avg})/2$$

where $x_{avg}$ and $y_{avg}$ in the above two equations are the previously computed running weighted averages that are computed as follows:

$$x_{avg}=(x_f+x_{avg}*6)/7$$

$$y_{avg}=(y_f+y_{avg}*6)/7$$

Then, the new first derivatives $dx_{new}$ and $dy_{new}$ are calculated as:

$$dx_{new}=x_f-x_{avg}$$

$$dy_{new}=y_f-y_{avg}$$

The second derivatives $d^2x$ and $d^2y$ are thus calculated:

$$d^2x=dx_{new}-dx_{prev}$$

$$d^2y=dy_{new}-dy_{prev}$$

where $dx_{prev}$ and $dy_{prev}$ are the previously computed first derivatives. Once the above calculations are completed, the values of $dx_{new}$ and $dy_{new}$ are then stored in $dx_{prev}$ and $dy_{prev}$, respectively, and the average values $x_{avg}$ and $y_{avg}$ are updated to incorporate the new filtered data point using the above equations.

Then, in step 536, processing circuit 110 evaluates the confidence level of the existing reference data point set. As stated above, the confidence level is determined as a function of the error metric, the number of data points in the reference data point set, and may also be a function of the distance traveled and/or time of vehicle travel. More specifically, processing circuit 110 sets the confidence level to LOW if either the number of reference points in the reference list are less than or equal to a specified number (e.g., 4 points) or the average error is greater than a first threshold (e.g., 8000). The average error is a measure of how well the approximating geometric pattern fits the current data set, and is described in more detail below in connection with FIG. 22G. If neither of the two conditions is met for assigning a LOW confidence level, processing circuit 110 determines whether the number of reference data points in the reference list is within a predetermined range (e.g., 5 to 6 points) or whether the average error is greater than a second threshold (e.g., 4000) but less than the first threshold. If either condition is true, processing circuit sets the confidence level to MEDIUM. If none of the conditions are true for assigning a LOW or MEDIUM confidence level, processing circuit sets the confidence level to HIGH.

Based upon the confidence level, thresholds are then set for time delays, point spacing, determining whether raw data is noisy, motion, and heading stability in step 538. For example, if the confidence level is LOW, the noise threshold is set to 25 mG and the time delay is set to 2 seconds, if the confidence level is MEDIUM, the noise threshold is set to 15 mG and the time delay is set to 6 seconds, and if the confidence level is HIGH, the noise threshold is set to 5 mG and the time delay is set to 8 seconds. The time delay is used to ensure that the data is sufficiently stable to be used as a reference point, and thus, the higher the confidence level in the existing reference points and solution, the harder it becomes to displace an existing reference point. Moreover, the lower the confidence level, the more quickly the system will acquire and accept new reference points to compute a solution with a higher confidence level. The threshold for determining whether the vehicle is moving may be a fixed value of, for example, 2 mG, or may be variable as a function of the confidence level. The time delays may be used in a manner similar to those used in the preceding embodiment in connection with FIG. 13 when determining whether the data has been below the noise threshold for a long enough period of time to be considered stable. The thresholds for point spacing based on the confidence level are determined as described further below in connection with step 552 in FIG. 22D.

In step 540, processing circuit 110 calculates the noise level. The noise level is computed as follows:

$$\text{noise level}=\text{SQUAREROOT}[(d^2x)^2+(d^2y)^2]$$

Because the computation of a square root function is a time consuming process for a low-cost processor, one may achieve a similar, but less time consuming, result by evaluating the square of the noise level.

In step 542, processing circuit 110 determines if the vehicle is moving based on the calculated noise level and the threshold determined above in step 538. Thus, if the vehicle is deemed to be moving if the noise level exceeds the threshold (e.g., 2 mG). The noise signature may vary for each vehicle model and the noise threshold to be used in connection with the vehicle in which the compass is installed may be factory preloaded after installation or before installation if the vehicle model is known in advance. The processing circuit 110 may execute known digital signal processing techniques for characterizing when noise is attributable to vehicle movement. Also, the processing circuit may require that the noise level exceed the threshold for a predetermined time, such as, for example, 2 seconds. Then, in step 544, processing circuit 110 determines if the heading is stable based on whether the noise flag is set. The noise flag is first set when the computed noise level exceeds the established noise threshold and remains set until the noise level falls below the noise threshold and remains below the threshold for the established time delay.

In step 546, the processing circuit determines whether the vehicle is moving, the data is stable, and the data is not noisy. If each of these conditions is true, processing circuit 110 executes the stable point processing subroutine 548. Otherwise, the magnetic field processing subroutine 530 is terminated and the controller returns to the main process 500. The noise levels and averages are compared to the thresholds to determine if the data is noisy. When noise or motion is sensed, countdown timers are initialized. Any noise or loss of stability will reset the counters in a manner similar to that described above with respect to FIG. 13.

Figure 22D:
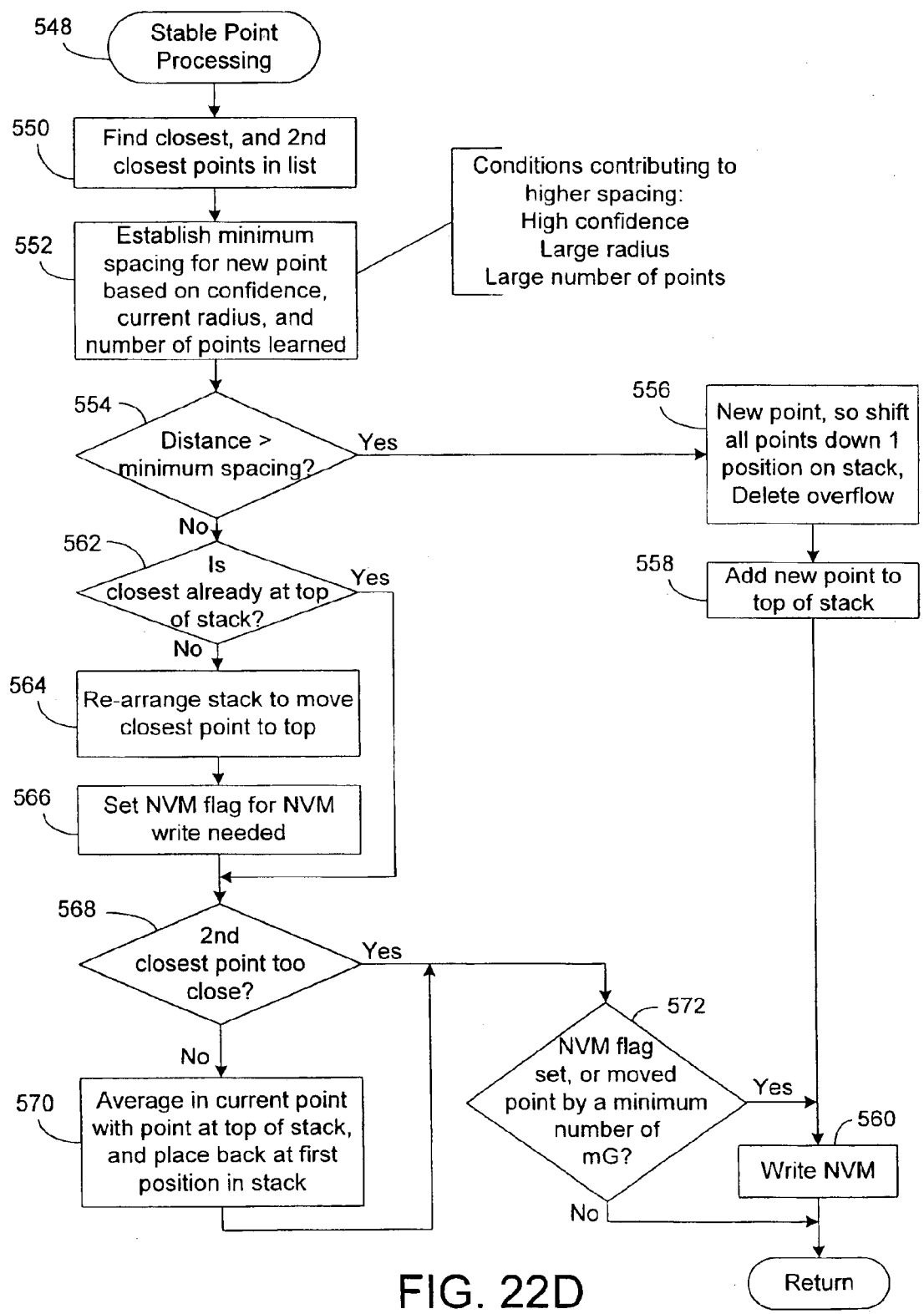
Figure 22E:
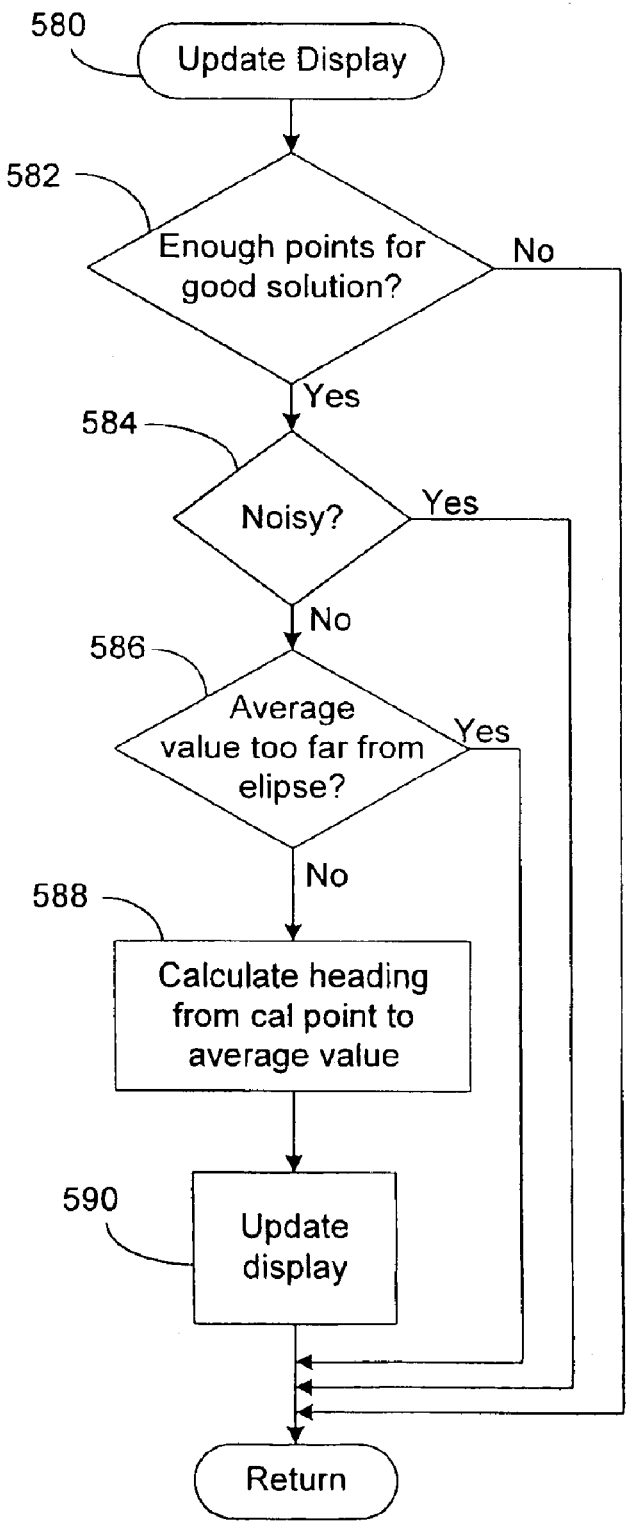

The stable point processing subroutine 548 is generally illustrated in FIG. 22D. As shown in FIG. 22D, the first step in the subroutine (step 550) is to find the closest and second closest points contained in the list of reference points to the stable data point attained in the magnetic field processing subroutine 530. Then, in step 552, the processing circuit establishes minimum spacing for the new data point based on the confidence level, current radius, and number of points included in the list of reference points. Conditions contributing to larger minimum spacing include a high confidence level, a large radius, and a large number of reference points in the list. As an example, for a LOW confidence level, the minimum spacing may be set to current radius/3 (typically about 67 mG), for a MEDIUM confidence level, the minimum spacing may be set to current radius/2 (typically about 100 mG), for a HIGH confidence level, the minimum spacing may be set to current radius×¾ (typically about 150 mG). Then, in step 554, the processing circuit determines whether the spacing distance between the closest point in the reference list and the new stable data point is greater than the minimum spacing established in step 552. If the distance is greater than the minimum spacing, the process proceeds to step 556 in which the new stable data point is added to the reference list as a new reference point. Because it is preferred to store the most recent reference point at the top of the list, each of the reference points is shifted down one position in the memory stack, and the last reference point is deleted if the memory stack overflows. Otherwise, each of the prior reference data points is maintained. Then, in step 558, the new data point is added to the top of the stack and the list of reference points is stored in the NVM in step 560 prior to returning to the magnetic field processing subroutine 530, which in turn returns to main process 500.

If, in step 554, the processing circuit determines that the distance between the closest point and the new data point is not greater than the minimum spacing requirement, the processing circuit determines in step 562 whether the closest data point is already located at the top of the list of reference points. If it is, the process proceeds to step 568. Otherwise, steps 564 and 566 are first executed. In step 564, the processing circuit rearranges the stack to move the closest reference point to the top of the stack. In step 566, the NVM flag is set to indicate that an NVM write will subsequently be needed.

In step 568, the processing circuit determines whether the second closest point is too close to the new data point. This may occur if the second closest data point is within a fixed distance (for example, 75 mG) from the new data point or within a distance defined as a function of the minimum spacing (for example, the current value of the minimum spacing) and/or radius. One reason for not averaging such points together is that an S-curve may cause the two points to pull together thereby causing lost resolution. Thus, if the second closest point is too close, the process proceeds to step 572. Otherwise, if the second closest point is not too close, the processing circuit first executes step 570 prior to proceeding to step 572. In step 570, the current data point is averaged with the closest point, which is now at the top of the stack, and the average value is placed back at the first position in the stack.

In step 572, the processing circuit determines whether the NVM flag has been set or whether the point at the top of the stack has been moved by a minimum number of milligauss. The NVM flag is used to minimize the number of writes to the NVM to prolong the lifetime of the NVM. If either of these conditions is true, the processing circuit writes to the NVM in step 560 prior to returning, otherwise it simply returns to the main process routine 500 without writing to the NVM. The minimum number of milligauss by which the point moves may be, for example, 30 milligauss.

The process disclosed in FIG. 24D is executed each time a stable data point is acquired such that the list of reference points is continuously updated with the most recent data. This ensures that the calibration of the compass will be continuously updated using the most recent stable reference points.

An additional event driven and background task performed in step 510 of main process routine 500 is the update display subroutine 580 shown in FIG. 22E. This subroutine is preferably performed in a periodic basis, for example, every two seconds using a short term average of the data. A long term average may be used to provide more filtering.

The update display subroutine 580 begins with the determination in step 582 whether or not enough reference points have been attained for a good solution. If, for example, enough reference points (e.g., 4 points) have not been attained so as to ensure accurate calibration, the displayed heading is not updated. Once enough reference points have been attained, the process proceeds to step 584 where the processing circuit determines whether the noise flag has been set. If the noise flag is set, the system does not utilize the noisy data to update the heading display. Thus, the display is not updated until such time that a determination is made in step 584 that the received data is no longer noisy. Next, in step 586, a determination is made as to whether the average value is located too far away from the approximating geometric pattern. If the average value is too far from the approximating geometry, the heading is not updated. On the other hand, if the average value is close enough to the approximating pattern, the process proceeds to step 588. Typical limits for the acceptable distance from the perimeter of the approximating geometric pattern are 0.5 R and 1.5 R. Alternatively, the error equation in the Find Best-Fit Ellipse routine 604 may be used on this point only and the value compared with a predetermined threshold.

In step 588, the vehicle heading is calculated from the calibration point to the average value of the most recent data. This is done by either multiplying or dividing the ΔY value of the average data point ($y_{avg}-y_{cal}$) by the value of the K/128 and then computing an inverse tangent as generally known in the art. The newly calculated heading is then displayed in step 590 and the process then returns to the main process routine 500.

Figure 22F:
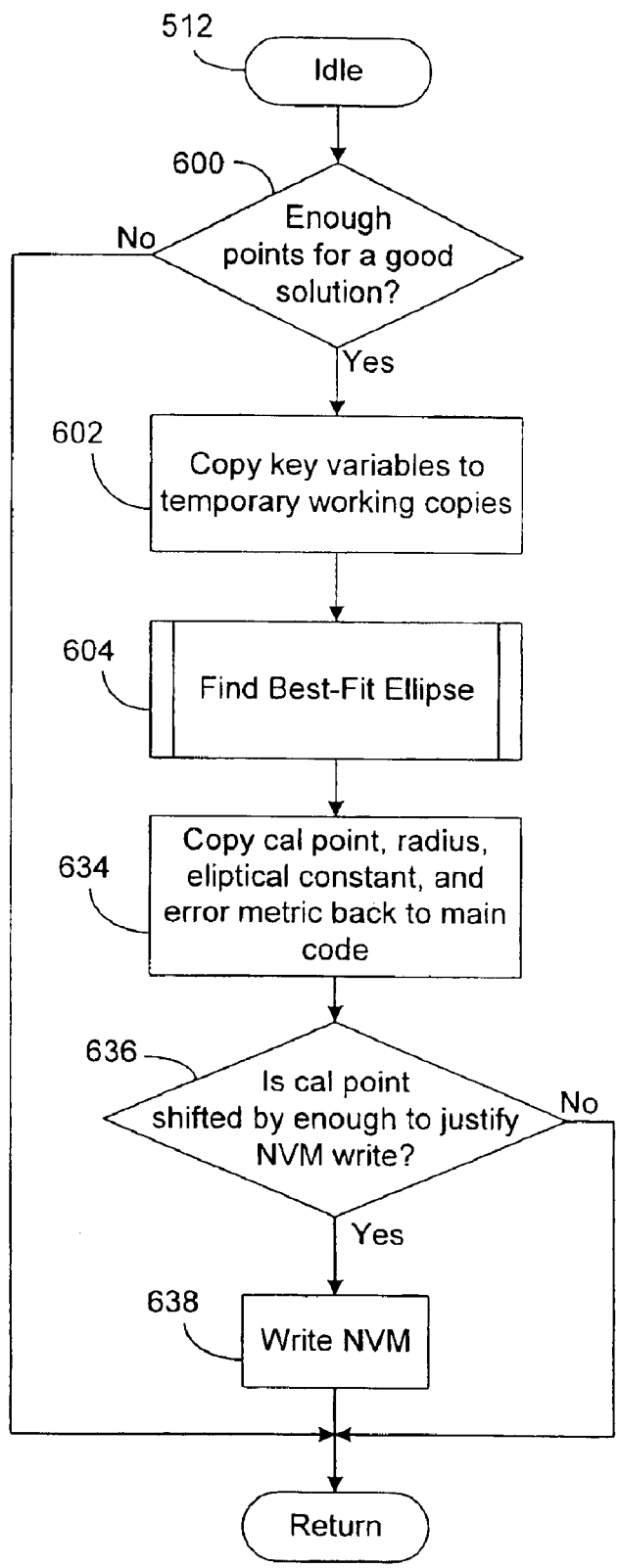
Figure 22G:
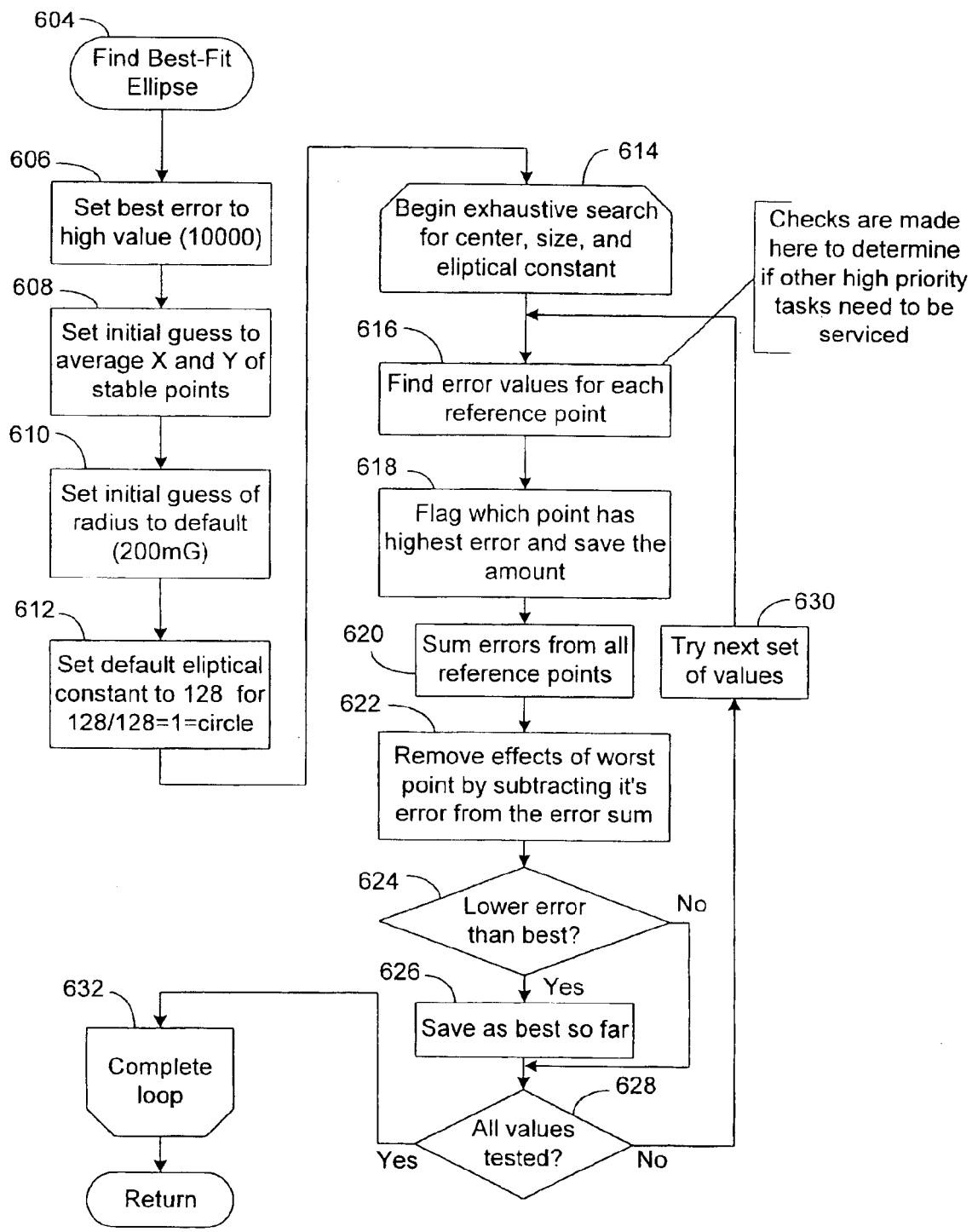

The idle tasks performed in step 512 of the main process routine 500 are described below with respect to FIGS. 22F and 22G. Specifically, as shown in FIG. 22F, the first step 600 is to determine whether there are enough reference points stored in the reference list for a good solution. Again, in the preferred embodiments, four data points are generally sufficient for a good solution. If there are not enough reference points, the process returns to the main process routine 500 and this process continues until such time that there are enough reference points attained for a good solution. When enough reference points are attained, step 602 is executed in which key variables are copied to temporary working copies. For example, this would include a working copy of the reference point list, the radius of the best-fit geometric pattern, the elliptical constant K of the pattern, and the center calibration point of the pattern. Then, the find best-fit ellipse routine 604 is executed. The find best-fit ellipse subroutine 604 is described further below with respect to FIG. 22G.

This best-fit process 604 starts by setting the best error metric value to a high value such as 10,000 (step 606). An initial estimate is then made as to the calibration center point of an approximating circle by computing the average X and Y values of the reference points stored in the reference list (step 608). Initially, the default radius value of R=200 mG is used (step 610) and the default elliptical constant of K=128 is used (step 612). The preferred implementation of the second embodiment uses the following equation to define the approximating geometric pattern:

$$(x_{avg}-x_{cal})^2+(K/123(y_{avg}-y_{cal}))^2=R^2$$

As will be apparent to those skilled in the art, the above equation is that for a circle with the exception of the value K/128, which introduces the elliptical constant into the equation. By initially setting K to 128, the initial guess for the approximating geometry is that of a circle, having a radius of 200 mG and a center point corresponds to the average X and Y values of the reference points in the reference list. As indicated in step 614, an exhaustive iterative search is made for the center point ($x_{cal}$, $y_{cal}$), radius R, and elliptical constant K that results in the lowest error metric and thus provides the best fit to the reference points contained in the reference list. As illustrated in step 616, the error values are determined for each reference point and are summed to determine the error metric. More specifically, the error of a particular reference point relative to the approximating geometry is computed using the following equation:

$$\text{error}=ABS[(x-x_{cal})^2+(K/128(y-y_{cal}))^2-R^2]$$

In step 616, the processing circuit flags which of the reference points has the highest error and the amount of this error is saved. Then, in step 620, the error metric is calculated by summing the errors from all the reference points. Then, in step 622, the effects of the worst data point are removed by subtracting its error from the error sum. Then, in step 624, the processing circuit determines whether the error sum thus computed is lower than the best error sum so far attained. If the error is lower than the prior best fit, the values of $x_{cal}$, $y_{cal}$, R, and K are stored (step 626) prior to proceeding to step 628 in which a determination is made as to whether all of the values of $x_{cal}$, $y_{cal}$, R, and K have been tested. If not, the process proceeds to step 630 by which a next set of $x_{cal}$, $y_{cal}$, R, and K values are tried by looping back through steps 616–628. This loop continues until such time that all values have been tested in step 628 in which case the loop is completed (step 632) and the average error based on the best-fit algorithm is computed by dividing the sum of the errors for each reference point by the number of reference points in the reference list. This value is used to determine the confidence level as described above. The process then returns to step 634 in the idle routine 512.

In determining which values to try next in step 630, the preferred implementation first increments the value $x_{cal}$ at 10 mG increments up to a value of 400 mG above the average value of the x portion of the reference data points, and then subsequently decrements the value of $x_{cal}$ in 10 mG increments until it reaches a value of −400 mG. Then, using the value for $x_{cal}$ that attained the best fit (i.e., lowest error metric), the value of $y_{cal}$ is incremented and then decremented in a similar manner. Once these steps have been accomplished, the value of $x_{cal}$ is incremented by 10 mG in 1 mG steps, and then decremented by 10 mG in 1 mG steps around the best fit reference point found so far. The value of $x_{cal}$ that provides the lowest error metric is then stored and used while similarly incrementing and decrementing $y_{cal}$ in 1 mG increments. Once the best values $x_{cal}$ and $y_{cal}$ have been determined in this fashion, the value of the radius R is incremented and decremented in a similar fashion to obtain the best radius fit. Likewise, the value of K is then incremented and decremented to adjust the ellipticity of the approximating pattern to attain the best fit.

In the preferred implementation, the reference list is limited to eight reference points. It will be appreciated, however, that the number of reference points included in the list may vary depending upon the resolution desired as well as the processing speed of the processing circuit. In general, the more reference points included in the reference list, the more processing time that will be required to identify the best-fit approximating pattern. Additionally, although the presently preferred best-fit algorithm has been described above, other best-fit algorithms may be used that may either provide faster approximations and/or more robust approximations.

Having completed the find best-fit ellipse subroutine 604, the processing circuit returns to step 634 (FIG. 22F) of the idle subroutine 512. In step 634, the calibration point, radius, elliptical constant, and the error metric of the best fit are copied back to a memory location that is utilized by the main processing routine so that the new solution may be used in computing and displaying the vehicle heading. In step 636, it is determined whether the calibration point has shifted by a sufficient amount to justify writing the new information to non-volatile memory. If so, the information is written to NVM in step 638 prior to proceeding back to the main processing routine. Step 636 is performed to limit the number of writes to the NVM and thus prolong the lifetime of the NVM.

Figure 23:
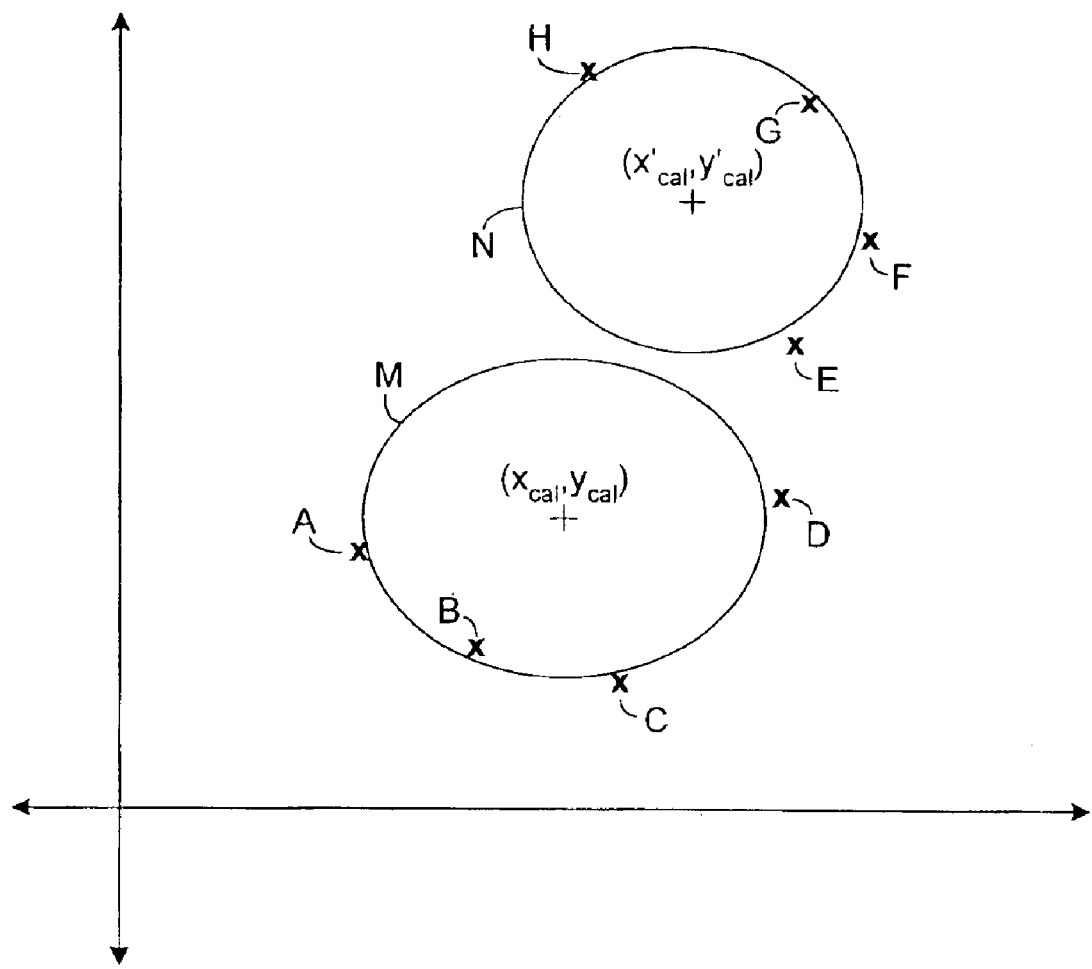
FIG. 23 is a graph illustrating an example of the operation of the inventive electronic compass according to one embodiment of the present invention.

FIG. 23 illustrates a particular advantage that may be obtained through practice of the present invention. As shown in FIG. 23, data points A–H represent sequentially obtained reference data points with data point A being the first obtained reference data point. As noted above, these reference points would be stored in a list of up to eight or more reference points. As also discussed above, a best fit approximating geometric pattern may be determined from as few as four reference data points. Here, in the example shown in FIG. 23, the first four reference data points A–D result in a best fit approximating pattern M having a center calibration point ($x_{cal}$, $y_{cal}$).

At the time at which reference data point E is obtained, this reference data point E is added to the top of the reference list. However, because the distance of reference point E from the approximating geographic pattern M is very large, reference data point E may be excluded from those reference data points that are used to iteratively select or reselect, as the case may be, approximating pattern M. The decision whether to exclude a reference data point may be made based upon an increase in the error metric by more than a predetermined threshold, or by movement of the calibration center point of the approximating pattern M by more than a predetermined distance.

Subsequently, when reference data point F is added to the reference list, reference data point F may also be excluded based upon the increase in the error metric that would result from using points E and F. Similar results would apply when reference data point G is obtained. However, when reference data point H is obtained, points E–H would constitute a sufficient number of points to warrant their own solution of a best fit approximating pattern. Thus, at this point, points A–D could be excluded from the solution or, if there are two good approximating patterns for each sets of points A–D and E–H, respectively, two solutions may be stored and subsequently utilized for determining the vehicle heading. Best fit geometric pattern N, which best fits points E–H, would be utilized since points E–H are the most recently obtained of the eight reference points. When a situation such as that discussed above occurs, two separate sets of reference lists may then be stored and separately updated. Thus, for example, when an additional reference data point is subsequently obtained which best fits with reference data points E–H, this new reference data point would replace reference data point A in one of the two lists, but not necessarily in the other list. This allows for two separate solutions to be stored simultaneously and with one of the two solutions selected that best fits the most recent reference data points. Such a scenario is likely when the magnetic sensors are mounted in the rearview mirror housing, and two different drivers utilize the vehicle and adjust the mirror position to two different respective positions. This may also occur when a temporary magnetic vehicle disturbance is present that causes a temporary shift in the positioning of the data points that are obtained. Thus, when reference data points are obtained that more closely fit the first of the two approximating patterns (e.g., pattern M), the system may revert back to that first approximating pattern so as to more quickly adapt to changes in the mirror housing position or changes in vehicular magnetism.

As noted above, as the confidence level in the approximating solution increases, the filtering thresholds for new reference points correspondingly increases. Thus, it may take longer to learn the last few reference points in the reference list, or to replace or modify reference points in the reference list. As a result, the system's response to any abrupt change in sensed vehicular magnetism such as that described above with reference to FIG. 23, may not be as quick as one may desire. By utilizing two separate reference lists, one with lower filtering thresholds than the other, the system may more quickly learn new reference points and adjust to such abrupt changes in sensed vehicular magnetism.

While the present invention has been described as being implemented with the sensors positioned within the housing of a rearview mirror assembly, the sensors could be mounted in the mounting foot or in any other location of the rearview mirror assembly. Further still, any or all of the various components of the inventive electronic compass may be mounted elsewhere in the vehicle. It will be further appreciated that certain embodiments of the present invention are novel and useful in vehicles land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An electronic compass for a vehicle, comprising:
   a magnetic sensor circuit for sensing three perpendicular components of the Earth's magnetic field vector, and for generating output signals representing the three sensed components; and
   a processing circuit coupled to said magnetic sensor circuit for receiving the output signals, approximating a three-dimensional geometric pattern derived from the three sensed components, computing a heading of the vehicle as a function of at least two of the sensed components while referencing the three-dimensional geometric pattern, and generating a heading signal representing the computed heading.

2. The electronic compass of claim 1 and further comprising a heading indicator coupled to said processing circuit for receiving the heading signal and for providing an indication of the vehicle heading to a vehicle occupant.

3. The electronic compass of claim 2, wherein said heading indicator is a display.

4. The electronic compass of claim 1, wherein the three-dimensional geometric pattern is an approximating pattern representing the best fit to the data points derived from the sensed components.

5. An electronic compass for a vehicle, comprising:
   a magnetic sensor circuit for sensing at least two perpendicular components of the Earth's magnetic field vector and for generating output signals representative of the sensed components; and
   a processing circuit coupled to said magnetic sensor circuit for receiving the output signals, selecting an approximating geometric pattern that constitutes a best fit to select data points corresponding to the sensed components taken over time, computing a heading of the vehicle as a function of at least two of the sensed components while referencing the selected approximating geometric pattern, and generating a heading signal representing the computed heading.

6. The electronic compass of claim 5 and further comprising a heading indicator coupled to said processing circuit for receiving the heading signal and for providing an indication of the vehicle heading to a vehicle occupant.

7. The electronic compass of claim 5, wherein the approximating geographic pattern is a circle.

8. The electronic compass of claim 5, wherein the approximating geographic pattern is an ellipse.

9. The electronic compass of claim 5, wherein the approximating geographic pattern is a three-dimensional geometric pattern.

10. The electronic compass of claim 5, wherein the approximating geographic pattern is a sphere.

11. The electronic compass of claim 5, wherein the approximating geographic pattern is an ellipsoid.

12. The electronic compass of claim 5, wherein the best fit approximating geometric pattern is determined by iterative processing by which an approximating geometric pattern is repeatedly compared and changed based on the sensed components.

13. The electronic compass of claim 5, wherein said magnetic sensor circuit senses three perpendicular components of the Earth's magnetic field vector, and wherein said processing circuit selects a three-dimensional approximating geometric pattern derived from the three sensed components and computes a heading of the vehicle as a function of at least two of the sensed components while referencing the three-dimensional geometric pattern.

14. An electronic compass for a vehicle, comprising:
a magnetic sensor circuit for sensing at least two perpendicular components of the Earth's magnetic field vector and for generating output signals representative of the sensed components; and
a processing circuit coupled to said magnetic sensor circuit for receiving the output signals, iteratively selecting an approximating geometric pattern by repeatedly comparing and changing the geometric pattern based on the sensed components taken over time, computing a heading of the vehicle as a function of at least two of the sensed components while referencing the geometric pattern, and generating a heading signal representing the computed heading.

15. The electronic compass of claim 14, wherein the approximating geographic pattern is a circle.

16. The electronic compass of claim 14, wherein the approximating geographic pattern is an ellipse.

17. The electronic compass of claim 14, wherein the approximating geographic pattern is a three-dimensional geometric pattern.

18. The electronic compass of claim 17, wherein the approximating geographic pattern is a sphere.

19. The electronic compass of claim 17, wherein the approximating geographic pattern is an ellipsoid.

20. The electronic compass of claim 14, wherein said magnetic sensor circuit senses three perpendicular components of the Earth's magnetic field vector, and wherein said processing circuit iteratively selects a three-dimensional approximating geometric pattern derived from the three sensed components and computes a heading of the vehicle as a function of at least two of the sensed components while referencing the three-dimensional geometric pattern.

21. The electronic compass of claim 14, wherein said processing circuit iteratively selects an approximating geometric pattern that constitutes a best fit to select data points corresponding to the sensed components taken over time.

22. An electronic compass for a vehicle, comprising:
a magnetic sensor circuit including at least two sensing elements, each for sensing a component of the Earth's magnetic field vector that is perpendicular to the component sensed by the other sensor and for generating output data signals representative of the sensed components; and
a processing circuit coupled to said magnetic sensor circuit for receiving the output data signals, associating the output data signals from each of said sensing elements to establish a data point, applying a smoothing filter to smooth the data point by utilizing a weighted average with the most recent data point given a greater weight than prior data points, computing a heading of the vehicle as a function of the most recent data point, and generating a heading signal representing the computed heading.

23. The electronic compass of claim 22, wherein the smoothing filter applied by said processing circuit is an exponential smoothing filter.

24. The electronic compass of claim 22, wherein said processing circuit selects an approximating geometric pattern and computes the heading of the vehicle as a function of at least two of the sensed components while referencing the approximating geometric pattern.

25. The electronic compass of claim 24, wherein the approximating geometric pattern is selected based on at least five reference data points derived from the sensed components.

26. The electronic compass of claim 24, wherein said processing circuit selects an approximating geometric pattern that constitutes a best fit to select data points corresponding to the sensed components taken over time.

27. The electronic compass of claim 24, wherein said processing circuit iteratively selects an approximating geometric pattern by repeatedly comparing and changing the geometric pattern based on the sensed components taken over time.

28. The electronic compass of claim 22, wherein said magnetic sensor circuit senses three perpendicular components of the Earth's magnetic field vector, and wherein said processing circuit selects a three-dimensional approximating geometric pattern derived from the three sensed components and computes a heading of the vehicle as a function of at least two of the sensed components while referencing the three-dimensional geometric pattern.

29. An electronic compass for a vehicle, comprising:
a magnetic sensor circuit for sensing at least two perpendicular components of the Earth's magnetic field vector and for generating output signals representative of the sensed components; and
a processing circuit coupled to said magnetic sensor circuit for receiving the output signals, selecting an elliptical approximating geometric pattern, computing a heading of the vehicle as a function of at least two of the sensed components while referencing the elliptical approximating geometric pattern, and generating a heading signal representing the computed heading.

30. The electronic compass of claim 29, wherein said processing circuit selects the elliptical approximating geometric pattern based on at least five reference data points derived from the sensed components.

31. The electronic compass of claim 29, wherein said processing circuit selects an approximating elliptical geometric pattern that constitutes a best fit to select data points corresponding to the sensed components taken over time.

32. The electronic compass of claim 29, wherein said processing circuit determines the magnitude of an error vector extending from the perimeter of the elliptical approximating geometric pattern to the most recent sensed components, and generates a heading signal representing the computed heading when the magnitude of the error vector does not exceed a predetermined threshold.

33. The electronic compass of claim 29, wherein said processing circuit iteratively selects the elliptical approximating geometric pattern by repeatedly comparing and changing the approximating geometric pattern based on the sensed components taken over time.

34. An electronic compass for mounting in a rearview mirror housing of a vehicle, comprising:

a magnetic sensor circuit including first and second sensing elements each for sensing substantially horizontal perpendicular components of the Earth's magnetic field vector, and a third sensing element for sensing a substantially vertical component of the Earth's magnetic field vector, said sensing elements being mounted in the mirror housing and for generating output signals representing the three sensed components; and a processing circuit coupled to said magnetic sensor circuit for receiving the output signals, determining a tilt angle of the mirror housing by monitoring said third sensing element during travel of the vehicle through a predetermined range of vehicle headings, compensating the sensed components of the first and second sensing elements for the tilt angle of the mirror housing, computing a heading of the vehicle as a function of the sensed components of the first and second sensing elements, and generating a heading signal representing the computed heading.

35. The electronic compass of claim 34, wherein the predetermined range of vehicle headings includes headings computed during vehicle travel through approximately 360 degrees.

36. The electronic compass of claim 34, wherein said processing circuit selects an approximating geometric pattern and computes the heading of the vehicle as a function of at least two of the sensed components while referencing the approximating geometric pattern.

37. The electronic compass of claim 36, wherein said processing circuit selects the approximating geometric pattern based on at least five reference data points derived from the sensed components.

38. The electronic compass of claim 36, wherein said processing circuit selects an approximating geometric pattern that constitutes a best fit to select data points corresponding to the sensed components taken over time.

39. The electronic compass of claim 36, wherein said processing circuit determines the magnitude of an error vector extending from the perimeter of the approximating geometric pattern to the most recent sensed components, and generates a heading signal representing the computed heading when the magnitude of the error vector does not exceed a predetermined threshold.

40. The electronic compass of claim 36, wherein said processing circuit iteratively selects the approximating geometric pattern by repeatedly comparing and changing the geometric pattern based on the sensed components taken over time.

41. The electronic compass of claim 36, wherein said magnetic sensor circuit senses three perpendicular components of the Earth's magnetic field vector, and wherein said processing circuit selects a three-dimensional approximating geometric pattern derived from the three sensed components and computes a heading of the vehicle as a function of at least two of the sensed components while referencing the three-dimensional geometric pattern.

* * * * *

UNITED STATES PATENT AND TRADEMARK OFFICE
CERTIFICATE OF CORRECTION

PATENT NO. : 6,928,366 B2
DATED : August 9, 2005
INVENTOR(S) : Harold C. Ockerse et al.

It is certified that error appears in the above-identified patent and that said Letters Patent is hereby corrected as shown below:

Column 3,
Line 57, replace "calculated" with -- calibrated --.

Column 14,
Line 23, replace "form" with -- from --.

Column 24,
Line 12, replace "X" with -- X, Y, or Z component values --.

Column 25,
Line 2, replace "DZ2n" with -- DZ2n, attained for a prior --.
Line 5, replace "in step" with -- is compared in step --.

Column 28,
Line 67, replace "Vsx" with -- Vxs --.

Column 31,
Line 21, replace "silent" with -- SILENT --.

Column 41,
Line 33, replace "123" with -- 128 --.

Column 44,
Line 1, replace "vehicles land-based" with -- land-based --.

UNITED STATES PATENT AND TRADEMARK OFFICE
CERTIFICATE OF CORRECTION

PATENT NO. : 6,928,366 B2
DATED : August 9, 2005
INVENTOR(S) : Harold C. Ockerse et al.

It is certified that error appears in the above-identified patent and that said Letters Patent is hereby corrected as shown below:

<u>Column 46,</u>
Line 53, replace "approximating elliptical" with -- elliptical approximating --.

Signed and Sealed this

Twenty-eighth Day of February, 2006

JON W. DUDAS
*Director of the United States Patent and Trademark Office*